United States Patent
Duvaut et al.

(10) Patent No.: US 7,406,126 B2
(45) Date of Patent: Jul. 29, 2008

(54) IMPLEMENTATION OF SMART DSL FOR LDSL SYSTEMS

(75) Inventors: Patrick Duvaut, Tinton Falls, NJ (US); Ehud Langberg, Wayside, NJ (US); Lujing Cai, Morganville, NJ (US); Laurent Pierrugues, Tinton Falls, NJ (US); William Scholtz, Greenbrae, CA (US); Oliver Moreno, Paris (FR); Feng Ouyang, Dayton, MD (US); Massimo Sorbara, Freehold, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 664 days.

(21) Appl. No.: 10/714,655

(22) Filed: Nov. 18, 2003

(65) Prior Publication Data
US 2004/0202239 A1  Oct. 14, 2004

Related U.S. Application Data

(60) Provisional application No. 60/491,268, filed on Jul. 31, 2003, provisional application No. 60/426,796, filed on Nov. 18, 2002.

(51) Int. Cl.
*H04K 1/10* (2006.01)
*H04L 27/28* (2006.01)

(52) U.S. Cl. .................................. 375/260; 375/222

(58) Field of Classification Search ................. 375/260, 375/220
See application file for complete search history.

(56) References Cited

U.S. PATENT DOCUMENTS

| 6,333,920 | B1 | 12/2001 | Nguyen et al. | |
|---|---|---|---|---|
| 6,760,383 | B1 * | 7/2004 | Darveau | 375/259 |
| 2004/0218667 | A1 * | 11/2004 | Duvaut et al. | 375/224 |
| 2006/0163949 | A1 * | 7/2006 | Barrass | 307/19 |

OTHER PUBLICATIONS

International Search Report dated May 21, 2004 for Application No. PCT/US03/36843.
Kee Bong Song et al., Dynamic spectrum management for next-generation dsl systems, Topics in Broadband Access, IEEE Communications Magazine, Oct. 2002, pp. 101-109.
Feng Ouyang et al., The first step of long-reach adsl:smart dsl technology, readsl, Topics in Broadband Access, IEEE Communications Magazine, Sep. 2003, pp. 124-131.

* cited by examiner

*Primary Examiner*—David C. Payne
*Assistant Examiner*—Nader Bolourchi

(57) ABSTRACT

Various embodiments for addressing the performance objectives of LDSL and examples of smart systems for LDSL are disclosed. An evaluation of the spectral compatibility of two LDSL modes based on two different downstream masks, identified herein as LDSL Wide and Narrow, is disclosed. Spectral compatibility is evaluated in accordance with existing rules. Other embodiments may further comprise determining features of upstream transmission.

7 Claims, 50 Drawing Sheets

Two smart system selection modes: Manual and Automatic

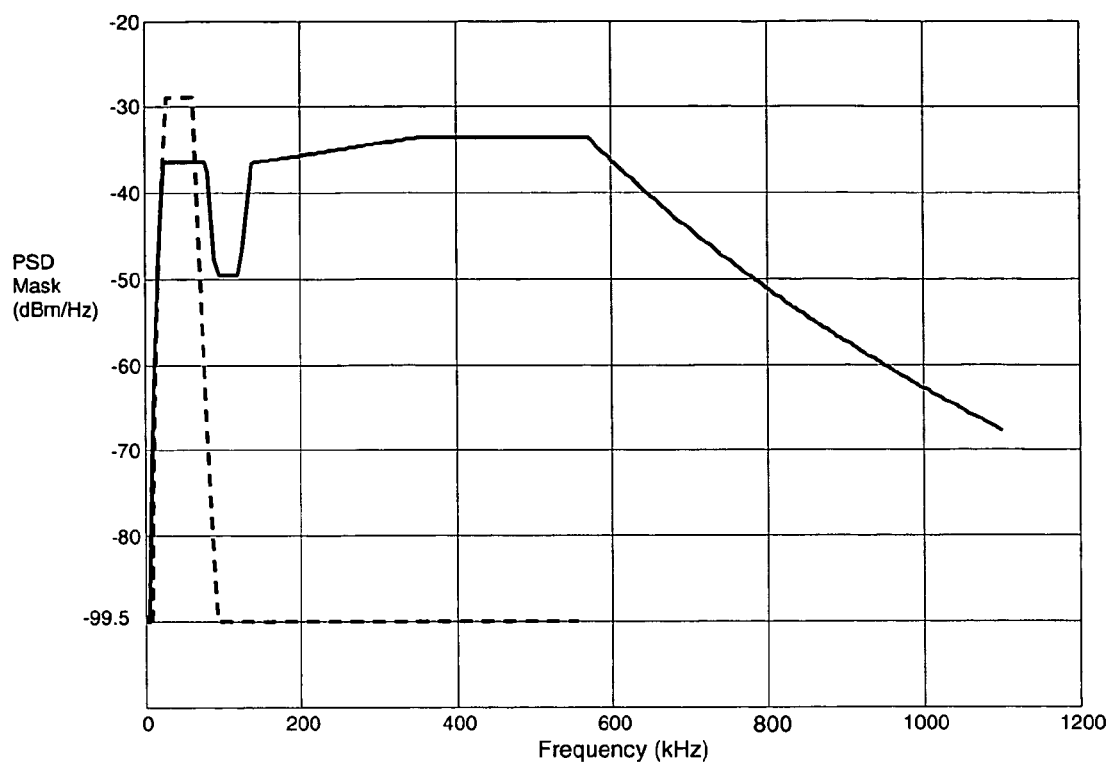
Figure 1. U1 and D1 PSD Masks, peak values

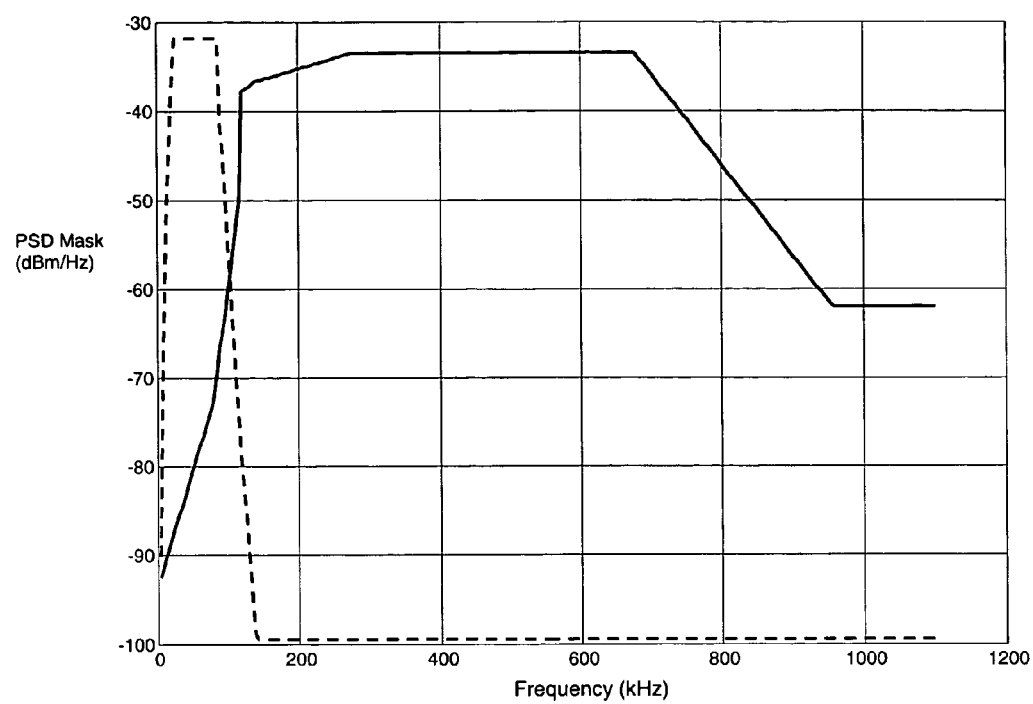
Figure 2. U2 and D2 PSD Masks, peak values

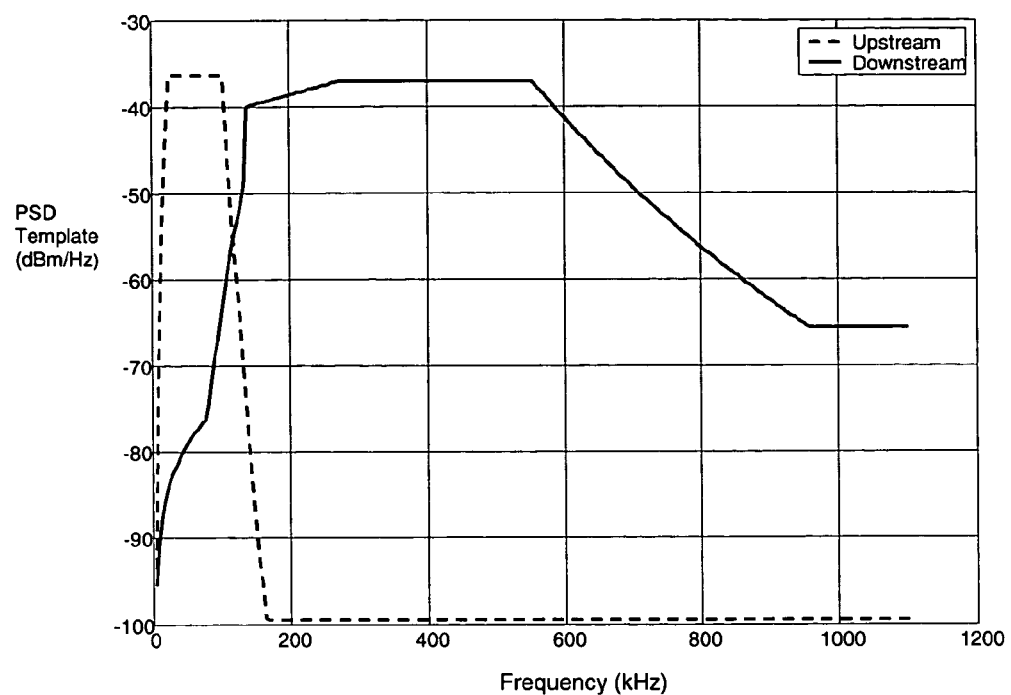
Figure 3. U3 and D3 PSD Templates, average values

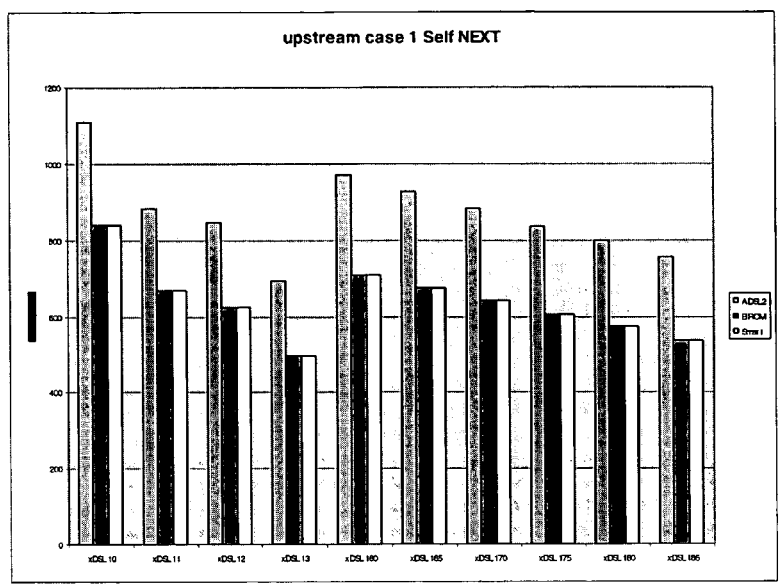
Figure 4. Bar Chart, Upstream Rate, Noise case #1, ADSL2, M OJ-074, NON EC Smart LDSL

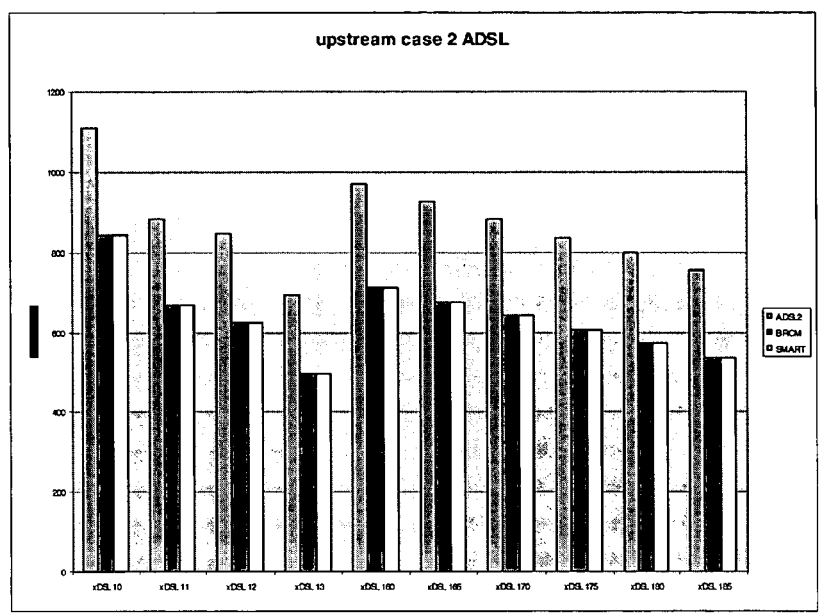
Figure 5. Bar Chart, Upstream Rate, Noise case #2, ADSL2, M OJ-074, NON EC Smart LDSL

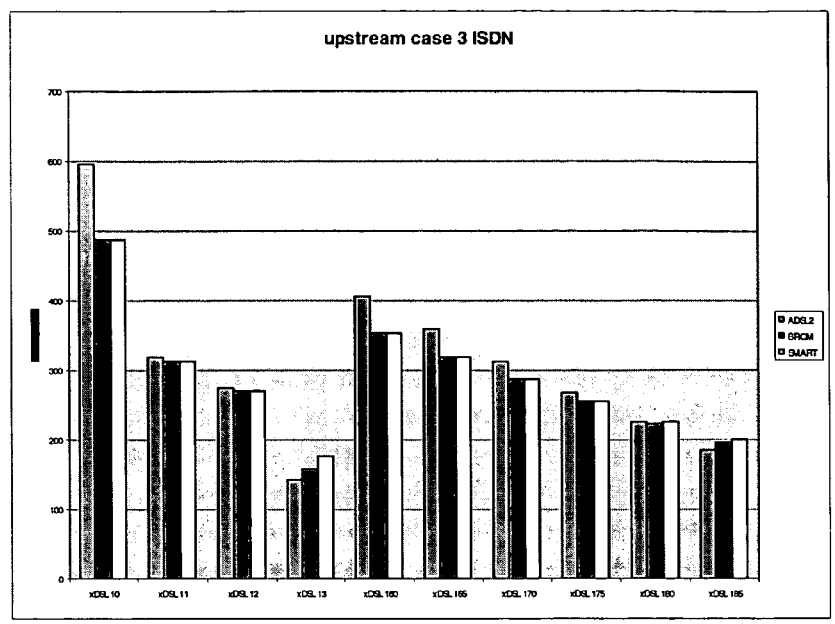
Figure 6. Bar Chart, Upstream Rate, Noise case #3, ADSL2, M OJ-074, NON EC Smart LDSL

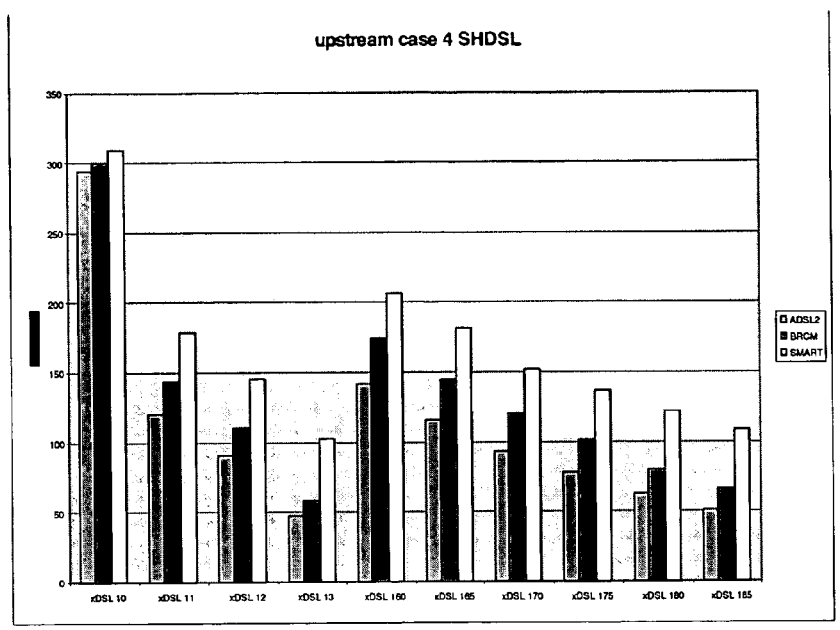
Figure 7. Bar Chart, Upstream Rate, Noise case #4, ADSL2, M OJ-074, NON EC Smart LDSL

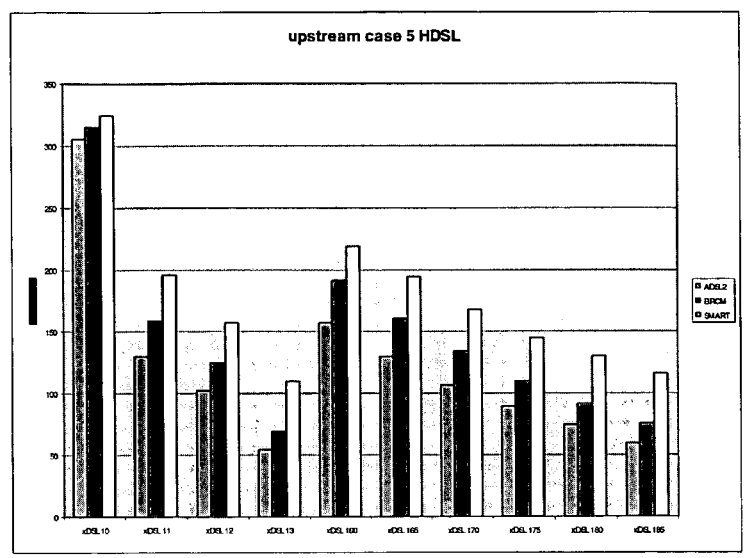
Figure 8. Bar Chart, Upstream Rate, Noise case #5, ADSL2, M OJ-074, NON EC Smart LDSL

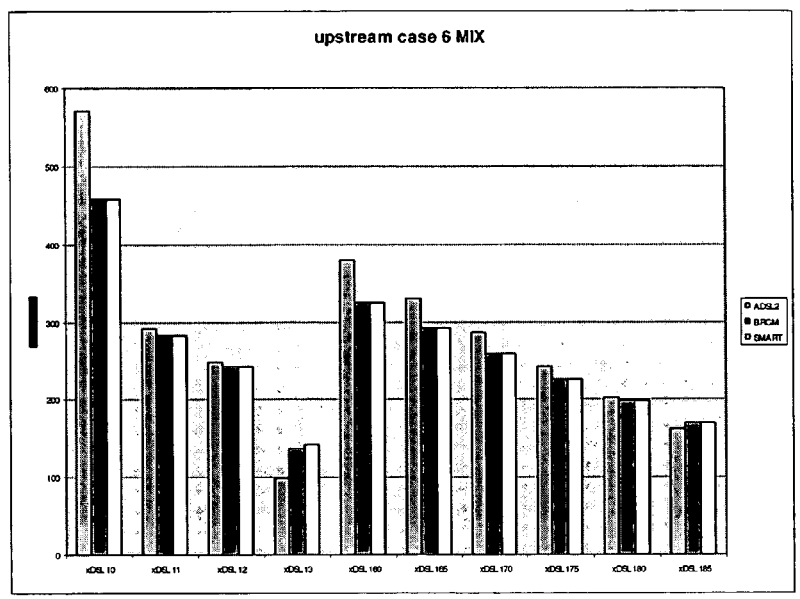
Figure 9. Bar Chart, Upstream Rate, Noise case #6, ADSL2, M OJ-074, NON EC Smart LDSL

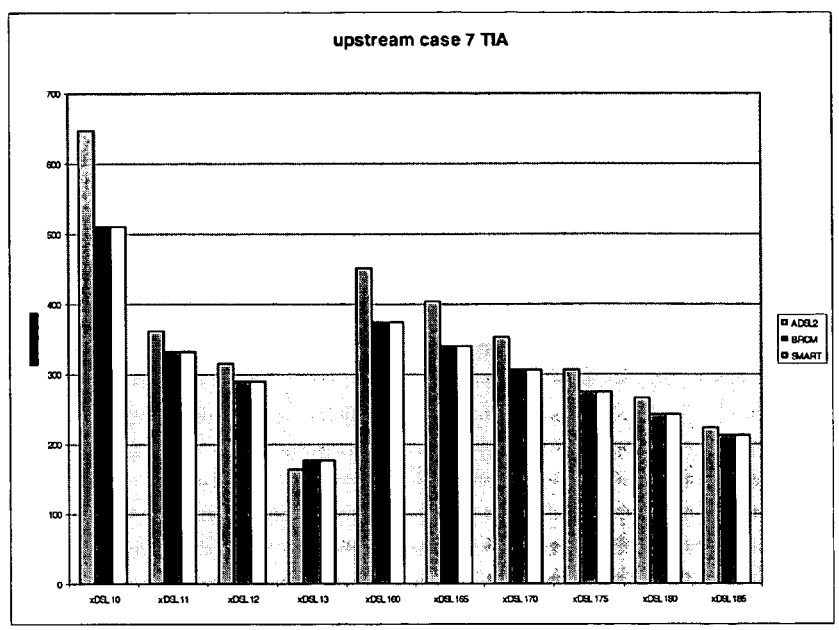
Figure 10. Bar Chart, Upstream Rate, Noise case #7, ADSL2, M OJ-074, NON EC Smart LDSL

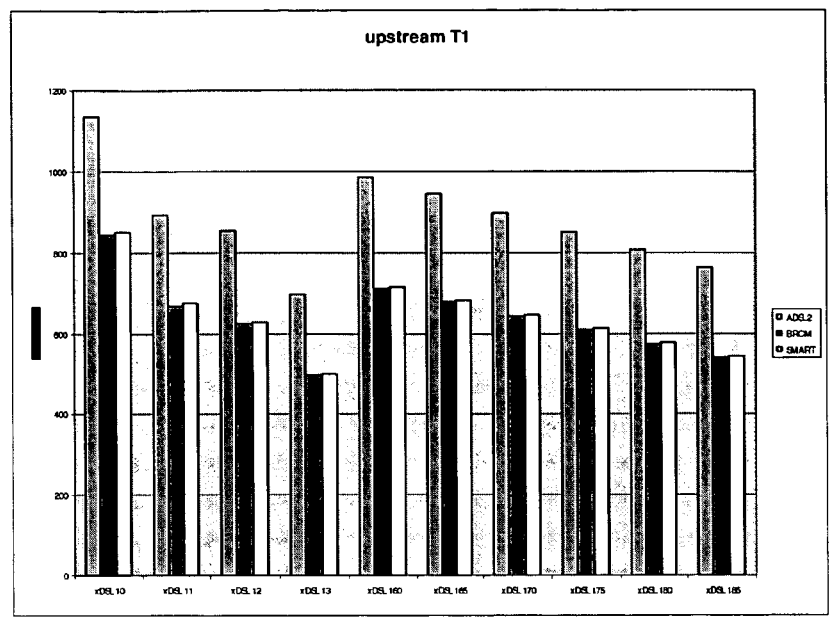
Figure 11. Bar Chart, Upstream Rate, Noise case #T1, ADSL2, M OJ-074, NON EC Smart LDSL

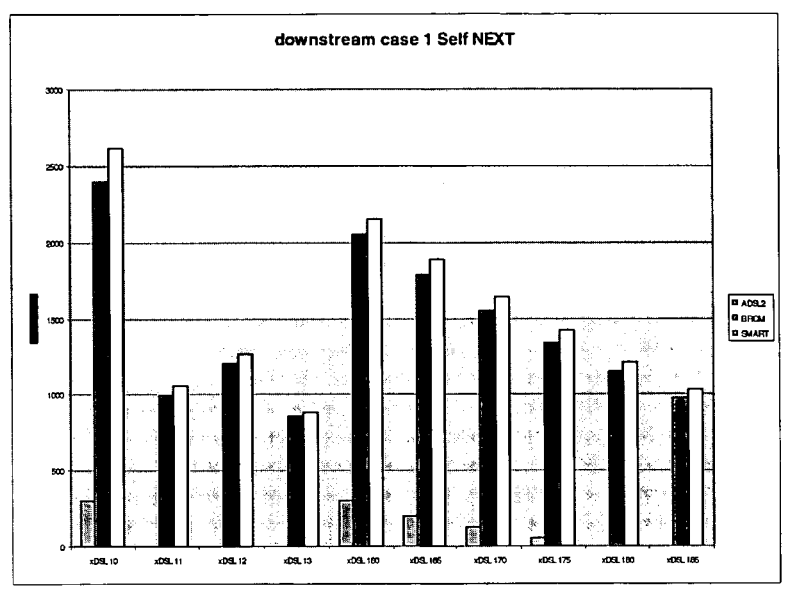
Figure 12. Bar Chart, Downstream Rate, Noise case #1, ADSL2, M OJ-074, NON EC Smart LDSL

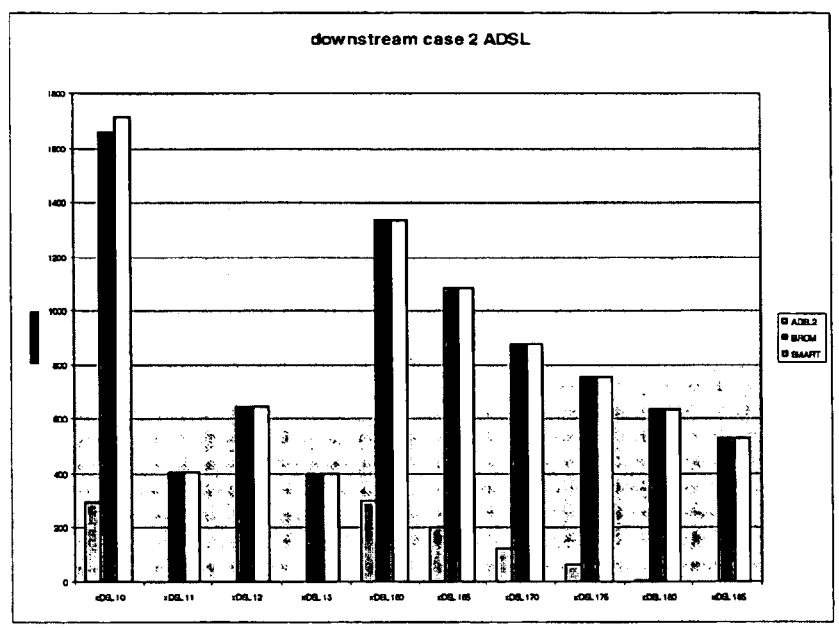
Figure 13. Bar Chart, Downstream Rate, Noise case #2, ADSL2, M OJ-074, NON EC Smart LDSL

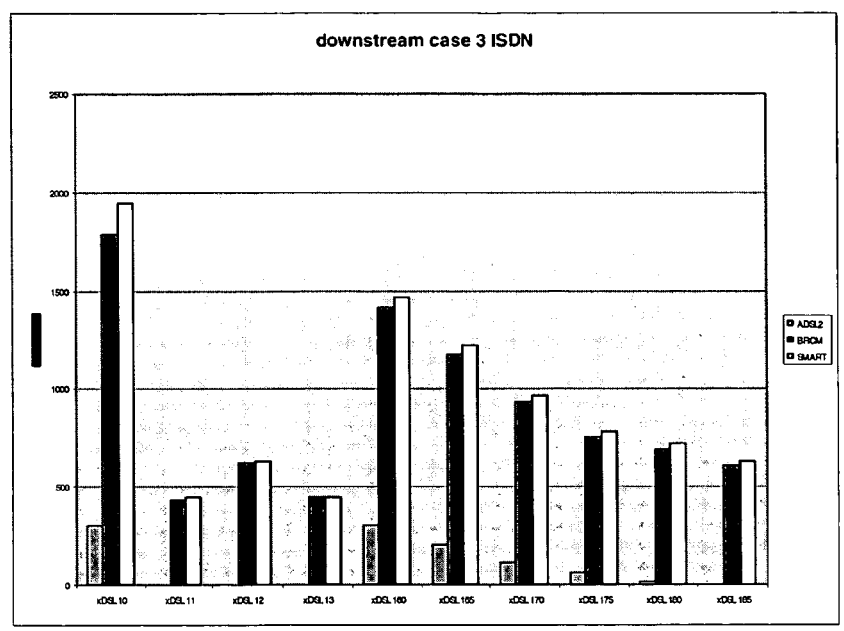
Figure 14. Bar Chart, Downstream Rate, Noise case #3, ADSL2, M OJ-074, NON EC Smart LDSL

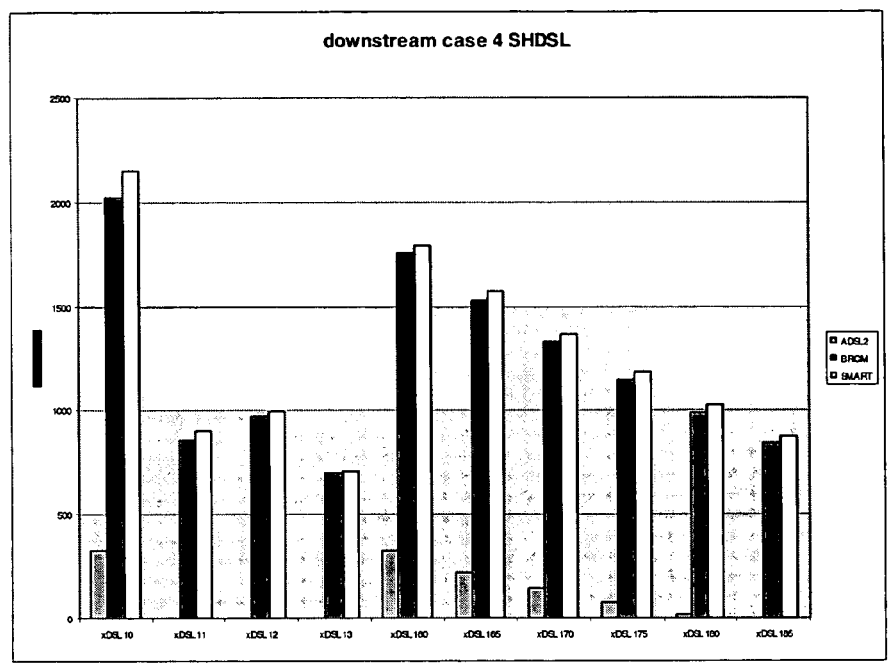
Figure 15. Bar Chart, Downstream Rate, Noise case #4, ADSL2, M OJ-074, NON EC Smart LDSL

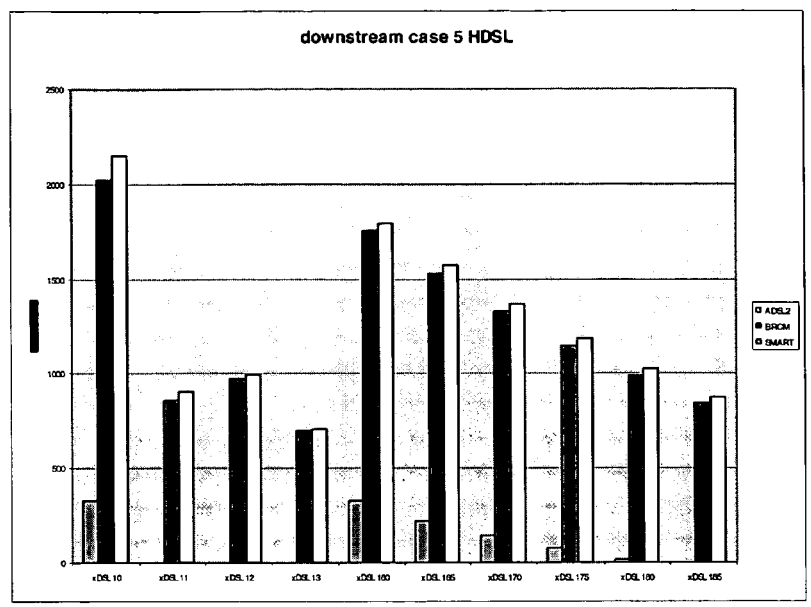
Figure 16. Bar Chart, Downstream Rate, Noise case #5, ADSL2, M OJ-074, NON EC Smart LDSL

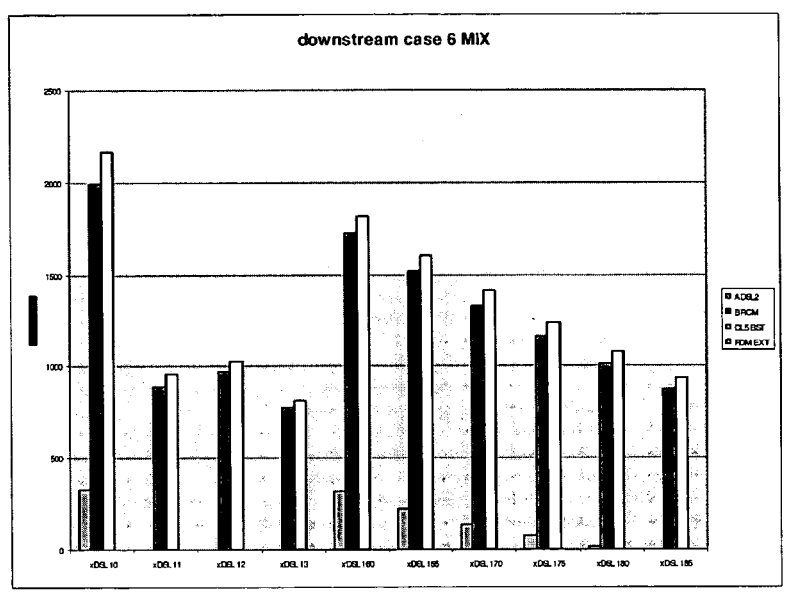
Figure 17. Bar Chart, Downstream Rate, Noise case #6, ADSL2, M OJ-074, NON EC Smart LDSL

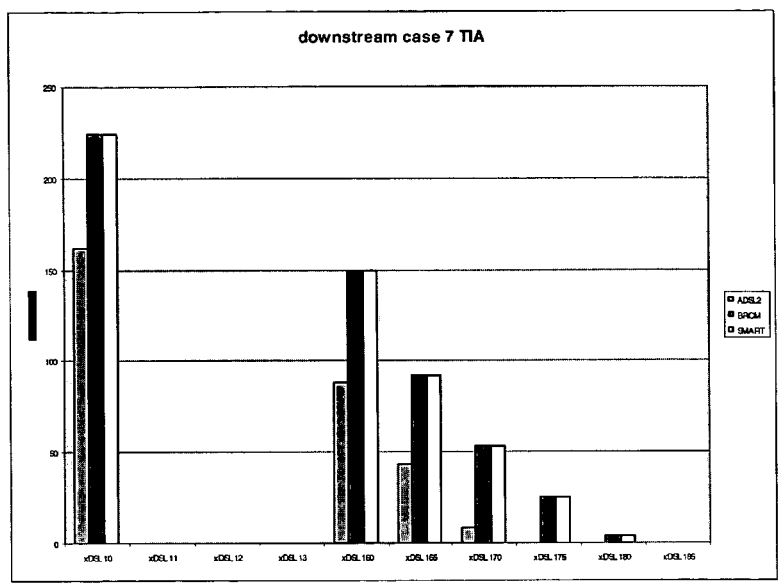
Figure 18. Bar Chart, Downstream Rate, Noise case #7, ADSL2, M OJ-074, NON EC Smart LDSL

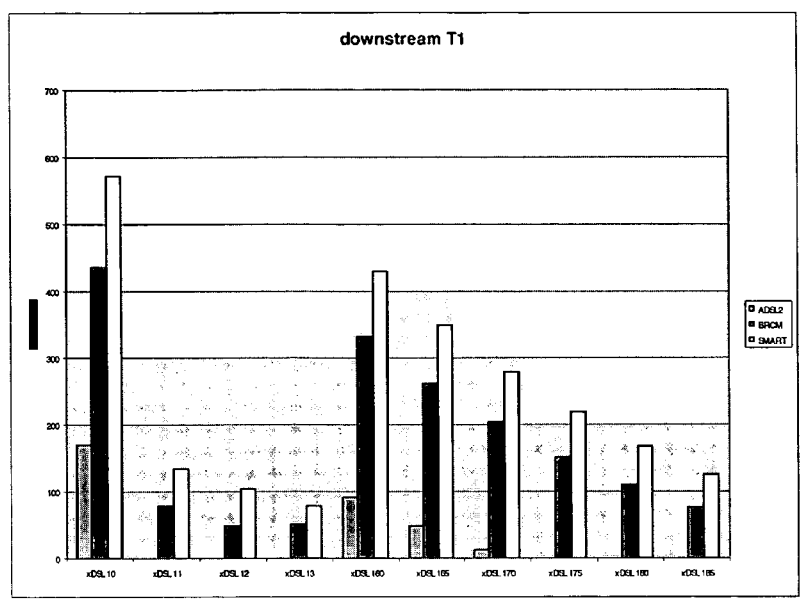
Figure 19. Bar Chart, Downstream Rate, Noise case #T1, ADSL2, M OJ-074, NON EC Smart LDSL

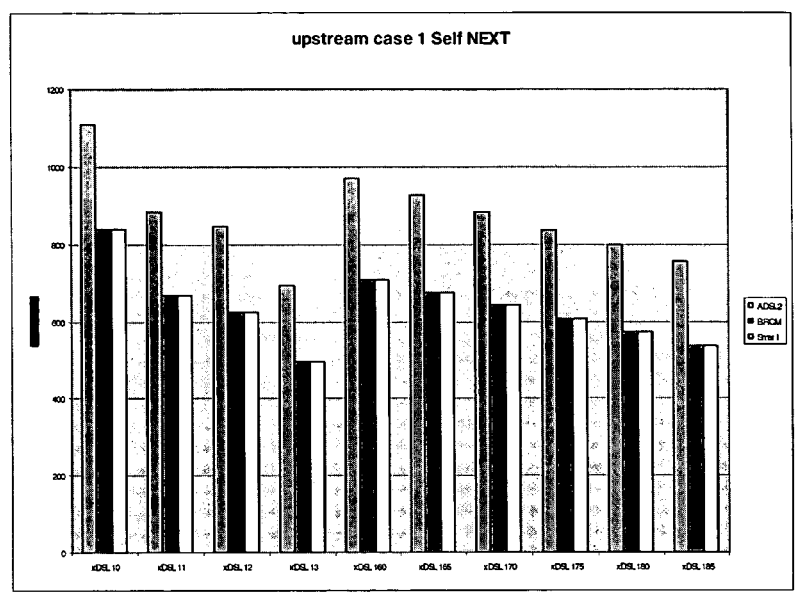
Figure 20. Bar Chart, Upstream Rate, Noise case #1, ADSL2, M OJ-074, EC Smart LDSL

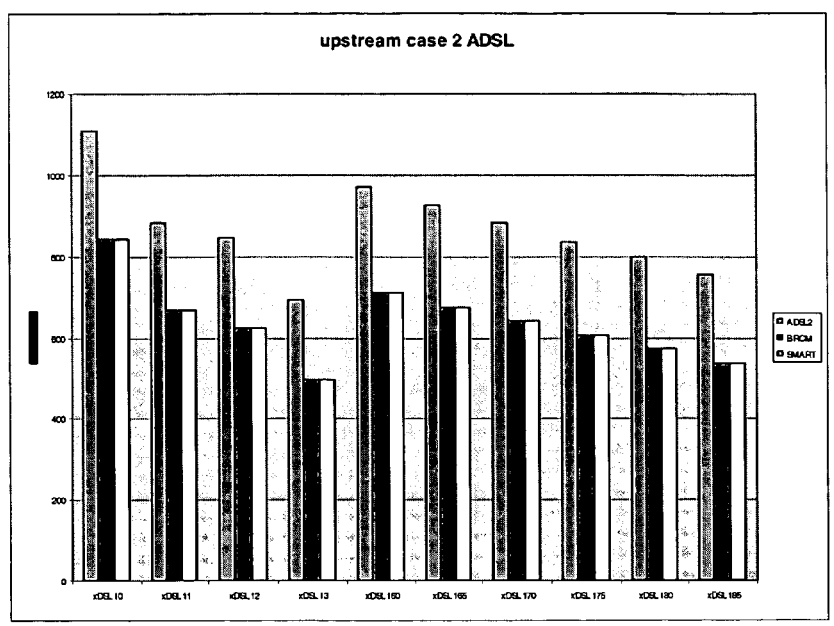
Figure 21. Bar Chart, Upstream Rate, Noise case #2, ADSL2, M OJ-074, EC Smart LDSL

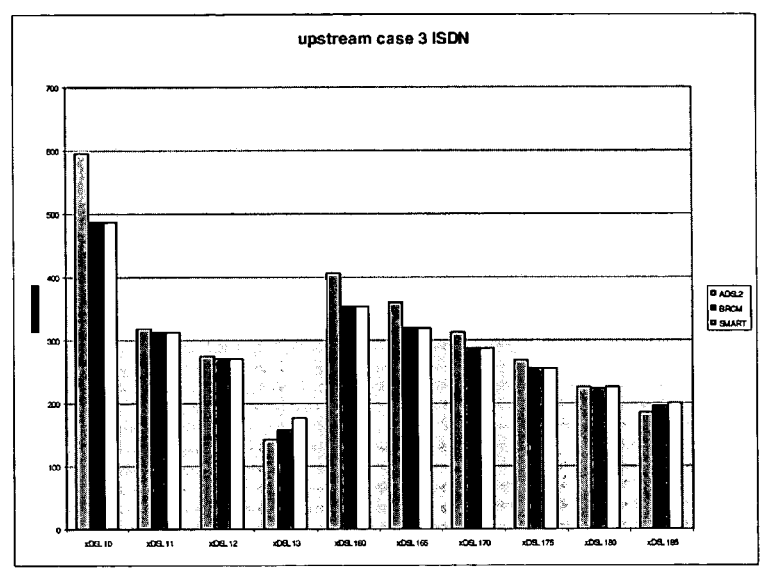
Figure 22. Bar Chart, Upstream Rate, Noise case #3, ADSL2, M OJ-074, EC Smart LDSL

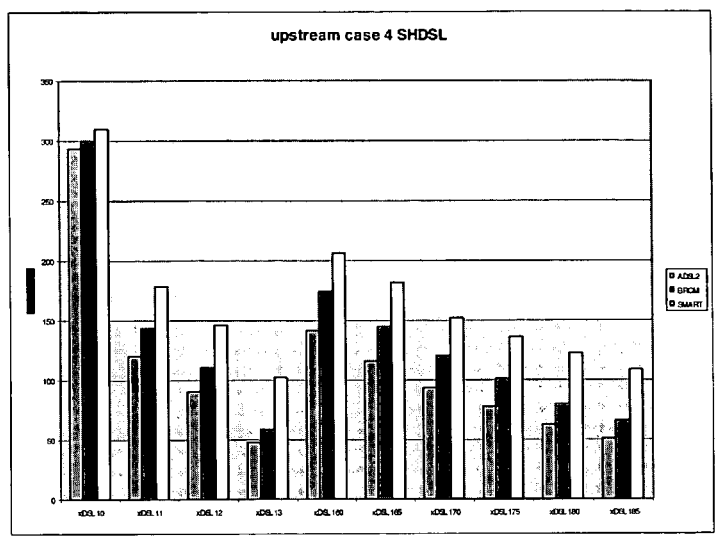
Figure 23. Bar Chart, Upstream Rate, Noise case #4, ADSL2, M OJ-074, EC Smart LDSL

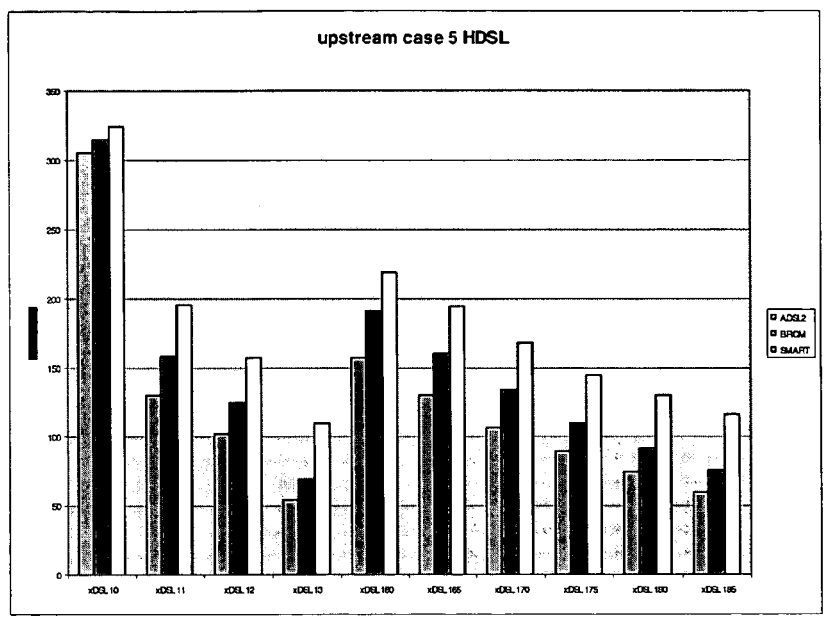
Figure 24. Bar Chart, Upstream Rate, Noise case #5, ADSL2, M OJ-074, EC Smart LDSL

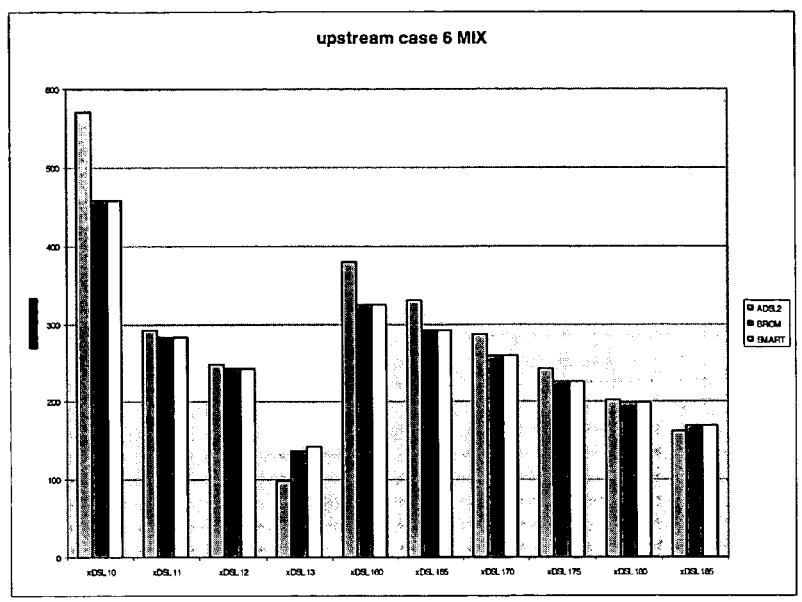
Figure 25. Bar Chart, Upstream Rate, Noise case #6, ADSL2, M OJ-074, EC Smart LDSL

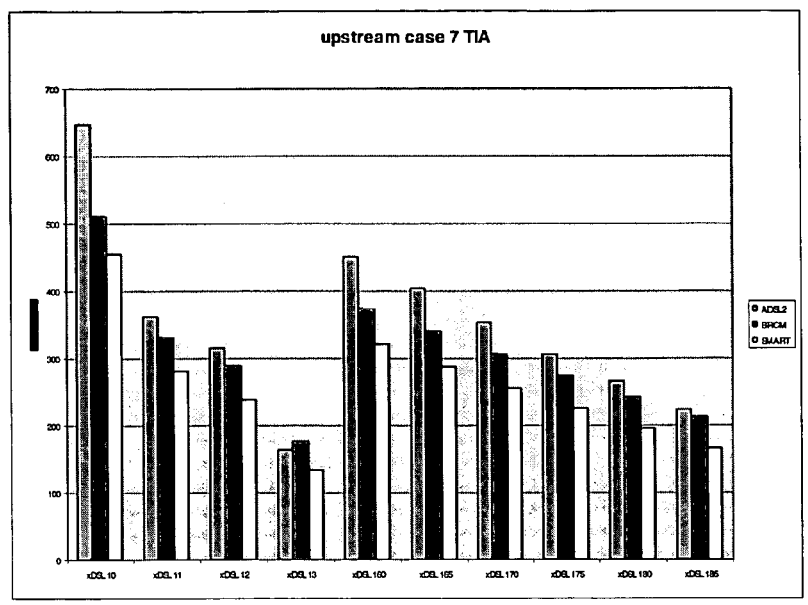
Figure 26. Bar Chart, Upstream Rate, Noise case #7, ADSL2, M OJ-074, EC Smart LDSL

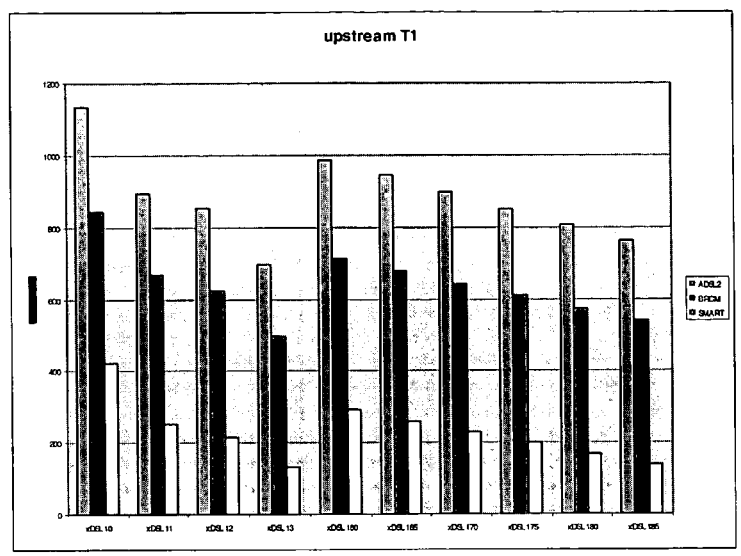
Figure 27. Bar Chart, Upstream Rate, Noise case #T1, ADSL2, M OJ-074, EC Smart LDSL

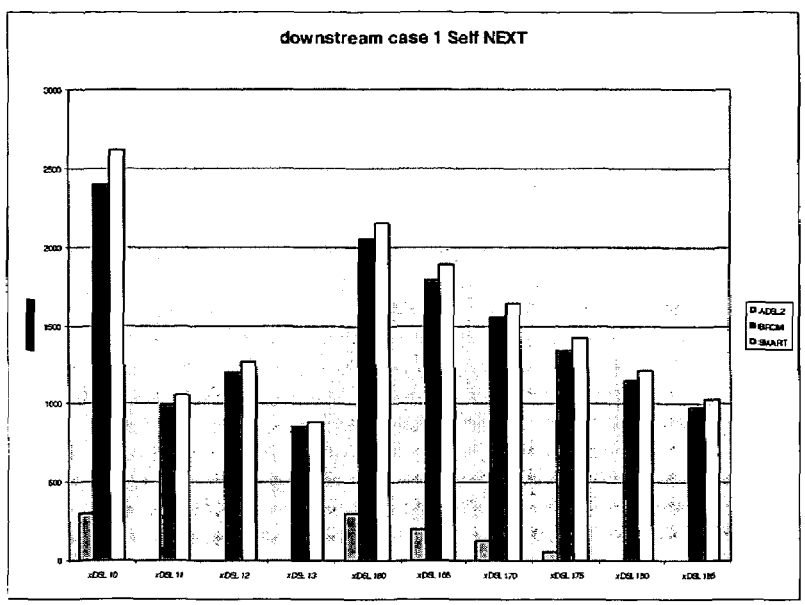
Figure 28. Bar Chart, Downstream Rate, Noise case #1, ADSL2, M OJ-074, EC Smart LDSL

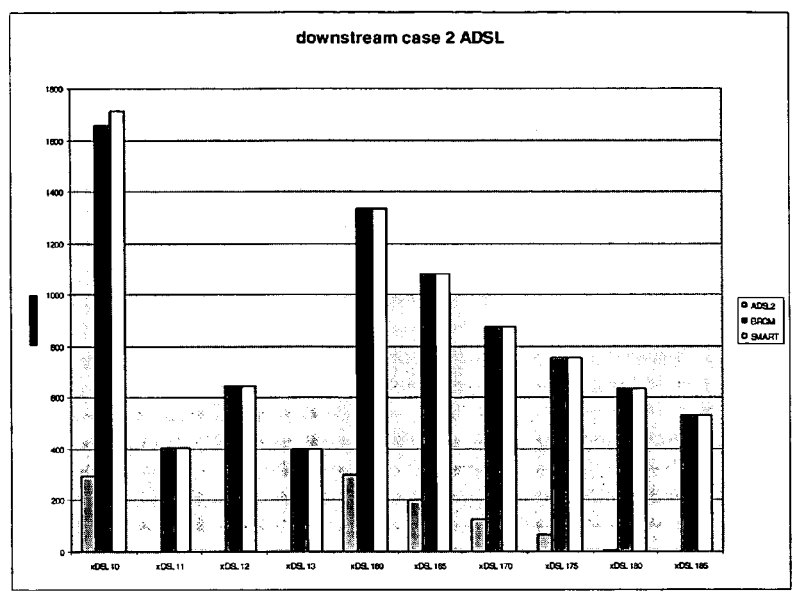
Figure 29. Bar Chart, Downstream Rate, Noise case #2, ADSL2, M OJ-074, EC Smart LDSL

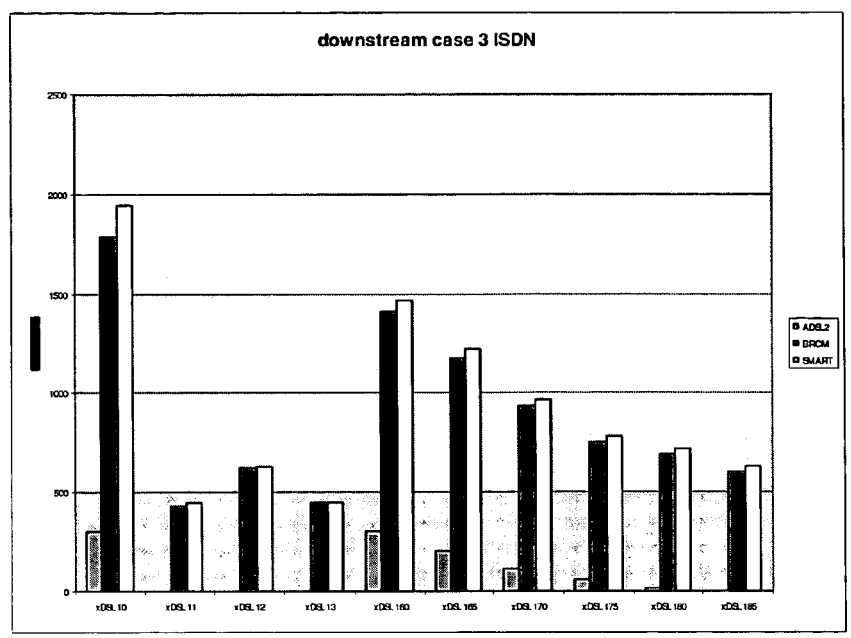
Figure 30. Bar Chart, Downstream Rate, Noise case #3, ADSL2, M OJ-074, EC Smart LDSL

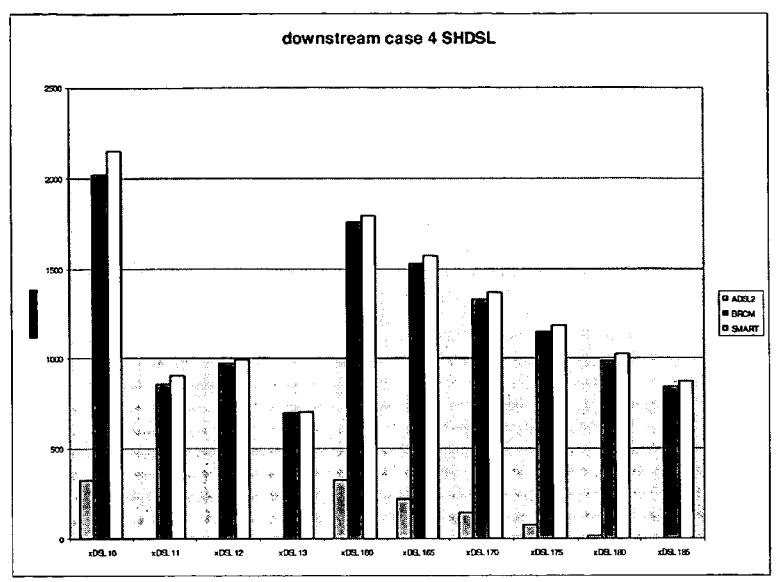
Figure 31. Bar Chart, Downstream Rate, Noise case #4, ADSL2, M OJ-074, EC Smart LDSL

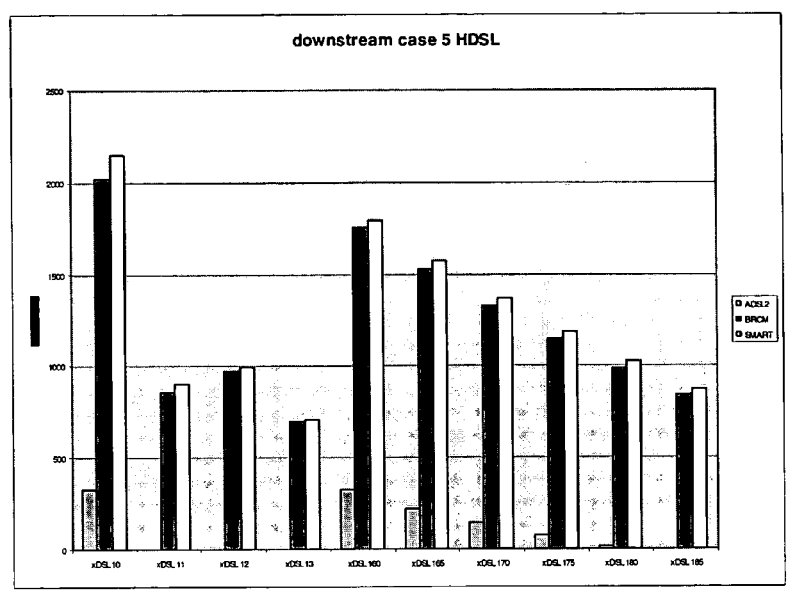
Figure 32. Bar Chart, Downstream Rate, Noise case #5, ADSL2, M OJ-074, EC Smart LDSL

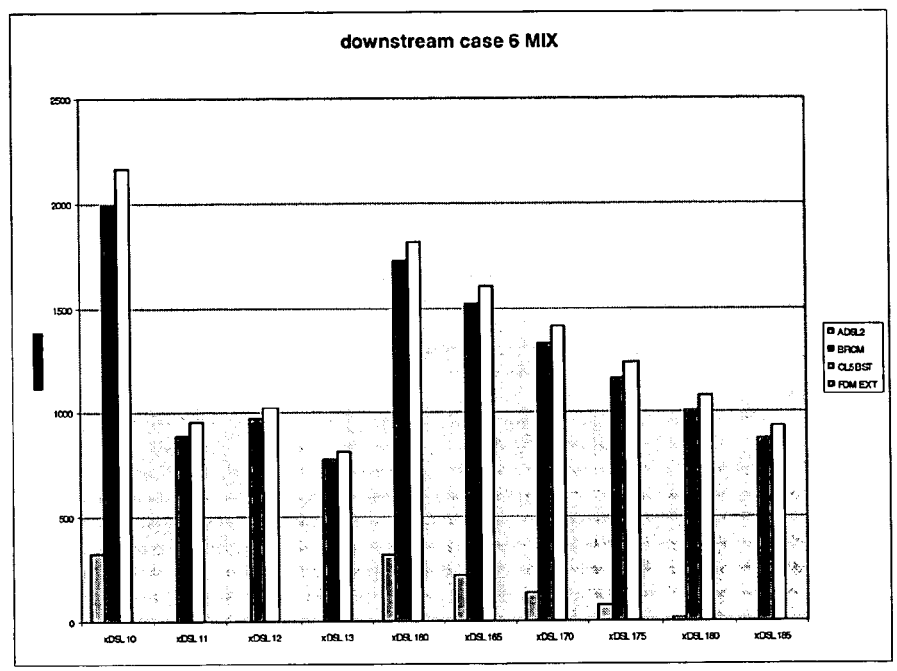
Figure 33. Bar Chart, Downstream Rate, Noise case #6, ADSL2, M OJ-074, EC Smart LDSL

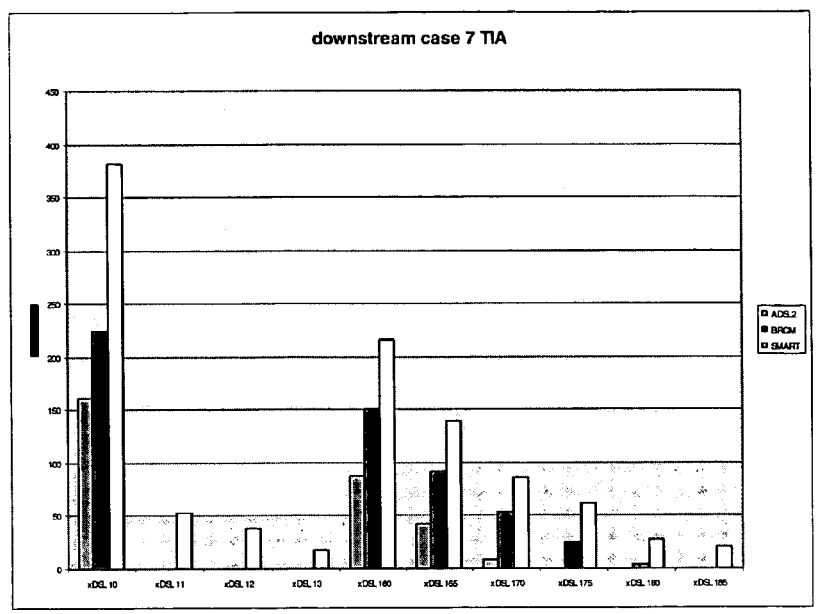
Figure 34. Bar Chart, Downstream Rate, Noise case #7, ADSL2, M OJ-074, EC Smart LDSL

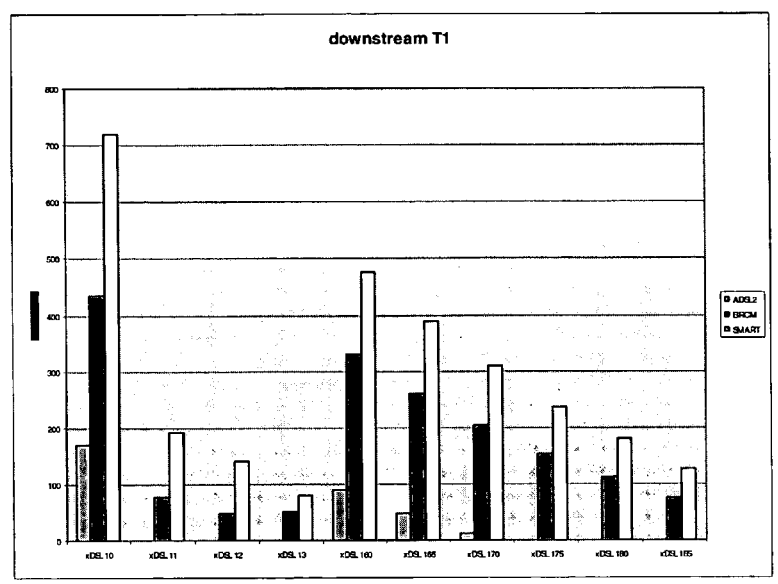
Figure 35. Bar Chart, Downstream Rate, Noise case #T1, ADSL2, M OJ-074, EC Smart LDSL

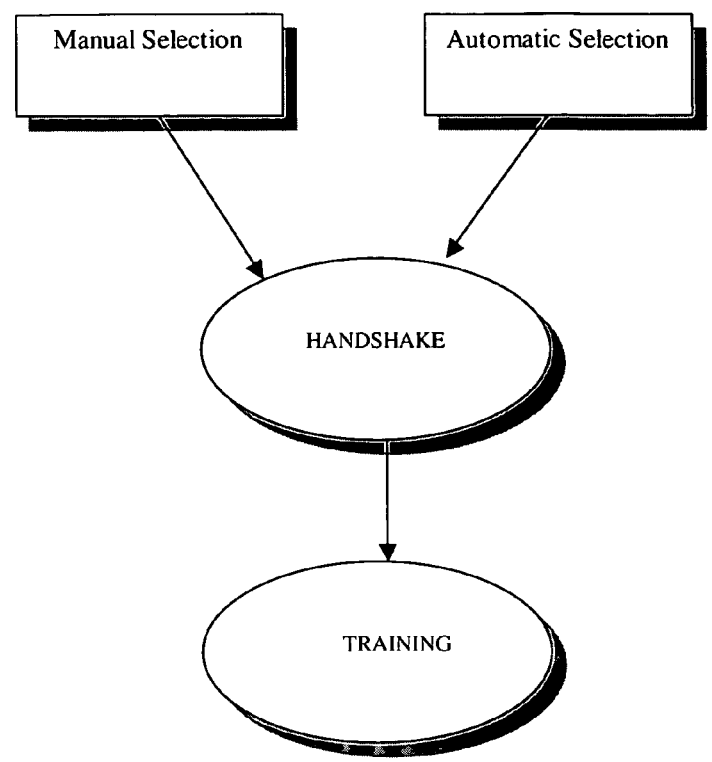
Figure 36. Two smart system selection modes: Manual and Automatic

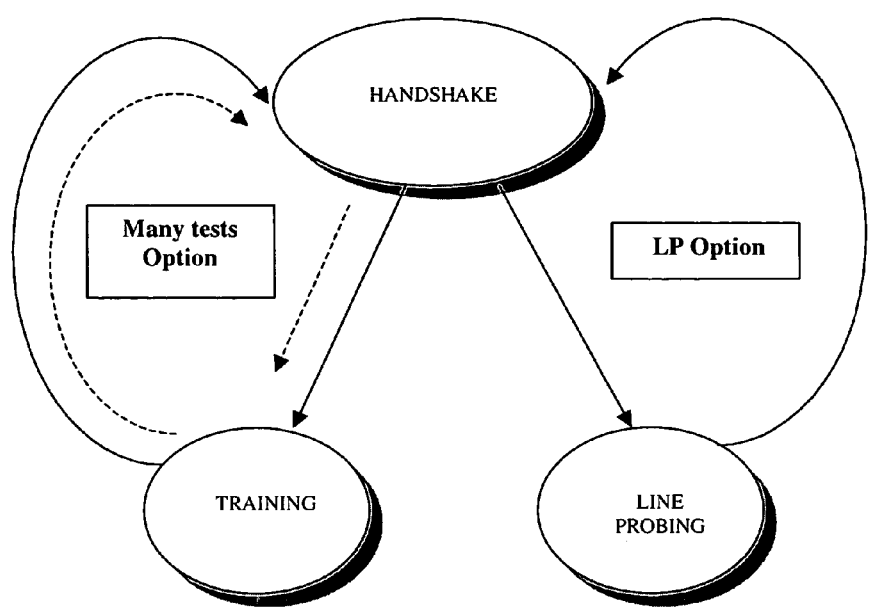
Figure 37. Two options to automatically select a pair of masks in a smart DSL system

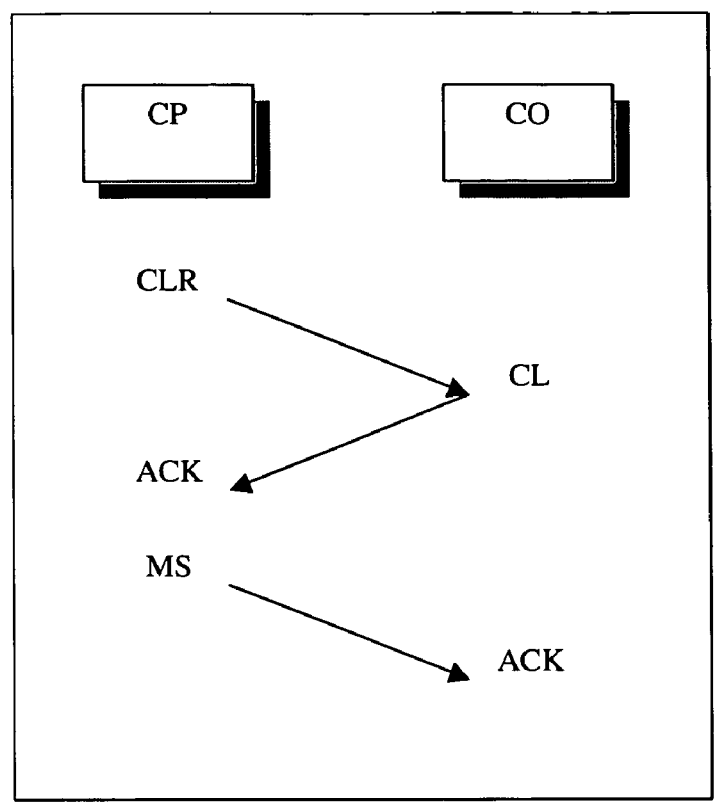
Figure 38. "CP decides" sequence based on G.992.3

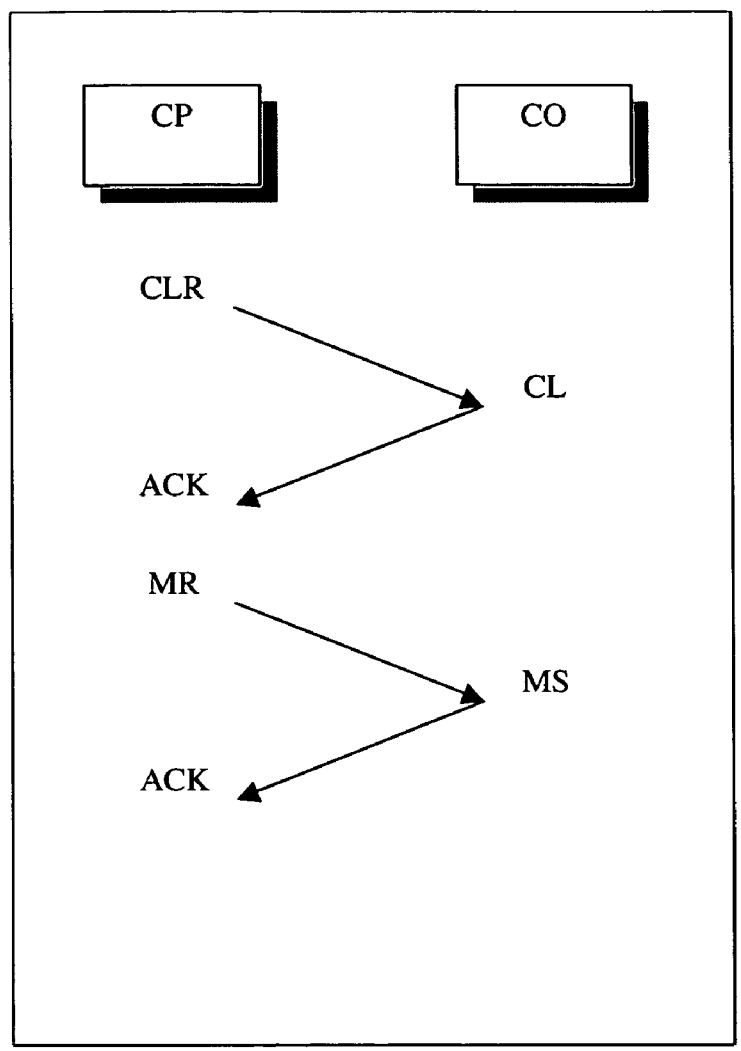
Figure 39. "CO decides" sequence based on G.992.3

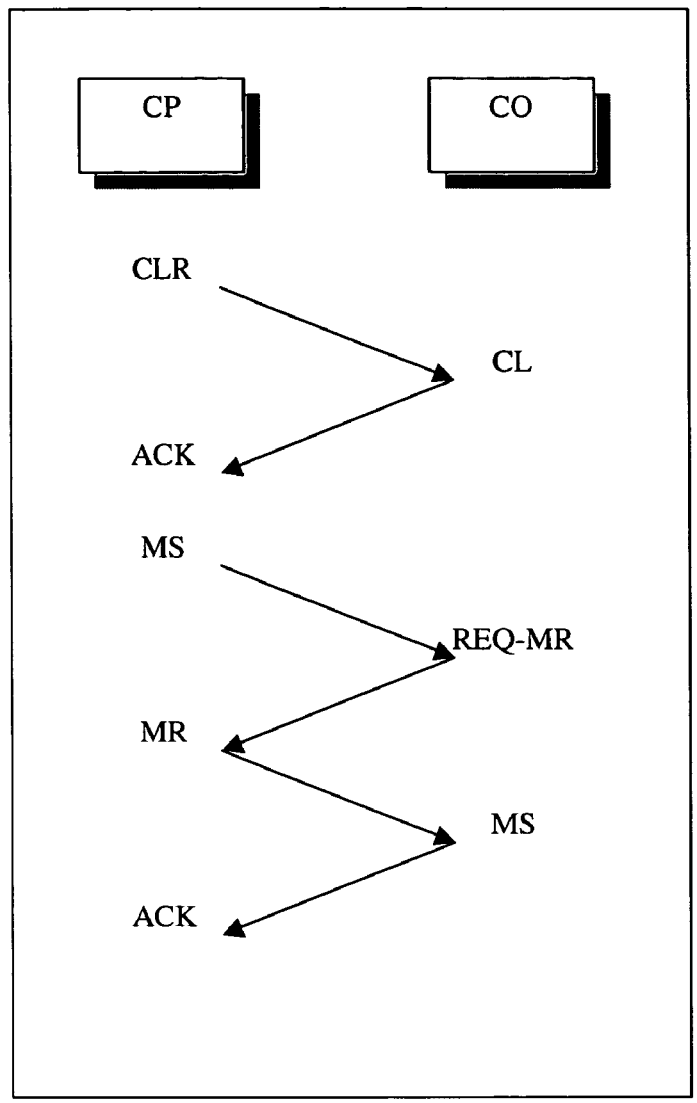
Figure 40. "CP is overruled by CO" sequence

Figure 41. LDSL Downstream Wide Mask and G.992.1 Upstream Mask (Nominal Values)
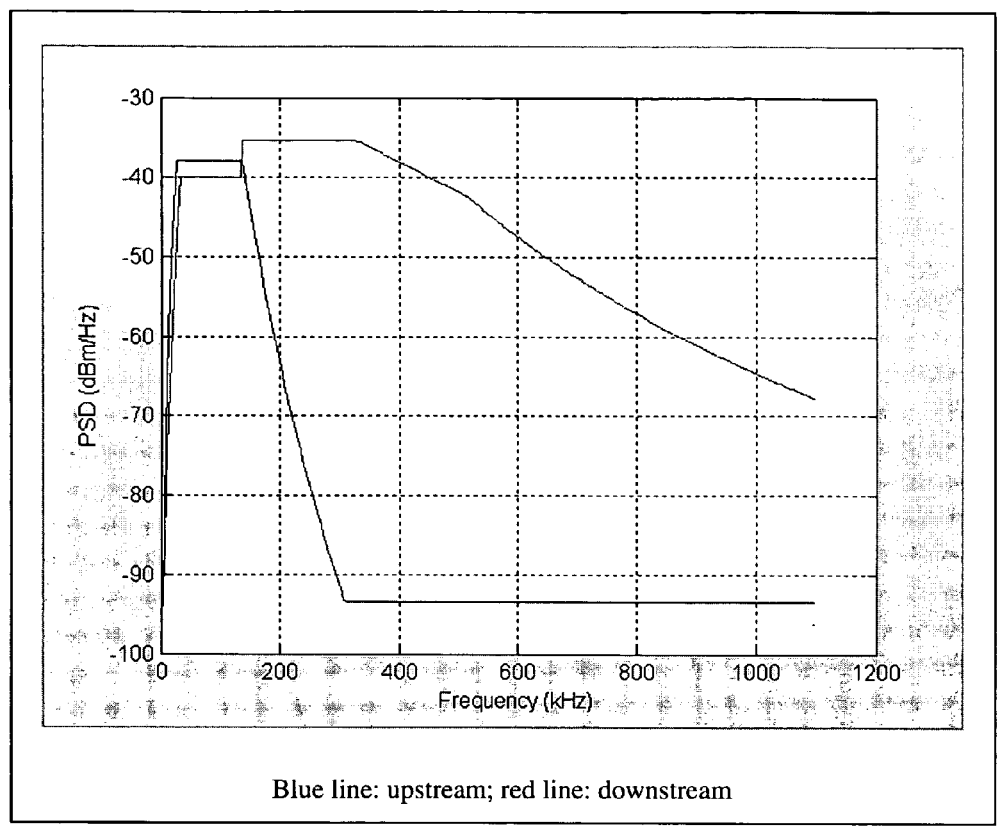
Blue line: upstream; red line: downstream Figure 42. LDSL Downstream Narrow Mask and G.992.1 Upstream Mask
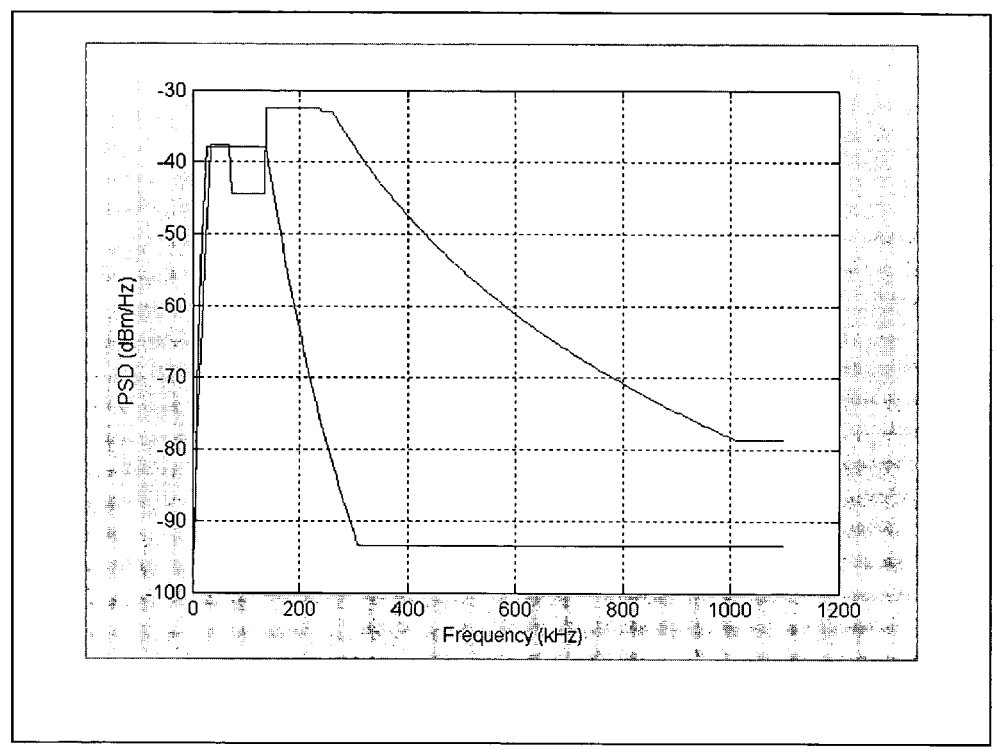
(Nominal Values)

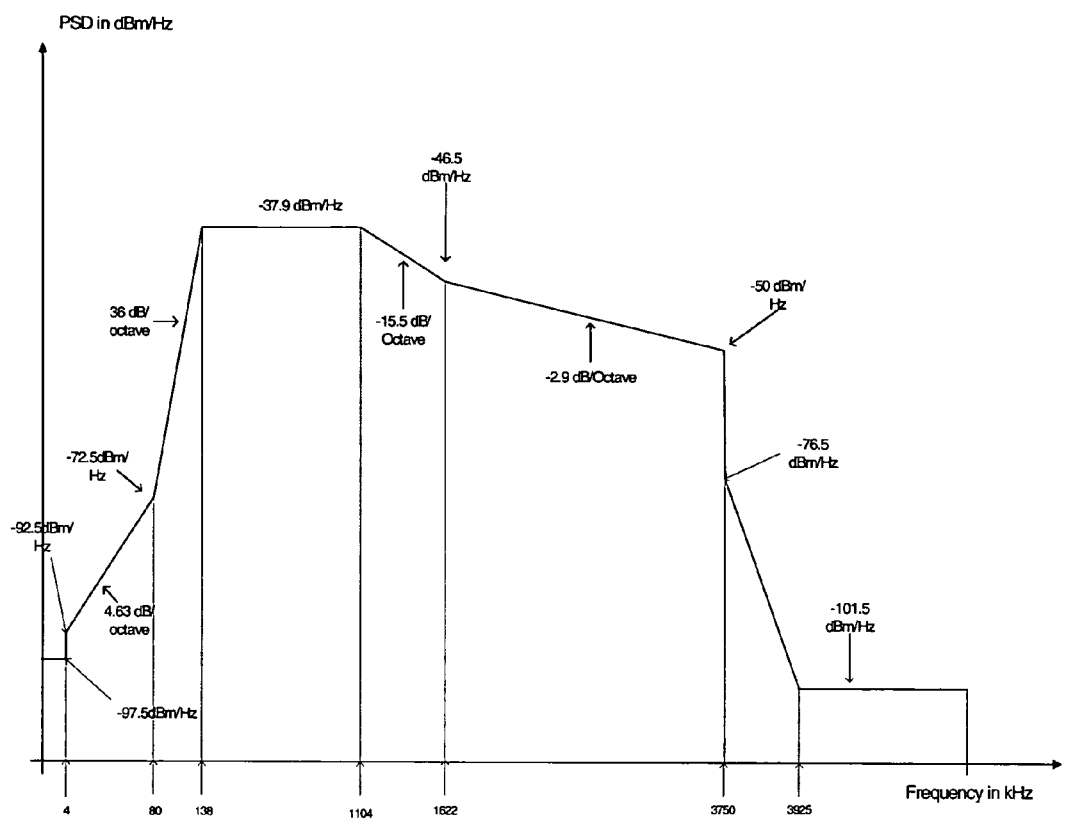
Figure 43. Quad Spectrum Mask Plot, Peak Values

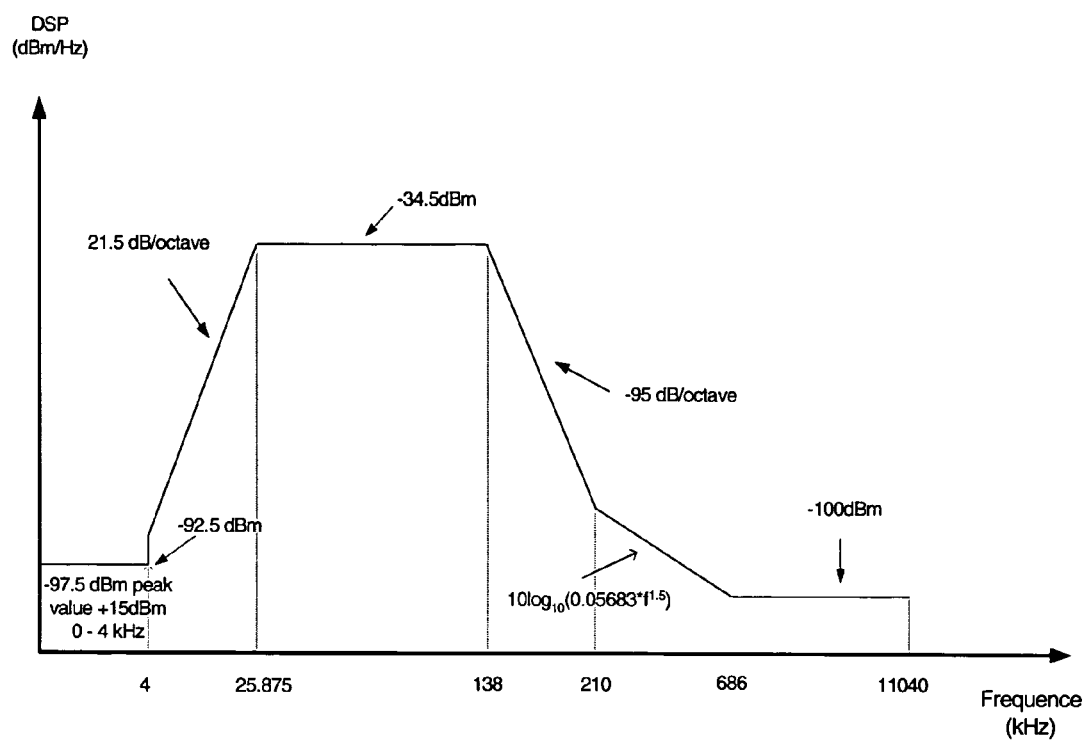
Figure 44. G.992.5 Upstream Mask Plot, Peak Values

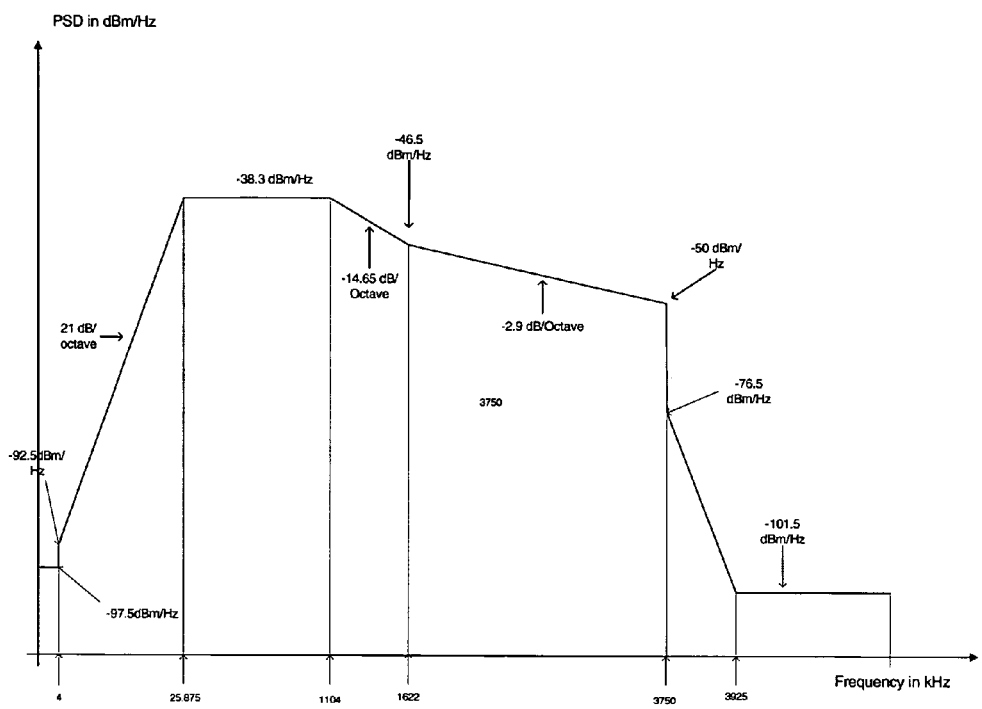
Figure 45. Extended Overlap Quad Spectrum Overlap Downstream Mask, Plot based on Peak Values

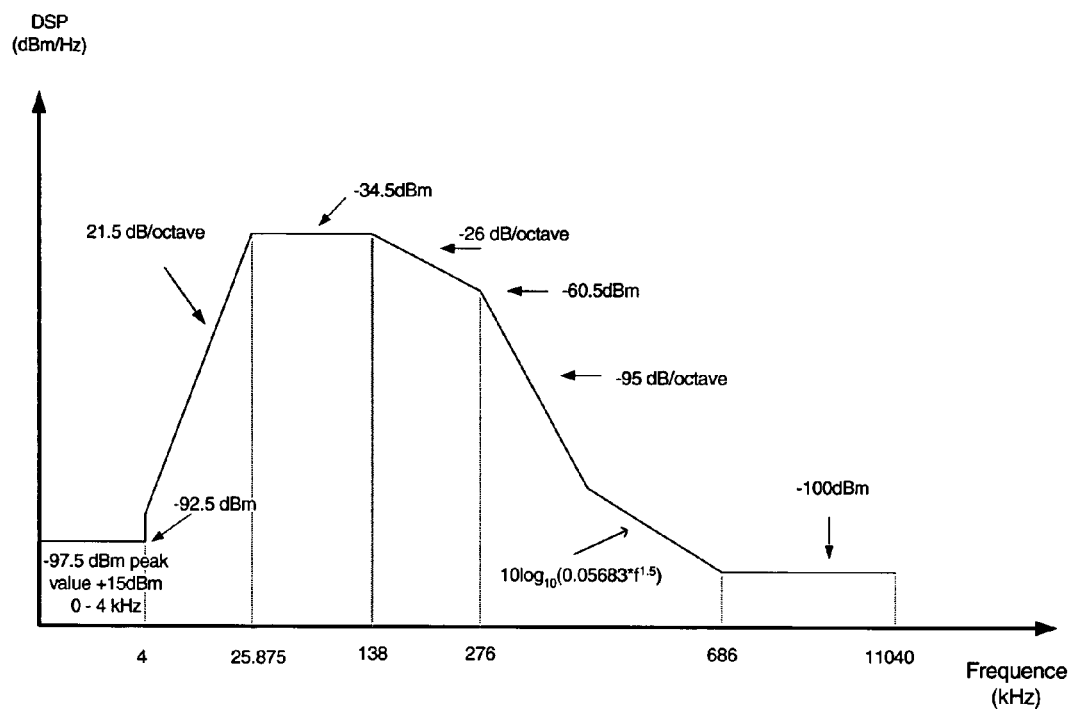
Figure 46. Extended Overlap Quad Spectrum Upstream Mask Plot based on Peak Values

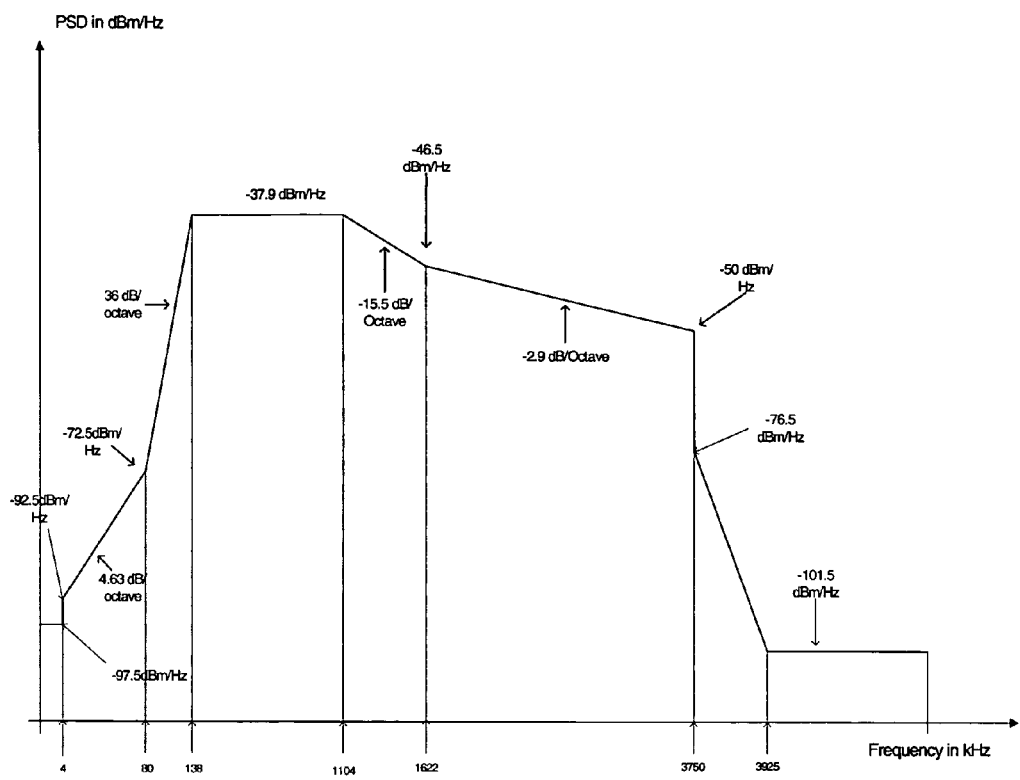
Figure 47. Quad Spectrum Reduced Overlap Downstream Mask Plot based on Peak Values

Figure 48. Extended Upstream Mask Plot based on Peak Values
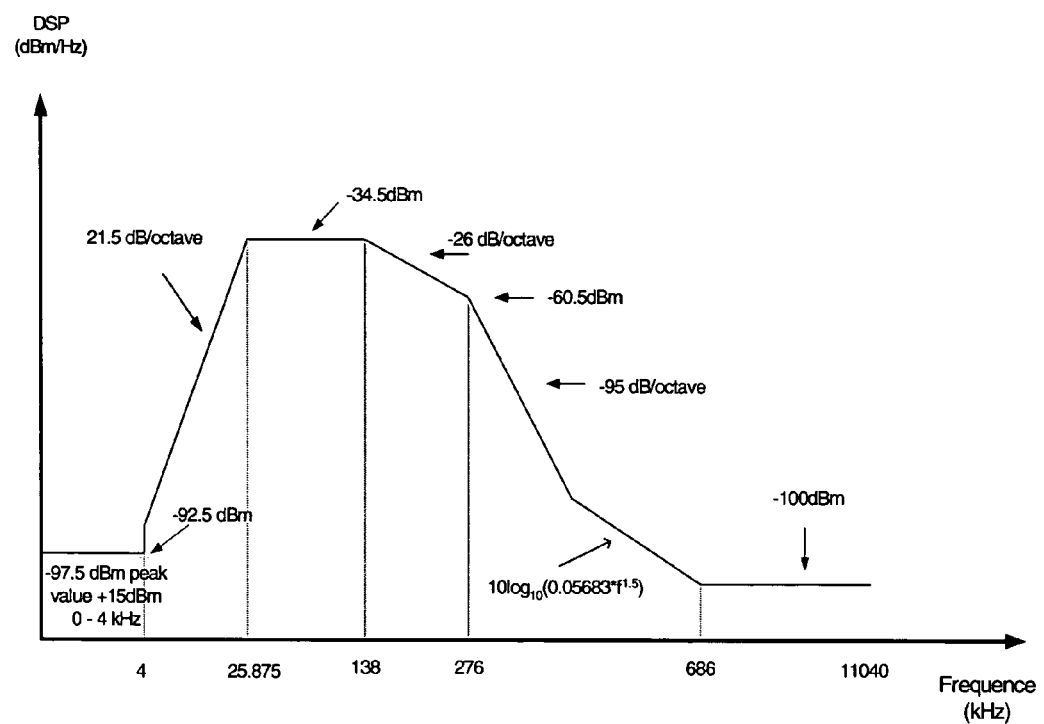

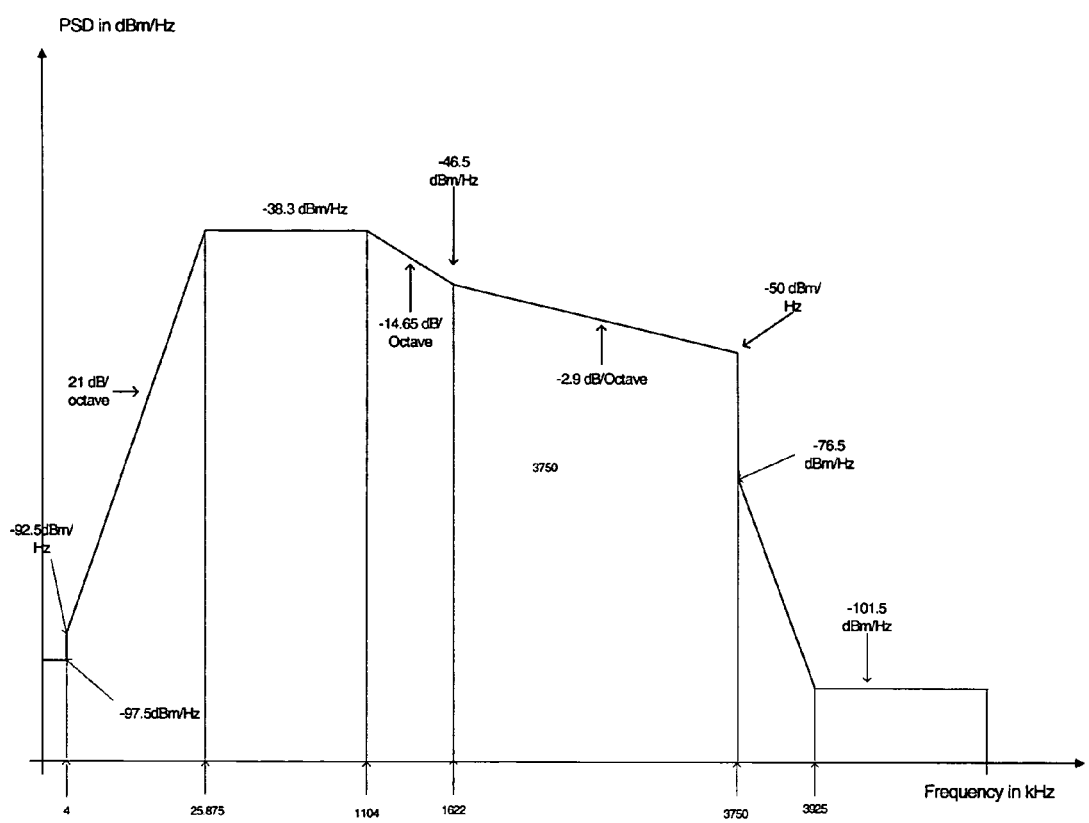
Figure 49. OL Quad Spectrum Downstream Mask Plot, Peak Values

Figure 50. G.992.5 Upstream Mask Plot, Peak Values
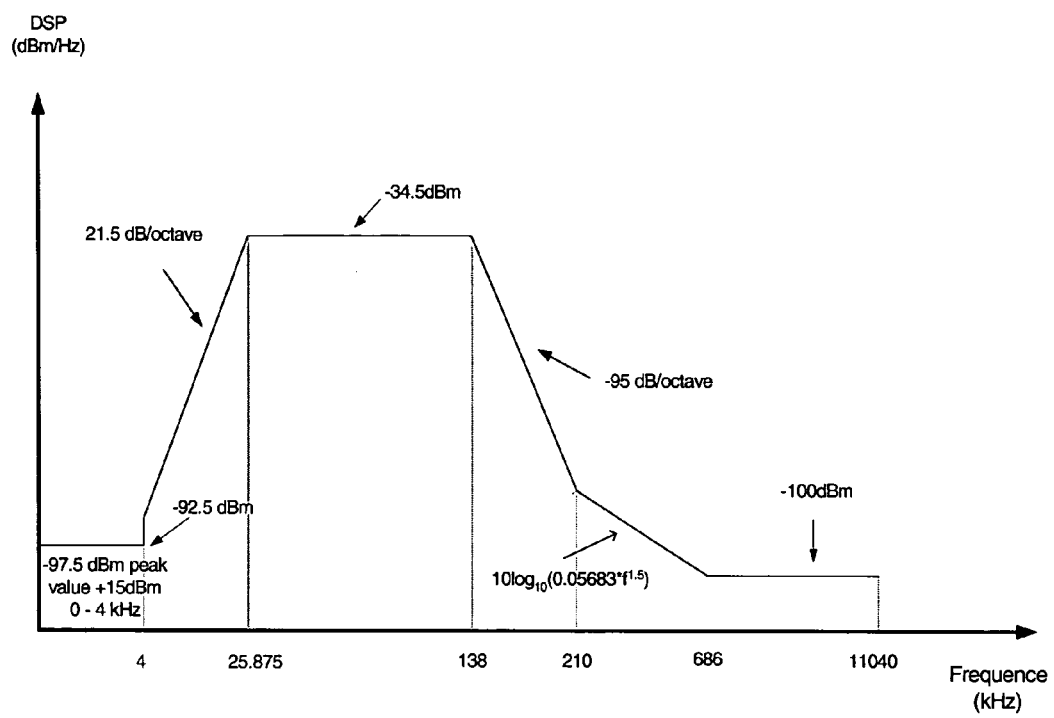

IMPLEMENTATION OF SMART DSL FOR LDSL SYSTEMS

RELATED APPLICATIONS

The present invention claims priority to U.S. Provisional Application Nos. 60/491,268 filed Jul. 31, 2003 and 60/426,796 filed Nov. 18, 2002, the contents of which are incorporated herein by reference in their entirety.

This application is related to copending U.S. patent applications Ser. No. 10/714,907, titled "SYSTEM AND METHOD FOR SELECTABLE MASK FOR LDSL," filed Nov. 18, 2003 which claims priority to U.S. Provisional Application No. 60/441,351, titled "ENHANCED SMART DSL FOR LDSL," and U.S. Provisional Application No. 60/426,796, titled "ENHANCED SMART DSL FOR LDSL," and U.S. patent application Ser. No. 10/714,661, now abandoned, titled "Enhanced Smart DSL for LDSL, filed Nov. 18, 2003 which claim priority to U.S. Provisional Application No. 60/488,804 filed Jul. 22, 2003, all filed concurrently herewith.

BACKGROUND OF THE INVENTION

1. Field of the Invention

This invention relates to digital subscriber lines (DSL) and to smart systems for implementing Long reach Digital Subscriber Lines (LDSL).

2. Description of Related Art

High level procedures for meeting stated objectives for Long reach Digital Subscriber Line (LDSL) transmissions are disclosed. Some objectives for LDSL have been defined in publications available from standards organizations such as the International Telecommunications Union (ITU). For example, ITU publications OC-041R1, OC-045, OC-073R1, OJ-030, OJ-036, OJ-060, OJ-061, OJ-062, OJ-200R1, OJ-200R2, OJ-201, OJ-60R1, OJ-60R2 and OJ-210 set forth some LDSL objectives. Other objectives, standards and criteria for LDSL are also possible and may be accommodated by the disclosed inventions.

One LDSL target objective is to achieve a minimum payload transmission of 192 kb/s downstream and 96 kb/s upstream on loops having an equivalent working length of 18 kft 26 gauge cable in a variety of loop and noise conditions. One difficulty in achieving these target transmission rates is the occurrence of crosstalk noise.

The crosstalk noise environments that may occur for the above bit rate target objective are varied. For example, noise environments may include Near-end cross talk (NEXT), Far-end cross talk (FEXT), disturbance from Integrated Services Digital Networks (ISDN), High Speed Digital Subscriber Line (HDSL), Symmetric High-Bitrate Digital Subscriber Line (SHDSL), T1, and Self-disturbers at both the Central Office (CO) and Customer Premise Equipment (CPE) ends. NEXT from HDSL and SHDSL tend to limit the performance in the upstream channel, while NEXT from repeated T1 Alternate Mark Inversion (AMI) systems tend to severely limit the downstream channel performance. An additional source of noise is loops containing bridged taps that degrade performance on an Asymmetric Digital Subscriber Line (ADSL) downstream channel more so than the upstream channel.

Another drawback of existing systems is that it appears very difficult to determine a single pair of Upstream and Downstream masks that will maximize the performance against any noise-loop field scenario, while ensuring spectral compatibility and, at the same time, keeping a desirable balance between Upstream and Downstream rates.

One approach for LDSL relies on different Upstream and Downstream masks exhibiting complementary features. Realistically, all these chosen masks are available on any LDSL Platform. At the modem start up, based on a certain protocol, the best Upstream-Downstream pair of masks is picked up. Whether the best pair is manually chosen at the discretion of the operator, or automatically selected, this concept is identified as "smart DSL for LDSL".

There are many reasons to implement smart DSL. For example, non-smart DSL systems may implement a single mask for upstream and downstream transmissions. A drawback with this approach is that the use of a single mask may prevent LDSL service in areas of the United States dominated by T1 noise.

In addition, the use of a single mask is a drawback because the existence of other spectrally compatible masks cannot be ruled out. LDSL service providers will want to have access to an array of mask/tools provided they are spectrally compatible. Service providers may decide to use only one mask according to the physical layer conditions, or any combination of masks for the same or other reasons.

Another advantage of Smart DSL is that it is a good way to handle providing LDSL services in different countries. For example, so far, LDSL work has focused on requirements set forth by SBC Communications (hereinafter "SBC"). As a result, it is risky of, for example, a US-based LDSL provider to rely on the ability to apply any masks that pass SBC tests to Europe, China or Korea. LDSL is a difficult project and essential for all the countries. Therefore, any scheme for LDSL standardization that takes into account merely SBC physical layer and cross talk requirements may jeopardize the ADSL reach extension in non-standard LDSL countries. Other drawbacks of current systems also exist.

SUMMARY OF THE INVENTION

A "Smart DSL System" for addressing the performance objectives of LDSL and examples of smart systems for LDSL are disclosed.

In accordance with some embodiments of the invention there is provided a method for implementing smart DSL for LDSL systems. Embodiments of the method may comprise defining a candidate system to be implemented by an LDSL system, optimizing criteria associated with the candidate system, and selecting a candidate system to implement in an LDSL system.

In some embodiments the method may further comprise determining features of upstream transmission and determining one or more of: cut-off frequencies, side lobe shapes, overlap, partial overlap or Frequency Division Duplexing (FDD) characteristics. Other advantages and embodiments of the invention are also disclosed in the following sections.

BRIEF DESCRIPTION OF THE DRAWINGS

FIG. 1 is a graph illustrating peak values for U1 and D1 PSD masks according to embodiments of the invention.

FIG. 2 is a graph illustrating peak values for U2 and D2 PSD masks according to embodiments of the invention.

FIG. 3 is a graph illustrating average values for U3 and D3 PSD templates according to embodiments of the invention.

FIG. 4 is a bar chart illustrating upstream rate, noise case #1, for ADSL2, M OJ-074, NON EC Smart LDSL systems in accordance with embodiments of the invention.

FIG. 5 is a bar chart illustrating upstream rate, noise case #2, ADSL2, M OJ-074, NON EC Smart LDSL systems in accordance with embodiments of the invention.

FIG. 6 is a bar chart illustrating upstream rate, noise case #3, ADSL2, M OJ-074, NON EC Smart LDSL systems in accordance with embodiments of the invention.

FIG. 7 is a bar chart illustrating upstream rate, noise case #4, ADSL2, M OJ-074, NON EC Smart LDSL systems in accordance with embodiments of the invention.

FIG. 8 is a bar chart illustrating upstream rate, noise case #5, ADSL2, M OJ-074, NON EC Smart LDSL systems in accordance with embodiments of the invention.

FIG. 9 is a bar chart illustrating upstream rate, noise case #6, ADSL2, M OJ-074, NON EC Smart LDSL systems in accordance with embodiments of the invention.

FIG. 10 is a bar chart illustrating upstream rate, noise case #7, ADSL2, M OJ-074, NON EC Smart LDSL systems in accordance with embodiments of the invention.

FIG. 11 is a bar chart illustrating upstream rate, noise case #T1, ADSL2, M OJ-074, NON EC Smart LDSL systems in accordance with embodiments of the invention.

FIG. 12 is a bar chart illustrating downstream rate, noise case #1, ADSL2, M OJ-074, NON EC Smart LDSL systems in accordance with embodiments of the invention.

FIG. 13 is a bar chart illustrating downstream rate, noise case #2, ADSL2, M OJ-074, NON EC Smart LDSL systems in accordance with embodiments of the invention.

FIG. 14 is a bar chart illustrating downstream rate, noise case #3, ADSL2, M OJ-074, NON EC Smart LDSL systems in accordance with embodiments of the invention.

FIG. 15 is a bar chart illustrating downstream rate, noise case #4, ADSL2, M OJ-074, NON EC Smart LDSL systems in accordance with embodiments of the invention.

FIG. 16 is a bar chart illustrating downstream rate, noise case #5, ADSL2, M OJ-074, NON EC Smart LDSL systems in accordance with embodiments of the invention.

FIG. 17 is a bar chart illustrating downstream rate, noise case #6, ADSL2, M OJ-074, NON EC Smart LDSL systems in accordance with embodiments of the invention.

FIG. 18 is a bar chart illustrating downstream rate, noise case #7, ADSL2, M OJ-074, NON EC Smart LDSL systems in accordance with embodiments of the invention.

FIG. 19 is a bar chart illustrating downstream rate, noise case #T1, ADSL2, M OJ-074, NON EC Smart LDSL systems in accordance with embodiments of the invention.

FIG. 20 is a bar chart illustrating upstream rate, noise case #1, ADSL2, M OJ-074, EC Smart LDSL systems in accordance with embodiments of the invention.

FIG. 21 is a bar chart illustrating upstream rate, noise case #2, ADSL2, M OJ-074, EC Smart LDSL systems in accordance with embodiments of the invention.

FIG. 22 is a bar chart illustrating upstream rate, noise case #3, ADSL2, M OJ-074, EC Smart LDSL systems in accordance with embodiments of the invention.

FIG. 23 is a bar chart illustrating upstream rate, noise case #4, ADSL2, M OJ-074, EC Smart LDSL systems in accordance with embodiments of the invention.

FIG. 24 is a bar chart illustrating upstream rate, noise case #5, ADSL2, M OJ-074, EC Smart LDSL systems in accordance with embodiments of the invention.

FIG. 25 is a bar chart illustrating upstream rate, noise case #6, ADSL2, M OJ-074, EC Smart LDSL systems in accordance with embodiments of the invention.

FIG. 26 is a bar chart illustrating upstream rate, noise case #7, ADSL2, M OJ-074, EC Smart LDSL systems in accordance with embodiments of the invention.

FIG. 27 is a bar chart illustrating upstream rate, noise case #T1, ADSL2, M OJ-074, EC Smart LDSL systems in accordance with embodiments of the invention.

FIG. 28 is a bar chart illustrating downstream rate, noise case #1, ADSL2, M OJ-074, EC Smart LDSL systems in accordance with embodiments of the invention.

FIG. 29 is a bar chart illustrating downstream rate, noise case #2, ADSL2, M OJ-074, EC Smart LDSL systems in accordance with embodiments of the invention.

FIG. 30 is a bar chart illustrating downstream rate, noise case #3, ADSL2, M OJ-074, EC Smart LDSL systems in accordance with embodiments of the invention.

FIG. 31 is a bar chart illustrating downstream rate, noise case #4, ADSL2, M OJ-074, EC Smart LDSL systems in accordance with embodiments of the invention.

FIG. 32 is a bar chart illustrating downstream rate, noise case #5, ADSL2, M OJ-074, EC Smart LDSL systems in accordance with embodiments of the invention.

FIG. 33 is a bar chart illustrating downstream rate, noise case #6, ADSL2, M OJ-074, EC Smart LDSL systems in accordance with embodiments of the invention.

FIG. 34 is a bar chart illustrating downstream rate, noise case #7, ADSL2, M OJ-074, EC Smart LDSL systems in accordance with embodiments of the invention.

FIG. 35 is a bar chart illustrating downstream rate, noise case #T1, ADSL2, M OJ-074, EC Smart LDSL systems in accordance with embodiments of the invention.

FIG. 36 illustrates a flow diagram for selecting a pair of masks in a smart DSL system in accordance with embodiments of the invention.

FIG. 37 is a state diagram illustrating options for selecting a pair of masks in a smart DSL systems in accordance with embodiments of the invention.

FIG. 38 illustrates an option for implementing smart DSL systems in accordance with embodiments of the invention.

FIG. 39 illustrates an option for implementing smart DSL systems in accordance with embodiments of the invention.

FIG. 40 illustrates an option for implementing smart DSL systems in accordance with embodiments of the invention.

FIG. 41 illustrates LDSL nominal values for downstream wide mask and G.992.1 upstream mask in accordance with embodiments of the invention.

FIG. 42 illustrates LDSL downstream narrow mask and G.992.1 upstream mask in accordance with embodiments of the invention.

FIG. 43 illustrates a peak values quad spectrum mask plot in accordance with embodiments of the invention.

FIG. 44 illustrates G.992.5 peak values upstream mask plot in accordance with embodiments of the invention.

FIG. 45 illustrates extended overlap quad spectrum overlap downstream mask, plot based on peak values in accordance with embodiments of the invention.

FIG. 46 illustrates extended overlap quad spectrum upstream mask plot based on peak values in accordance with embodiments of the invention.

FIG. 47 illustrates quad spectrum reduced overlap downstream mask plot based on peak values in accordance with embodiments of the invention.

FIG. 48 illustrates extended upstream mask plot based on peak values in accordance with embodiments of the invention.

FIG. 49 illustrates OL quad spectrum downstream mask plot, peak values in accordance with embodiments of the invention.

FIG. 50 illustrates G.992.5 peak values upstream mask plot in accordance with embodiments of the invention.

DETAILED DESCRIPTION OF PREFERRED EMBODIMENTS

Smart DSL Concept for LDSL.

This section defines a Smart DSL concept for LDSL. In some embodiments, operating with smart DSL systems for LDSL may include the below listed steps. The first and second steps may be completed, in some embodiments, during a standardization process and other steps may be performed during a modem's handshake/initialization phase in order to optimize the performance for any type of loops and noises.

Step 1. Smart DSL Systems Members for LDSL (S).

In some embodiments it is preferable to complete step 1 during standardization processes. Alternatively, step 1 may be performed off line, for example, if no standardization is at stake.

In some embodiments, the first step consists of defining candidate systems that aim to be picked up based on optimization criteria defined below. Typically, these candidate systems may exhibit sufficient versatility features for both Upstream and Downstream spectra, such as cut off frequencies, side lobes shapes, overlap, partial overlap, FDD characteristics, etc.

In some embodiments it may be desirable for candidate systems to also meet additional constraints. For example, an additional constraint may be that no new channel coding scheme should be considered in the candidate systems. In this manner, smart DSL systems in accordance with the invention exhibit several degrees of freedom that are summarized in what follows by parameter set S.

Step 2. Optimization Criteria (C).

In some embodiments, it is preferable that the second step be completed during the standardization process. Alternatively, the second step may be completed off line if no standardization is at stake.

The second step comprises defining optimization criteria. Optimization criteria drive smart DSL systems members definition and, of course, the performance outcomes. For some embodiments, optimization criteria (C) may be summarized as covering Upstream and Downstream performance targets. In addition, optimization criteria may cover the margin within which performance targets should be met, such as, whether the deployment is Upstream or Downstream limited. The last point is important since often, in order to keep the optimization process simple priority should be given to Upstream or Downstream channels.

In some embodiments, optimization criteria may also comprise spectral compatibility requirements. This criteria may also include assumptions about neighboring services. Other optimization criteria are also possible.

Step 3. Choice of an Optimal System Amongst the Smart DSL Systems Candidates (S*).

In some embodiments it may be preferable to complete step 3 during handshake/initialization. Completing step 3 during handshake/initialization may enable better handling of any type of loops and noise/cross talk conditions. Alternatively, this step could be completed off line, for example, if the operator has accurate prior knowledge of loops and noise conditions.

In some embodiments, completion of step 3 may be as simple as picking up one of two masks already defined. In other embodiments, completion of step 3 may comprise tuning a continuous parameter such as a cut off frequency. Other methods of completing step 3 are also possible.

In some embodiments, the outcome of step 3 may comprise an optimal system (S*) that will be run by the modem in the conditions that lead to its optimality.

Two Examples of Smart DSL System for LDSL, Based on SBC Requirements

EXAMPLE 1

Definition of the Masks to be Used in the Two Smart Systems

Three Upstream masks U1, U2, U3 and three Downstream masks D1, D2, D3 are used in what follows to define embodiments of smart systems. U1 (dashed line) and D1 (solid line) masks are plotted in FIG. 1. Note that in this section the masks for peak values are defined. As defined by some standards, the PSD templates, or average PSD values, are 3.5 dB lower than the mask values. Tables 1 and 2 show some values for U1 and D1 (respectively) according to some embodiments of the invention.

TABLE 1

U1 PSD Mask Definition, peak values

| Frequency Band f (kHz) | Equation for the PSD mask (dBm/Hz) |
|---|---|
| $0 < f \leq 4$ | −97.5, with max power in the in 0-4 kHz band of +15 dBm |
| $4 < f \leq 25.875$ | $-92.5 + 23.43 \times \log_2(f/4)$; |
| $25.875 < f \leq 60.375$ | −29.0 |
| $60.375 < f \leq 90.5$ | $-34.5 - 95 \times \log_2(f/60.375)$ |
| $90.5 < f \leq 1221$ | −90 |
| $1221 < f \leq 1630$ | −99.5 peak, with max power in the [f, f + 1 MHz] window of $(-90 - 48 \times \log_2(f/1221) + 60)$ dBm |
| $1630 < f \leq 11\,040$ | −99.5 peak, with max power in the [f, f + 1 MHz] window of −50 dBm |

TABLE 2

D1 PSD Mask Definition, peak values

| Frequency Band f (kHz) | Equation for the PSD mask (dBm/Hz) |
|---|---|
| $0 < f \leq 4$ | −97.5, with max power in the in 0-4 kHz band of +15 dBm |
| $4 < f \leq 25.875$ | $-92.5 + 20.79 \times \log_2(f/4)$ |
| $25.875 < f \leq 81$ | −36.5 |
| $81 < f \leq 92.1$ | $-36.5 - 70 \times \log_2(f/81)$ |
| $92.1 < f \leq 121.4$ | −49.5 |
| $121.4 < f \leq 138$ | $-49.5 + 70 \times \log_2(f/121.4)$ |
| $138 < f \leq 353.625$ | $-36.5 + 0.0139 \times (f - 138)$ |
| $353.625 < f \leq 569.25$ | −33.5 |
| $569.25 < f \leq 1622.5$ | $-33.5 - 36 \times \log_2(f/569.25)$ |
| $1622.5 < f \leq 3093$ | −90 |
| $3093 < f \leq 4545$ | −90 peak, with maximum power in the [f, f + 1 MHz] window of $(-36.5 - 36 \times \log_2(f/1104) + 60)$dBm |
| $4545 < f \leq 11040$ | −90 peak, with maximum power in the [f, f + 1 MHz] window of −50 dBm |

According to some embodiments of the invention U2 (dashed line) and D2 (solid line) spectrum masks may be plotted as shown in FIG. 2. Note that, as above, the masks for peak values are defined. The PSD templates, or average PSD values, are 3.5 dB lower than the mask values. Tables 3 and 4 show some values for U2 and D2 (respectively) in accordance with some embodiments of the invention.

TABLE 3

U2 Mask Definition, peak values

| Frequency Band f (kHz) | Equation for the PSD mask (dBm/Hz) |
|---|---|
| $0 < f \leq 4$ | −97.5, with max power in the in 0-4 kHz band of +15 dBm |
| $4 < f \leq 25.875$ | $-92.5 - 22.5 \times \log_2(f/4)$; |
| $25.875 < f \leq 86.25$ | −30.9 |
| $86.25 < f \leq 138.6$ | $-34.5 - 95 \times \log_2(f/86.25)$ |
| $138.6 < f \leq 1221$ | −99.5 |
| $1221 < f \leq 1630$ | −99.5 peak, with max power in the [f, f + 1 MHz] window of $(-90 - 48 \times \log_2(f/1221) + 60)$ dBm |
| $1630 < f \leq 11\,040$ | −99.5 peak, with max power in the [f, f + 1 MHz] window of −50 dBm |

TABLE 4

D2 Mask Definition, peak values

| Starting Frequency (kHz) | Starting PSD mask value (dBm/Hz) |
|---|---|
| 0.000000 | −98.000000 |
| 3.990000 | −98.000000 |
| 4.000000 | −92.500000 |
| 80.000000 | −72.500000 |
| 120.740000 | −47.500000 |
| 120.750000 | −37.800000 |
| 138.000000 | −36.800000 |
| 276.000000 | −33.500000 |
| 677.062500 | −33.500000 |
| 956.000000 | −62.000000 |
| 1800.000000 | −62.000000 |
| 2290.000000 | −90.000000 |
| 3093.000000 | −90.000000 |
| 4545.000000 | −110.000000 |
| 12000.000000 | −110.000000 |

Similarly, tables 5 and 6 give the breakpoints of U3 and D3 PSD Templates (average values) in accordance with some embodiments of the invention. FIG. 3 shows U3(dashed line) and D3 (solid line) according to some embodiments of the invention.

TABLE 5

U3 Spectrum PSD Template, average values

| Frequency [KHz] | Nominal Upstream PSD [dBm/Hz] |
|---|---|
| 0 | −101.5 |
| 4 | −101.5 |
| 4 | −96 |
| 25.875 | −36.30 |
| 103.5 | −36.30 |
| 164.1 | −99.5 |
| 1221 | −99.5 |

TABLE 5-continued

U3 Spectrum PSD Template, average values

| Frequency [KHz] | Nominal Upstream PSD [dBm/Hz] |
|---|---|
| 1630 | −113.5 |
| 12000 | −113.5 |

TABLE 6

D3 Spectrum PSD Template, average values

| Frequency [kHz] | Nominal Downstream PSD [dBm/Hz] |
|---|---|
| 0 | −101.5 |
| 4 | −101.5 |
| 4 | −96 |
| 80 | −76 |
| 138 | −47.5 |
| 138 | −40 |
| 276 | −37 |
| 552 | −37 |
| 956 | −65.5 |
| 1800 | −65.5 |
| 2290 | −93.5 |
| 3093 | −93.5 |
| 4545 | −113.5 |
| 12000 | −113.5 |

Smart System Scenario Detection.

In this scenario, it is assumed that the Smart LDSL system has the capability either to analyze a priori the cross talk/physical layer conditions, or to pick up a mask after testing all of them based on performance and spectral compatibility criteria. Under this feature, all the modems located in the same area will detect the same type of cross talk/impairments. Therefore, the worst case catastrophic scenario based on the use of all the possible masks at any location happens to be a completely unrealistic view for a genuine smart system. This feature was incorporated with success in the already deployed smart enhanced Annex C for Japan.

EXAMPLE 1

NON EC Smart LDSL

Definition

In this exemplary embodiment, a first smart system makes use of U1, U2, U3 and D1, D3 masks. According to the features of all these masks, no Echo canceller is required by this embodiment of a smart system that will be identified as NON EC Smart LDSL.

Simulation Results

Tables 7 and 8 gives the ADSL2 upstream and downstream performance for calibration purposes.

TABLE 7

ADSL2 Upstream Channel performance

| | | upstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| ADSL2 | xDSL 10 | 1107 | 1107 | 596 | 294 | 305 | 570 | 646 | 1133 |
| | xDSL 11 | 884 | 884 | 319 | 120 | 130 | 291 | 361 | 894 |
| | xDSL 12 | 846 | 846 | 275 | 90 | 102 | 248 | 314 | 854 |
| | xDSL 13 | 692 | 692 | 142 | 48 | 54 | 99 | 163 | 697 |
| | xDSL 160 | 969 | 969 | 406 | 141 | 157 | 380 | 452 | 986 |
| | xDSL 165 | 925 | 925 | 360 | 116 | 130 | 330 | 404 | 944 |
| | xDSL 170 | 881 | 881 | 313 | 94 | 106 | 287 | 354 | 897 |
| | xDSL 175 | 837 | 837 | 269 | 78 | 89 | 243 | 306 | 851 |
| | xDSL 180 | 798 | 798 | 225 | 63 | 74 | 202 | 266 | 805 |
| | xDSL 185 | 755 | 755 | 185 | 51 | 60 | 162 | 224 | 764 |

TABLE 8

ADSL2 Downstream Channel performance

| | | downstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| ADSL2 | xDSL 10 | 298 | 298 | 305 | 328 | 326 | 307 | 162 | 170 |
| | xDSL 11 | 0 | 0 | 0 | 0 | 0 | 0 | 0 | 0 |
| | xDSL 12 | 0 | 0 | 0 | 0 | 0 | 0 | 0 | 0 |
| | xDSL 13 | 0 | 0 | 0 | 0 | 0 | 0 | 0 | 0 |
| | xDSL 160 | 300 | 300 | 303 | 323 | 321 | 303 | 88 | 91 |
| | xDSL 165 | 201 | 201 | 203 | 224 | 224 | 207 | 43 | 49 |
| | xDSL 170 | 125 | 125 | 113 | 141 | 140 | 123 | 8 | 13 |
| | xDSL 175 | 59 | 66 | 57 | 74 | 74 | 63 | 0 | 0 |
| | xDSL 180 | 0 | 8 | 12 | 17 | 17 | 12 | 0 | 0 |
| | xDSL 185 | 0 | 0 | 0 | 0 | 0 | 0 | 0 | 0 |

Tables 9 and 10 display the results of the Modified OJ-074. These results may be taken as references for LDSL.

TABLE 9

M OJ-074 Upstream Channel Performance Results

| | | upstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| M OJ-074 | xDSL 10 | 839 | 841 | 488 | 300 | 315 | 458 | 510 | 844 |
| | xDSL 11 | 667 | 667 | 312 | 144 | 159 | 283 | 332 | 669 |
| | xDSL 12 | 622 | 623 | 270 | 111 | 124 | 242 | 289 | 624 |
| | xDSL 13 | 496 | 496 | 157 | 59 | 69 | 136 | 176 | 497 |
| | xDSL 160 | 709 | 710 | 353 | 174 | 191 | 324 | 374 | 711 |
| | xDSL 165 | 675 | 675 | 319 | 145 | 161 | 291 | 340 | 677 |
| | xDSL 170 | 641 | 641 | 287 | 120 | 134 | 259 | 307 | 642 |
| | xDSL 175 | 606 | 606 | 255 | 101 | 110 | 227 | 275 | 608 |
| | xDSL 180 | 572 | 572 | 224 | 80 | 92 | 198 | 243 | 573 |
| | xDSL 185 | 537 | 537 | 195 | 66 | 76 | 169 | 212 | 539 |

TABLE 10

M OJ-074 Upstream Channel Performance Results

| | | downstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| M OJ-074 | xDSL 10 | 2396 | 1659 | 1784 | 2023 | 1991 | 1616 | 224 | 436 |
| | xDSL 11 | 997 | 407 | 431 | 861 | 892 | 358 | 0 | 79 |

TABLE 10-continued

M OJ-074 Upstream Channel Performance Results

| | | downstream | | | | | | |
|---|---|---|---|---|---|---|---|---|
| | | case 1<br>Self Next | case 2<br>ADSL | case 3<br>ISDN | case 4<br>SHDSL | case 5<br>HDSL | case 6<br>MIX | case 7<br>TIA | T1 |
| | xDSL 12 | 1202 | 643 | 622 | 974 | 969 | 546 | 0 | 48 |
| | xDSL 13 | 855 | 398 | 449 | 696 | 776 | 350 | 0 | 52 |
| | xDSL 160 | 2048 | 1333 | 1413 | 1752 | 1725 | 1268 | 150 | 331 |
| | xDSL 165 | 1788 | 1086 | 1179 | 1527 | 1518 | 1027 | 92 | 261 |
| | xDSL 170 | 1553 | 875 | 933 | 1326 | 1332 | 809 | 53 | 205 |
| | xDSL 175 | 1343 | 754 | 755 | 1145 | 1163 | 648 | 25 | 152 |
| | xDSL 180 | 1147 | 633 | 694 | 985 | 1011 | 579 | 4 | 111 |
| | xDSL 185 | 978 | 529 | 608 | 840 | 872 | 500 | 0 | 76 |

Tables 11 and 12 give the results of NON EC Smart LDSL system.

TABLE 11

NON EC Smart LDSL Upstream Channel Performance Results

| | | upstream | | | | | | |
|---|---|---|---|---|---|---|---|---|
| | | case 1<br>Self Next | case 2<br>ADSL | case 3<br>ISDN | case 4<br>SHDSL | case 5<br>HDSL | case 6<br>MIX | case 7<br>TIA | T1 |
| NON EC | xDSL 10 | 839 | 841 | 488 | 310 | 324 | 458 | 510 | 851 |
| SMART | xDSL 11 | 667 | 667 | 312 | 179 | 196 | 283 | 332 | 673 |
| | xDSL 12 | 622 | 623 | 270 | 146 | 157 | 242 | 289 | 628 |
| | xDSL 13 | 496 | 496 | 176 | 102 | 110 | 142 | 176 | 500 |
| | xDSL 160 | 709 | 710 | 353 | 206 | 219 | 324 | 374 | 716 |
| | xDSL 165 | 675 | 675 | 319 | 182 | 195 | 291 | 340 | 681 |
| | xDSL 170 | 641 | 641 | 287 | 152 | 168 | 259 | 307 | 646 |
| | xDSL 175 | 606 | 606 | 255 | 136 | 145 | 227 | 275 | 611 |
| | xDSL 180 | 572 | 572 | 226 | 122 | 130 | 198 | 243 | 577 |
| | xDSL 185 | 537 | 537 | 200 | 108 | 116 | 169 | 212 | 542 |

TABLE 12

NON EC Smart LDSL Downstream Channel Performance Results

| | | downstream | | | | | | |
|---|---|---|---|---|---|---|---|---|
| | | case 1<br>Self Next | case 2<br>ADSL | case 3<br>ISDN | case 4<br>SHDSL | case 5<br>HDSL | case 6<br>MIX | case 7<br>TIA | T1 |
| NON EC | xDSL 10 | 2615 | 1711 | 1946 | 2148 | 2169 | 1679 | 224 | 572 |
| SMART | xDSL 11 | 1060 | 407 | 445 | 902 | 958 | 358 | 0 | 135 |
| | xDSL 12 | 1265 | 643 | 634 | 998 | 1025 | 546 | 0 | 105 |
| | xDSL 13 | 885 | 398 | 449 | 705 | 816 | 350 | 0 | 79 |
| | xDSL 160 | 2156 | 1333 | 1466 | 1797 | 1816 | 1268 | 150 | 429 |
| | xDSL 165 | 1885 | 1086 | 1222 | 1572 | 1604 | 1027 | 92 | 349 |
| | xDSL 170 | 1639 | 875 | 967 | 1370 | 1413 | 809 | 53 | 278 |
| | xDSL 175 | 1418 | 754 | 782 | 1187 | 1237 | 648 | 25 | 220 |
| | xDSL 180 | 1213 | 633 | 720 | 1025 | 1079 | 579 | 4 | 169 |
| | xDSL 185 | 1034 | 529 | 629 | 877 | 932 | 500 | 0 | 126 |

Tables 13 and 14 give the selected Upstream and Downstream masks by the smart system. These tables confirm that, for this embodiment, a single mask can't handle all the noise scenarios and all the loops.

TABLE 13

NON EC Smart LDSL: Upstream Selection Table

|  |  | Upstream | | | | | | |
| --- | --- | --- | --- | --- | --- | --- | --- | --- |
|  |  | case 1 Self Next | case 2 ADSL | case 3 ISDN | case 4 SHDSL | case 5 HDSL | case 6 MIX | case 7 TIA | T1 |
| selection index | xDSL 10 | 3 | 3 | 3 | 2 | 2 | 3 | 3 | 3 |
|  | xDSL 11 | 3 | 3 | 3 | 2 | 2 | 3 | 3 | 3 |
|  | xDSL 12 | 3 | 3 | 3 | 1 | 2 | 3 | 3 | 3 |
|  | xDSL 13 | 3 | 3 | 2 | 1 | 1 | 2 | 2 | 3 |
|  | xDSL 160 | 3 | 3 | 3 | 2 | 2 | 3 | 3 | 3 |
|  | xDSL 165 | 3 | 3 | 3 | 2 | 2 | 3 | 3 | 3 |
|  | xDSL 170 | 3 | 3 | 3 | 2 | 2 | 3 | 3 | 3 |
|  | xDSL 175 | 3 | 3 | 3 | 1 | 1 | 3 | 3 | 3 |
|  | xDSL 180 | 3 | 3 | 2 | 1 | 1 | 3 | 3 | 3 |
|  | xDSL 185 | 3 | 3 | 2 | 1 | 1 | 3 | 3 | 3 |

1 = ends at ~60 KHz,
2 = ends at ~86 KHz,
3 = ends at ~103 KHz

TABLE 14

NON EC Smart LDSL: Downstream Selection Table

|  |  | Downstream | | | | | | |
| --- | --- | --- | --- | --- | --- | --- | --- | --- |
|  |  | case 1 Self Next | case 2 ADSL | case 3 ISDN | case 4 SHDSL | case 5 HDSL | case 6 MIX | case 7 TIA | T1 |
| selection index | xDSL 10 | 1 | 1 | 1 | 1 | 1 | 1 | 2 | 1 |
|  | xDSL 11 | 1 | 2 | 1 | 1 | 1 | 2 | 1 | 1 |
|  | xDSL 12 | 1 | 2 | 1 | 1 | 1 | 2 | 1 | 1 |
|  | xDSL 13 | 1 | 2 | 2 | 1 | 1 | 2 | 1 | 1 |
|  | xDSL 160 | 1 | 2 | 1 | 1 | 1 | 2 | 2 | 1 |
|  | xDSL 165 | 1 | 2 | 1 | 1 | 1 | 2 | 2 | 1 |
|  | xDSL 170 | 1 | 2 | 1 | 1 | 1 | 2 | 2 | 1 |
|  | xDSL 175 | 1 | 2 | 1 | 1 | 1 | 2 | 2 | 1 |
|  | xDSL 180 | 1 | 2 | 1 | 1 | 1 | 2 | 2 | 1 |
|  | xDSL 185 | 1 | 2 | 1 | 1 | 1 | 2 | 1 | 1 |

1 = starts at ~120 KHz;
2 = starts at ~138 KHz

Tables 15 and 16 provide the performance improvement inherent to the NON EC Smart LDSL versus M OJ-074. As can be seen from the tables, this embodiment of a smart system performs better than the system disclosed in M OJ-074. This embodiment of a smart system compensates for the M OJ-074 Upstream channel weaknesses in the presence of SHDSL and HDSL.

TABLE 15

(NON EC SMART LDSL US rate - M OJ074 US rate) upstream difference with M OJ-074

| case 1 Self Next | case 2 ADSL | case 3 ISDN | case 4 SHDSL | case 5 HDSL | case 6 MIX | case 7 TIA | T1 |
| --- | --- | --- | --- | --- | --- | --- | --- |
| 0 | 0 | 0 | 10 | 9 | 0 | 0 | 7 |
| 0 | 0 | 0 | 35 | 37 | 0 | 0 | 4 |
| 0 | 0 | 0 | 35 | 33 | 0 | 0 | 4 |
| 0 | 0 | 19 | 43 | 41 | 6 | 0 | 3 |
| 0 | 0 | 0 | 32 | 28 | 0 | 0 | 5 |
| 0 | 0 | 0 | 37 | 34 | 0 | 0 | 4 |
| 0 | 0 | 0 | 32 | 34 | 0 | 0 | 4 |
| 0 | 0 | 0 | 35 | 35 | 0 | 0 | 3 |
| 0 | 0 | 2 | 42 | 38 | 0 | 0 | 4 |
| 0 | 0 | 5 | 42 | 40 | 0 | 0 | 3 |

TABLE 16

(NON EC SMART LDSL DS rate - M OJ074 DS rate) downstream difference with M OJ-074

| case 1 Self Next | case 2 ADSL | case 3 ISDN | case 4 SHDSL | case 5 HDSL | case 6 MIX | case 7 TIA | T1 |
| --- | --- | --- | --- | --- | --- | --- | --- |
| 219 | 52 | 162 | 125 | 178 | 63 | 0 | 136 |
| 63 | 0 | 14 | 41 | 66 | 0 | 0 | 56 |
| 63 | 0 | 12 | 24 | 56 | 0 | 0 | 57 |
| 30 | 0 | 0 | 9 | 40 | 0 | 0 | 27 |
| 108 | 0 | 53 | 45 | 91 | 0 | 0 | 98 |
| 97 | 0 | 43 | 45 | 86 | 0 | 0 | 88 |
| 86 | 0 | 34 | 44 | 81 | 0 | 0 | 73 |
| 75 | 0 | 27 | 42 | 74 | 0 | 0 | 68 |
| 66 | 0 | 26 | 40 | 68 | 0 | 0 | 58 |
| 56 | 0 | 21 | 37 | 60 | 0 | 0 | 50 |

FIGS. 4-19 show bar chart performance plots of ADSL2, non-EC smart LDSL and the system disclosed in M OJ-074, for the above described noise cases.

EC Smart LDSL System

Definition

As described above, a first exemplary smart system may make use of U1, U2, U3 and D2, D3. In accordance with the features of all these masks, an Echo canceller may be advantageous when D2 is used. A second exemplary smart system may be identified as the EC Smart LDSL. For this embodiment, the Smart LDSL system may have the capability to analyze a priori the cross talk/physical layer conditions for all the Smart LDSL modems located in the same area. In addition the system may detect the same type of cross talks/impairments and, therefore, the worst case self NEXT due to the Downstream mask D2 may only apply when this mask is used.

EC Smart LDSL: Simulation Results

TABLE 17

EC Smart LDSL Upstream Channel Performance Results

| | | upstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 839 | 841 | 488 | 310 | 324 | 458 | 456 | 423 |
| | xDSL 11 | 667 | 667 | 312 | 179 | 196 | 283 | 280 | 253 |
| | xDSL 12 | 622 | 623 | 270 | 146 | 157 | 242 | 239 | 214 |
| | xDSL 13 | 496 | 496 | 176 | 102 | 110 | 142 | 135 | 130 |
| | xDSL 160 | 709 | 710 | 353 | 206 | 219 | 324 | 321 | 291 |
| | xDSL 165 | 675 | 675 | 319 | 182 | 195 | 291 | 288 | 259 |
| | xDSL 170 | 641 | 641 | 287 | 152 | 168 | 259 | 256 | 229 |
| | xDSL 175 | 606 | 606 | 255 | 136 | 145 | 227 | 225 | 200 |
| | xDSL 180 | 572 | 572 | 226 | 122 | 130 | 198 | 195 | 168 |
| | xDSL 185 | 537 | 537 | 200 | 108 | 116 | 169 | 166 | 139 |

TABLE 18

EC Smart LDSL Downstream Channel Performance Results

| | | Downstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 2615 | 1711 | 1946 | 2148 | 2169 | 1679 | 381 | 719 |
| | xDSL 11 | 1060 | 407 | 445 | 902 | 958 | 358 | 54 | 193 |
| | xDSL 12 | 1265 | 643 | 634 | 998 | 1025 | 546 | 38 | 140 |
| | xDSL 13 | 885 | 398 | 449 | 705 | 816 | 350 | 18 | 80 |
| | xDSL 160 | 2156 | 1333 | 1466 | 1797 | 1816 | 1268 | 216 | 476 |
| | xDSL 165 | 1885 | 1086 | 1222 | 1572 | 1604 | 1027 | 140 | 388 |
| | xDSL 170 | 1639 | 875 | 967 | 1370 | 1413 | 809 | 86 | 308 |
| | xDSL 175 | 1418 | 754 | 782 | 1187 | 1237 | 648 | 62 | 237 |
| | xDSL 180 | 1213 | 633 | 720 | 1025 | 1079 | 579 | 28 | 181 |
| | xDSL 185 | 1034 | 529 | 629 | 877 | 932 | 500 | 20 | 127 |

TABLE 19

EC Smart LDSL: Upstream Selection Table

| | | Upstream | | | | | | |
|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC SMART LDSL | xDSL 10 | 3 | 3 | 3 | 2 | 2 | 3 | 3 | 3 |
| | xDSL 11 | 3 | 3 | 3 | 2 | 2 | 3 | 3 | 3 |
| | xDSL 12 | 3 | 3 | 3 | 1 | 2 | 3 | 3 | 3 |
| | xDSL 13 | 3 | 3 | 2 | 1 | 1 | 2 | 2 | 1 |
| | xDSL 160 | 3 | 3 | 3 | 2 | 2 | 3 | 3 | 3 |
| | xDSL 165 | 3 | 3 | 3 | 2 | 2 | 3 | 3 | 3 |
| | xDSL 170 | 3 | 3 | 3 | 2 | 2 | 3 | 3 | 3 |
| | xDSL 175 | 3 | 3 | 3 | 1 | 1 | 3 | 3 | 3 |
| | xDSL 180 | 3 | 3 | 2 | 1 | 1 | 3 | 3 | 2 |
| | xDSL 185 | 3 | 3 | 2 | 1 | 1 | 3 | 3 | 2 |

1 = ends at ~60 KHz,
2 = ends at ~86 KHz,
3 = ends at ~103 KHz

TABLE 20

EC Smart LDSL: Downstream Selection Table

| | | Downstream | | | | | | | |
|---|---|---|---|---|---|---|---|---|---|
| | | case 1 Self Next | case 2 ADSL | case 3 ISDN | case 4 SHDSL | case 5 HDSL | case 6 MIX | case 7 TIA | T1 |
| EC | xDSL 10 | 2 | 2 | 2 | 2 | 2 | 2 | 1 | 1 |
| SMART | xDSL 11 | 2 | 3 | 2 | 2 | 2 | 3 | 1 | 1 |
| LDSL | xDSL 12 | 2 | 3 | 2 | 2 | 2 | 3 | 1 | 1 |
| | xDSL 13 | 2 | 3 | 3 | 2 | 2 | 3 | 1 | 1 |
| | xDSL 160 | 2 | 3 | 2 | 2 | 2 | 3 | 1 | 1 |
| | xDSL 165 | 2 | 3 | 2 | 2 | 2 | 3 | 1 | 1 |
| | xDSL 170 | 2 | 3 | 2 | 2 | 2 | 3 | 1 | 1 |
| | xDSL 175 | 2 | 3 | 2 | 2 | 2 | 3 | 1 | 1 |
| | xDSL 180 | 2 | 3 | 2 | 2 | 2 | 3 | 1 | 1 |
| | xDSL 185 | 2 | 3 | 2 | 2 | 2 | 3 | 1 | 1 |

1 = starts at ~120 KHz;
2 = starts at ~138 KHz

TABLE 21

(EC SMART LDSL US rate - M OJ074 US rate)
upstream difference with M OJ-074

| case 1 Self Next | case 2 ADSL | case 3 ISDN | case 4 SHDSL | case 5 HDSL | case 6 MIX | case 7 TIA | T1 |
|---|---|---|---|---|---|---|---|
| 0 | 0 | 0 | 10 | 9 | 0 | −54 | −421 |
| 0 | 0 | 0 | 35 | 37 | 0 | −52 | −416 |
| 0 | 0 | 0 | 35 | 33 | 0 | −50 | −410 |
| 0 | 0 | 19 | 43 | 41 | 6 | −41 | −367 |
| 0 | 0 | 0 | 32 | 28 | 0 | −53 | −420 |
| 0 | 0 | 0 | 37 | 34 | 0 | −52 | −418 |
| 0 | 0 | 0 | 32 | 34 | 0 | −51 | −413 |
| 0 | 0 | 0 | 35 | 35 | 0 | −50 | −408 |
| 0 | 0 | 2 | 42 | 38 | 0 | −48 | −405 |
| 0 | 0 | 5 | 42 | 40 | 0 | −46 | −400 |

TABLE 22

(EC SMART LDSL DS rate - M OJ074 DS rate)
downstream difference with M OJ-074

| case 1 Self Next | case 2 ADSL | case 3 ISDN | case 4 SHDSL | case 5 HDSL | case 6 MIX | case 7 TIA | T1 |
|---|---|---|---|---|---|---|---|
| 219 | 52 | 162 | 125 | 178 | 63 | 157 | 283 |
| 63 | 0 | 14 | 41 | 66 | 0 | 54 | 114 |
| 63 | 0 | 12 | 24 | 56 | 0 | 38 | 92 |
| 30 | 0 | 0 | 9 | 40 | 0 | 18 | 28 |
| 108 | 0 | 53 | 45 | 91 | 0 | 66 | 145 |
| 97 | 0 | 43 | 45 | 86 | 0 | 48 | 127 |
| 86 | 0 | 34 | 44 | 81 | 0 | 33 | 103 |
| 75 | 0 | 27 | 42 | 74 | 0 | 37 | 85 |
| 66 | 0 | 26 | 40 | 68 | 0 | 24 | 70 |
| 56 | 0 | 21 | 37 | 60 | 0 | 20 | 51 |

FIGS. 20-35 show bar chart performance plots of ADSL2, EC smart LDSL and the system disclosed in M OJ-074, for the above described noise cases.

Smart DSL Implementation Based on ITU-T Recommendation G.992.3

Two Steps

Deciding to access one of the mask amongst all the possible choices offered by a smart DSL platform may be facilitated by using a two step process in the following order:

(1) Masks Choice based on Performance/Physical layer status criterion: Smart functionality; and (2) Protocol to activate one particular mask based on CP/CO capabilities.

Step (1): Mask Choice Based on Performance/Physical Layer Status: Smart Functionality.

FIG. 36 displays the org chart that describes the two selection modes inherent to smart DSL: manual or automatic.

The automatic selection may be completed in two different ways: by making use of the Line Probing capabilities of G.992.3 (LP Option) or by trying different masks up to the training and choosing at the end the best (Many Tests Option). FIG. 37 gives the state diagram of the two approaches to automatically select a pair of mask for a smart DSL platform.

The LP option needs to complete the right loop of operations in FIG. 37 one time only. The Many tests option requires to complete the left loop of operations in FIG. 37 as many times as the number of available possibilities.

Step 2: Protocol to Activate One Mask Based on CO/CP Capabilities.

This section discloses three protocol examples to activate one mask based on CO/CP capabilities.

Option 1: CP Decides

FIG. 38 describes the "CP decides" which mask is to be used sequence, based on G.992.3. CLR and CL allow CP and CO to signify their list of capabilities.

Option 2: CO Decides

FIG. 39 describes the "CO decides" which mask is to be used sequence, based on G.992.3, after being requested by the CP to do so. CLR and CL allow CP and CO to signify their list of capabilities.

Option 3: CP is Overruled by CO

FIG. 40 describes the "CO overrules CP" about which mask is to be used sequence, based on G.992.3, after CP has mentioned which mask is to be used CLR and CL allow CP and CO to signify their list of capabilities.

LDSL Wide and Narrow Downstream Masks

The following evaluates the spectral compatibility of two LDSL modes based on two different downstream masks identified herein as LDSL Wide and Narrow and a known same G.992.1 upstream mask. Spectral compatibility is evaluated according to the 2003 Soumusho updated rules. Other compatibility rules may also be used.

Some LDSL Wide and Narrow modes of operation are spectrally compatible with protected systems in Japan, known as TCM-ISDN, Annex A G.992.1 and G.992.2, Annex C DBM G.992.1 and G.992.2, Annex C FBM G.992.1 and G.992.2.

As noted above, both LDSL modes of operation may make use of a single upstream mask preferably identical to the G.992.1 PSD (power spectral density) Upstream Mask. The LDSL Wide and Narrow modes may be based on two different downstream masks identified herein as the LDSL Downstream Wide Mask and LDSL Downstream Narrow Mask, respectively.

Note that the values provided in the following FIGS. 41 and 42 and in Tables 35-40 are approximate, or mean values, and may have a variance of up to 10%.

FIG. 41 displays the LDSL Downstream Wide Mask and the G.992.1 Upstream Nominal Mask. Table 23 provides exemplary LDSL Downstream Wide Mask peak values. Note that the values provided in Table 23 are approximate, or mean values, and may have a variance of 10% or more.

FIG. 42 displays the LDSL Downstream Narrow Mask and the G.992.1 Upstream Nominal Mask. Table 24 provides exemplary LDSL Downstream Narrow Mask peak values.

LDSL Wide Mode, as defined herein, combines the use of the G.992.1 Upstream Mask and the LDSL Wide Downstream Mask defined above. Table 25 provides the spectral compatibility impact of LDSL Wide Mode with upstream channels of protected systems. Table 25 further gives also the reference numbers. It may be derived from Table 25 that LDSL Wide Mode is always spectrally compatible with the upstream channels of protected systems.

Table 26 provides the spectral compatibility impact of the LDSL Wide Mode with downstream channels of protected systems. Table 26 also gives the reference numbers. It may be derived from Table 26 that LDSL Wide Mode is always spectrally compatible with the downstream channels of protected systems.

LDSL Narrow Mode, as defined herein, combines the G.992.1 Upstream Mask and the LDSL Narrow Mask described above. Table 27 provides the spectral compatibility impact of the LDSL Narrow Mode with upstream channels of protected systems. Table 27 also provides the reference numbers. It may be derived from Table 27 that the LDSL Narrow Mode is always spectrally compatible with the upstream channels of protected systems.

Table 28 provides the spectral compatibility impact of the LDSL Narrow Mode with downstream channels of protected systems. Table 28 also provides the reference numbers. It may be derived from Table 28 that the LDSL Narrow Mode is always spectrally compatible with the downstream channels of protected systems.

Based on the above, it may be shown that both LDSL Wide and Narrow modes of operation are spectrally compatible with protected systems in Japan.

TABLE 23

LDSL Downstream Wide Mask Peak Values

| Frequency f (KHz) | PSD (dBm/Hz) Peak values |
|---|---|
| $0 < f \leq 4$ | −97.5, with max power in the in 0-4 kHz band of +15 dBm |
| $4 < f \leq 5$ | $-92.5 + 18.64 \log 2(f/4)$ |
| $5 < f \leq 5.25$ | −86.5 |
| $5.25 < f \leq 16$ | $-86.5 + 15.25 \log 2(f/5.25)$ |
| $16 < f \leq 32$ | $-62 + 25.5 \log 2(f/16)$ |
| $32 < f \leq 138$ | −36.5 |

TABLE 23-continued

LDSL Downstream Wide Mask Peak Values

| Frequency f (KHz) | PSD (dBm/Hz) Peak values |
|---|---|
| $138 < f \leq 323.4375$ | −31.8 |
| $323.4375 < f \leq 517.5$ | $-31.8 - 0.0371 \times (f - 323.4375)$ |
| $258.75 < f \leq 1800$ | $\max(-39 - 23.27 \times \log_2 (f/517.5), -65)$ |
| $1800 < f \leq 2290$ | $-65 - 72 \times \log_2 (f/1800)$ |
| $2290 < f \leq 3093$ | −90 |
| $3093 < f \leq 4545$ | −90 peak, with max power in the [f, f + 1 MHz] window of $(-36.5 - 36 \times \log_2 (f/1104) + 60)$ dBm |
| $4545 < f \leq 11\,040$ | −90 peak, with max power in the [f, f + 1 MHz] window of −50 dBm |

NOTE 1
All PSD measurements are in 100 Ω; the POTS band total power measurement is in 600 Ω.
NOTE 2
The breakpoint frequencies and PSD values are exact; the indicated slopes are approximate.
NOTE 3
Above 25.875 kHz, the peak PSD shall be measured with a 10 kHz resolution bandwidth.
NOTE 4
The power in a 1 MHz sliding window is measured in a 1 MHz bandwidth, starting at the measurement frequency.
NOTE 5
The step in the PSD mask at 4 kHz is to protect V.90 performance. Originally, the PSD mask continued the 21 dB/octave slope below 4 kHz hitting a floor of −97.5 dBm/Hz at 3400 Hz. It was recognized that this might impact V.90 performance, and so the floor was extended to 4 kHz.
NOTE 6
All PSD and power measurements shall be made at the U-C interface (see FIG. 5-4 and FIG. 5-5); the signals delivered to the PSTN are specified in Annex E.
NOTE 7
frequencies are in kHz in the formulas.

TABLE 24

LDSL Downstream Wide Mask Peak Values

| Frequency f (KHz) | PSD (dBm/Hz) Peak values |
|---|---|
| $0 < f \leq 4$ | −97.5, with max power in the in 0-4 kHz band of +15 dBm |
| $4 < f \leq 5$ | $-92.5 + 18.64 \log 2(f/4)$ |
| $5 < f \leq 5.25$ | −86.5 |
| $5.25 < f \leq 16$ | $-86.5 + 15.25 \log 2(f/5.25)$ |
| $16 < f \leq 32$ | $-62 + 25.5 \log 2(f/16)$ |
| $32 < f \leq 73.3125$ | −34 |
| $73.3125 < f \leq 138$ | −40.9 |
| $138 < f \leq 237.1875$ | −28.9 |
| $237.1875 < f \leq 258.75$ | −29.5 |
| $258.75 < f \leq 1800$ | $\max(-29.5 - 23.27 \times \log_2 (f/258.75), -65)$ |
| $1800 < f \leq 2290$ | $-65 - 72 \times \log_2 (f/1800)$ |
| $2290 < f \leq 3093$ | −90 |
| $3093 < f \leq 4545$ | −90 peak, with max power in the [f, f + 1 MHz] window of $-36.5 - 36 \times \log_2 (f/1104) + 60)$ dBm |
| $4545 < f \leq 11.040$ | −90 peak, with max power in the [f, f + 1 MHz] window of −50 dBm |

NOTE 1
All PSD measurements are in 100 Ω; the POTS band total power measurement is in 600 Ω.
NOTE 2
The breakpoint frequencies and PSD values are exact; the indicated slopes are approximate.
NOTE 3
Above 25.875 kHz, the peak PSD shall be measured with a 10 kHz resolution bandwidth.
NOTE 4
The power in a 1 MHz sliding window is measured in a 1 MHz bandwidth, starting at the measurement frequency.
NOTE 5

TABLE 24-continued

LDSL Downstream Wide Mask Peak Values

| Frequency f (KHz) | PSD (dBm/Hz) Peak values |
|---|---|

The step in the PSD mask at 4 kHz is to protect V.90 performance. Originally, the PSD mask continued the 21 dB/octave slope below 4 kHz hitting a floor of −97.5 dBm/Hz at 3400 Hz. It was recognized that this might impact V.90 performance, and so the floor was extended to 4 kHz.
NOTE 6

TABLE 24-continued

LDSL Downstream Wide Mask Peak Values

| Frequency f (KHz) | PSD (dBm/Hz) Peak values |
|---|---|

All PSD and power measurements shall be made at the U-C interface (see FIG. 5-4 and FIG. 5-5); the signals delivered to the PSTN are specified in Annex E.
NOTE 7
frequencies are in kHz in the formulas.

TABLE 25

LDSL Wide Mode Upstream Spectral Compatibility vs Reference numbers

| km | TCM_ISDN ref | TCM_ISDN actual | A ref | A actual | A_lite ref | A_lite actual | C_DBM ref | C_DBM actual | C_DBM_lite ref | C_DBM_lite actual | C_FBM ref | C_FBM actual | C_FBM_lite ref | C_FBM_lite actual |
|---|---|---|---|---|---|---|---|---|---|---|---|---|---|---|
| 0.5 | 61 | 68 | 832 | 832 | 832 | 832 | 832 | 832 | 832 | 832 | 288 | 288 | 288 | 288 |
| 0.75 | 58 | 66 | 832 | 832 | 832 | 832 | 832 | 832 | 832 | 832 | 288 | 288 | 288 | 288 |
| 1.0 | 55 | 65 | 832 | 832 | 832 | 832 | 832 | 832 | 832 | 832 | 288 | 288 | 288 | 288 |
| 1.25 | 52 | 64 | 800 | 832 | 800 | 832 | 800 | 832 | 800 | 832 | 288 | 288 | 288 | 288 |
| 1.5 | 49 | 63 | 768 | 832 | 768 | 832 | 800 | 832 | 800 | 832 | 288 | 288 | 288 | 288 |
| 1.75 | 46 | 63 | 736 | 800 | 736 | 800 | 768 | 800 | 768 | 800 | 288 | 288 | 288 | 288 |
| 2.0 | 43 | 62 | 704 | 768 | 704 | 768 | 736 | 800 | 736 | 800 | 288 | 288 | 288 | 288 |
| 2.25 | 41 | 62 | 640 | 736 | 640 | 736 | 704 | 768 | 704 | 768 | 288 | 288 | 288 | 288 |
| 2.5 | 38 | 61 | 576 | 672 | 576 | 672 | 672 | 736 | 672 | 736 | 288 | 288 | 288 | 288 |
| 2.75 | 35 | 61 | 512 | 608 | 512 | 608 | 640 | 672 | 640 | 672 | 288 | 288 | 288 | 288 |
| 3.0 | 32 | 60 | 448 | 544 | 448 | 544 | 576 | 640 | 576 | 640 | 288 | 288 | 288 | 288 |
| 3.25 | 29 | 60 | 352 | 480 | 352 | 480 | 512 | 608 | 512 | 608 | 256 | 288 | 256 | 288 |
| 3.5 | 26 | 60 | 288 | 384 | 288 | 384 | 480 | 544 | 480 | 544 | 256 | 288 | 256 | 288 |
| 3.75 | 23 | 59 | 224 | 288 | 224 | 288 | 448 | 480 | 448 | 480 | 256 | 288 | 256 | 288 |
| 4.0 | 20 | 59 | 192 | 224 | 192 | 224 | 416 | 448 | 416 | 448 | 256 | 288 | 256 | 288 |
| 4.25 | 17 | 58 | 160 | 160 | 160 | 160 | 416 | 416 | 416 | 416 | 224 | 288 | 224 | 288 |
| 4.5 | 14 | 57 | 128 | 128 | 128 | 128 | 384 | 384 | 384 | 384 | 224 | 288 | 224 | 288 |
| 4.75 | 11 | 56 | 96 | 96 | 96 | 96 | 352 | 352 | 352 | 352 | 224 | 288 | 224 | 288 |
| 5.0 | 8 | 55 | 64 | 64 | 64 | 64 | 352 | 352 | 352 | 352 | 192 | 288 | 192 | 288 |

TABLE 26

LDSL Wide Mode Downstream Spectral Compatibility vs Reference numbers

| km | TCM_ISDN ref | TCM_ISDN actual | A ref | A actual | A_lite ref | A_lite actual | C_DBM ref | C_DBM actual | C_DBM_lite ref | C_DBM_lite actual | C_FBM ref | C_FBM actual | C_FBM_lite ref | C_FBM_lite actual |
|---|---|---|---|---|---|---|---|---|---|---|---|---|---|---|
| 0.5 | 60 | 65 | 7104 | 7104 | 3008 | 3008 | 7104 | 7104 | 3008 | 3008 | 2624 | 2624 | 1088 | 1088 |
| 0.75 | 57 | 63 | 6784 | 7104 | 2784 | 3008 | 6912 | 7104 | 2848 | 3008 | 2624 | 2624 | 1088 | 1088 |
| 1.0 | 55 | 62 | 5952 | 7104 | 2400 | 3008 | 6368 | 7104 | 2624 | 3008 | 2624 | 2624 | 1088 | 1088 |
| 1.25 | 52 | 61 | 4896 | 7104 | 2016 | 3008 | 5696 | 7104 | 2368 | 3008 | 2624 | 2624 | 1088 | 1088 |
| 1.5 | 50 | 60 | 3840 | 7072 | 1632 | 2976 | 5024 | 7072 | 2144 | 2976 | 2624 | 2624 | 1088 | 1088 |
| 1.75 | 47 | 59 | 2496 | 7072 | 1184 | 2976 | 4192 | 7072 | 1856 | 2976 | 2624 | 2624 | 1088 | 1088 |
| 2.0 | 45 | 59 | 1696 | 7040 | 736 | 2944 | 3680 | 7072 | 1568 | 2976 | 2528 | 2624 | 1088 | 1088 |
| 2.25 | 43 | 58 | 1088 | 6784 | 448 | 2944 | 3296 | 6880 | 1376 | 2944 | 2464 | 2624 | 1088 | 1088 |
| 2.5 | 40 | 58 | 704 | 6176 | 224 | 2880 | 3008 | 6464 | 1248 | 2912 | 2368 | 2560 | 1088 | 1088 |
| 2.75 | 38 | 57 | 480 | 5344 | 128 | 2784 | 2720 | 5792 | 1184 | 2880 | 2240 | 2400 | 1088 | 1088 |
| 3.0 | 35 | 57 | 320 | 4384 | 96 | 2688 | 2368 | 4928 | 1152 | 2816 | 1984 | 2112 | 1056 | 1056 |
| 3.25 | 32 | 57 | 224 | 3520 | 64 | 2528 | 1984 | 4096 | 1152 | 2720 | 1696 | 1760 | 1024 | 1024 |
| 3.5 | 30 | 56 | 128 | 2848 | 32 | 2304 | 1632 | 3328 | 1120 | 2560 | 1408 | 1440 | 992 | 992 |
| 3.75 | 27 | 56 | 64 | 2304 | 0 | 2048 | 1344 | 2720 | 1056 | 2336 | 1152 | 1216 | 928 | 960 |
| 4.0 | 25 | 56 | 32 | 1792 | 0 | 1728 | 1088 | 2208 | 960 | 2048 | 928 | 992 | 832 | 896 |
| 4.25 | 22 | 55 | 0 | 1376 | 0 | 1376 | 928 | 1728 | 896 | 1696 | 768 | 832 | 736 | 800 |
| 4.5 | 20 | 55 | 0 | 992 | 0 | 992 | 768 | 1344 | 768 | 1344 | 576 | 704 | 576 | 704 |
| 4.75 | 17 | 54 | 0 | 672 | 0 | 672 | 608 | 1024 | 608 | 1024 | 448 | 576 | 448 | 576 |
| 5.0 | 15 | 53 | 0 | 416 | 0 | 416 | 512 | 768 | 512 | 768 | 320 | 480 | 320 | 480 |

TABLE 27

LDSL Narrow Mode Upstream Spectral Compatibility vs Reference numbers

| km | TCM_ISDN ref | TCM_ISDN actual | A ref | A actual | A_lite ref | A_lite actual | C_DBM ref | C_DBM actual | C_DBM_lite ref | C_DBM_lite actual | C_FBM ref | C_FBM actual | C_FBM_lite ref | C_FBM_lite actual |
|---|---|---|---|---|---|---|---|---|---|---|---|---|---|---|
| 0.5 | 61 | 68 | 832 | 832 | 832 | 832 | 832 | 832 | 832 | 832 | 288 | 288 | 288 | 288 |
| 0.75 | 58 | 66 | 832 | 832 | 832 | 832 | 832 | 832 | 832 | 832 | 288 | 288 | 288 | 288 |
| 1.0 | 55 | 65 | 832 | 832 | 832 | 832 | 832 | 832 | 832 | 832 | 288 | 288 | 288 | 288 |
| 1.25 | 52 | 64 | 800 | 832 | 800 | 832 | 800 | 832 | 800 | 832 | 288 | 288 | 288 | 288 |
| 1.5 | 49 | 63 | 768 | 832 | 768 | 832 | 800 | 832 | 800 | 832 | 288 | 288 | 288 | 288 |
| 1.758 | 46 | 63 | 736 | 832 | 736 | 832 | 768 | 832 | 768 | 832 | 288 | 288 | 288 | 288 |
| 2.0 | 43 | 62 | 704 | 832 | 704 | 832 | 736 | 832 | 736 | 832 | 288 | 288 | 288 | 288 |
| 2.25 | 41 | 62 | 640 | 800 | 640 | 800 | 704 | 800 | 704 | 800 | 288 | 288 | 288 | 288 |
| 2.5 | 38 | 61 | 576 | 736 | 576 | 736 | 672 | 768 | 672 | 768 | 288 | 288 | 288 | 288 |
| 2.75 | 35 | 61 | 512 | 672 | 512 | 672 | 640 | 736 | 640 | 736 | 288 | 288 | 288 | 288 |
| 3.0 | 32 | 60 | 448 | 608 | 448 | 608 | 576 | 672 | 576 | 672 | 288 | 288 | 288 | 288 |
| 3.25 | 29 | 60 | 352 | 512 | 352 | 512 | 512 | 640 | 512 | 640 | 256 | 288 | 256 | 288 |
| 3.5 | 26 | 60 | 288 | 448 | 288 | 448 | 480 | 576 | 480 | 576 | 256 | 288 | 256 | 288 |
| 3.75 | 23 | 59 | 224 | 384 | 224 | 384 | 448 | 544 | 448 | 544 | 256 | 288 | 256 | 288 |
| 4.0 | 20 | 59 | 192 | 288 | 192 | 288 | 416 | 480 | 416 | 480 | 256 | 288 | 256 | 288 |
| 4.25 | 17 | 58 | 160 | 192 | 160 | 192 | 416 | 416 | 416 | 416 | 224 | 288 | 224 | 288 |
| 4.5 | 14 | 57 | 128 | 128 | 128 | 128 | 384 | 384 | 384 | 384 | 224 | 288 | 224 | 288 |
| 4.75 | 11 | 56 | 96 | 96 | 96 | 96 | 352 | 352 | 352 | 352 | 224 | 288 | 224 | 288 |
| 5.0 | 8 | 55 | 64 | 64 | 64 | 64 | 352 | 320 | 352 | 320 | 192 | 288 | 192 | 288 |

TABLE 28

LDSL Narrow Mode Downstream Spectral Compatibility vs Reference numbers

| km | TCM_ISDN ref | TCM_ISDN actual | A ref | A actual | A_lite ref | A_lite actual | C_DBM ref | C_DBM actual | C_DBM_lite ref | C_DBM_lite actual | C_FBM ref | C_FBM actual | C_FBM_lite ref | C_FBM_lite actual |
|---|---|---|---|---|---|---|---|---|---|---|---|---|---|---|
| 0.5 | 60 | 63 | 7104 | 7104 | 3008 | 3008 | 7104 | 7104 | 3008 | 3008 | 2624 | 2624 | 1088 | 1088 |
| 0.75 | 57 | 61 | 6784 | 7104 | 2784 | 3008 | 6912 | 7104 | 2848 | 3008 | 2624 | 2624 | 1088 | 1088 |
| 1.0 | 55 | 60 | 5952 | 7104 | 2400 | 3008 | 6368 | 7104 | 2624 | 3008 | 2624 | 2624 | 1088 | 1088 |
| 1.25 | 52 | 59 | 4896 | 7104 | 2016 | 3008 | 5696 | 7104 | 2368 | 3008 | 2624 | 2624 | 1088 | 1088 |
| 1.5 | 50 | 58 | 3840 | 7072 | 1632 | 2976 | 5024 | 7072 | 2144 | 2976 | 2624 | 2624 | 1088 | 1088 |
| 1.758 | 47 | 57 | 2496 | 7072 | 1184 | 2976 | 4192 | 7072 | 1856 | 2976 | 2624 | 2624 | 1088 | 1088 |
| 2.0 | 45 | 57 | 1696 | 7040 | 736 | 2944 | 3680 | 7072 | 1568 | 2976 | 2528 | 2624 | 1088 | 1088 |
| 2.25 | 43 | 56 | 1088 | 6784 | 448 | 2912 | 3296 | 6880 | 1376 | 2944 | 2464 | 2624 | 1088 | 1088 |
| 2.5 | 40 | 56 | 704 | 6176 | 224 | 2880 | 3008 | 6464 | 1248 | 2912 | 2368 | 2560 | 1088 | 1088 |
| 2.75 | 38 | 55 | 480 | 5376 | 128 | 2784 | 2720 | 5824 | 1184 | 2880 | 2240 | 2400 | 1088 | 1088 |
| 3.0 | 35 | 55 | 320 | 4416 | 96 | 2752 | 2368 | 4960 | 1152 | 2848 | 1984 | 2144 | 1056 | 1088 |
| 3.25 | 32 | 55 | 224 | 3616 | 64 | 2624 | 1984 | 4128 | 1152 | 2784 | 1696 | 1824 | 1024 | 1088 |
| 3.5 | 30 | 54 | 128 | 2944 | 32 | 2432 | 1632 | 3392 | 1120 | 2624 | 1408 | 1504 | 992 | 1056 |
| 3.75 | 27 | 54 | 64 | 2368 | 0 | 2144 | 1344 | 2784 | 1056 | 2400 | 1152 | 1248 | 928 | 1024 |
| 4.0 | 25 | 54 | 32 | 1856 | 0 | 1824 | 1088 | 2240 | 960 | 2080 | 928 | 1056 | 832 | 928 |
| 4.25 | 22 | 53 | 0 | 1408 | 0 | 1408 | 928 | 1760 | 896 | 1728 | 768 | 864 | 736 | 832 |
| 4.5 | 20 | 53 | 0 | 992 | 0 | 992 | 768 | 1344 | 768 | 1344 | 576 | 704 | 576 | 704 |
| 4.75 | 17 | 52 | 0 | 672 | 0 | 672 | 608 | 992 | 608 | 992 | 448 | 576 | 448 | 576 |
| 5.0 | 15 | 52 | 0 | 416 | 0 | 416 | 512 | 736 | 512 | 736 | 320 | 480 | 320 | 480 |

FDM Quad Spectrum Mode.

Described in the following is a FDM Quad Spectrum mode for high speed ADSL and an evaluation of its spectral compatibility according to the 2003 revised TTC-Soumusho spectral compatibility rules. The FDM Quad Spectrum mode, in one embodiment, combines an extended downstream bandwidth PSD (from approximately 138 KHz up to approximately 3.75 MHz) with the G.992.5 upstream PSD (with steep side lobes of approximately −95 dB per octave slope). The FDM Quad Spectrum downstream channel total power preferably is equal to approximately 20 dBm.

Note that the values provided in the following FIGS. 43 and 44 and in Tables 41-45 are approximate, or mean values, and may have a variance of up to 10%.

FIG. 43 and Table 29 provide an exemplary embodiment of the FDM Quad Spectrum Mask features based on peak values.

FIG. 44 and Table 30 provide the G.992.5 Upstream Mask features based on peak values.

Table 31 provides the spectral compatibility reference performance of protected systems, according to the Revised 2003 Soumusho-TTC rules.

Table 32 provides the performance of protected systems in the presence of five FDM Quad Spectrum system disturbers.

Table 33 gives the delta between the reference performance (Table 31) and the performance in the presence of five FDM quad spectrum systems (Table 32). To be spectrally compatible, these numbers may be negative in the presence of a new system. The performance of the protected systems may be greater or equal to the reference performance.

The FDM Quad Spectrum mode is spectrally compatible with protected systems in Japan identified as TCM-ISDN, Annex A G.992.1 and G.992.2, Annex C DBM G.992.1 and G.992.2, Annex C FBM G.992.1 and G.992.2.

TABLE 29

Quad Spectrum Mask definition, Peak Values

| Frequency (kHz) | PSD (dBm/Hz) Peak values |
| --- | --- |
| 0 < f < 4 | −97.5 |
| 4 < f < 80 | "−92.5 + 4.63.log2.(f/4)" |
| 80 < f < 138 | "−72.5 + 36.log2.(f/80)" |
| 138 < f < 1104 | −37.9 |
| 1104 < f < 1622 | "−37.9 − 15.5.log2.(f/1104)" |

TABLE 29-continued

Quad Spectrum Mask definition, Peak Values

| Frequency (kHz) | PSD (dBm/Hz) Peak values |
| --- | --- |
| 1622 < f < 3750 | "−46.5 − 2.9.log2.(f/1622)" |
| 3750 | −76.5 |
| f = 3925 & f > 3925 | −101.5 |

TABLE 30

G.992.5 Upstream Mask Definition, Peak Values

| Frequency (kHz) | PSD (dBm/Hz) Peak values |
| --- | --- |
| 0 < f < 4 | −97.5 |
| 4 < f < 25.875 | "−92.5 + 21.5.log2.(f/4)" |
| 25.875 < f < 138 | −34.5 |
| 138 < f < f_int | "−34.5 − 95.log2.(f/138)" |
| f_int < f < 686 | 10log10(0.05683 * f^(1.5)) |
| f > 686 | −100 |

TABLE 31

Spectral Compatibility Reference Performance, Protected Systems

| | TCM-ISDN G.992.2 Annex A | | G.992.1 Annex A G.992.1 Annex C | | | | G. 992.2 Annex C | | | | | | |
| --- | --- | --- | --- | --- | --- | --- | --- | --- | --- | --- | --- | --- | --- |
| | (FDM) | | | | DBM | | FBM | | DBM | | FBM | | |
| Dist | DS | US | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 6784 | 832 | 2944 | 832 | 6912 | 832 | 2592 | 288 | 2944 | 832 | 1088 | 288 |
| 1 | 144 | 144 | 5952 | 832 | 2624 | 832 | 6368 | 832 | 2528 | 288 | 2752 | 832 | 1088 | 288 |
| 1.25 | 144 | 144 | 4896 | 800 | 2272 | 800 | 5696 | 800 | 2496 | 288 | 2528 | 800 | 1088 | 288 |
| 1.5 | 144 | 144 | 3840 | 768 | 1824 | 768 | 5024 | 800 | 2432 | 288 | 2272 | 800 | 1088 | 288 |
| 1.75 | 144 | 144 | 2496 | 736 | 1440 | 736 | 4192 | 768 | 2400 | 288 | 2016 | 768 | 1088 | 288 |
| 2 | 144 | 144 | 1696 | 704 | 960 | 704 | 3680 | 736 | 2336 | 288 | 1696 | 736 | 1088 | 288 |
| 2.25 | 144 | 144 | 1088 | 640 | 640 | 640 | 3296 | 704 | 2240 | 288 | 1504 | 704 | 1088 | 288 |
| 2.5 | 144 | 144 | 704 | 576 | 352 | 576 | 3008 | 672 | 2080 | 288 | 1312 | 672 | 1056 | 288 |
| 2.75 | 144 | 144 | 480 | 512 | 160 | 512 | 2720 | 640 | 1856 | 288 | 1216 | 640 | 1056 | 288 |
| 3 | 144 | 144 | 320 | 448 | 96 | 448 | 2368 | 576 | 1536 | 288 | 1184 | 576 | 1024 | 288 |
| 3.25 | 144 | 144 | 224 | 352 | 64 | 352 | 1984 | 512 | 1280 | 288 | 1152 | 512 | 992 | 288 |
| 3.5 | 144 | 0 | 128 | 288 | 32 | 288 | 1632 | 480 | 1056 | 288 | 1120 | 480 | 928 | 288 |
| 3.75 | 0 | 0 | 64 | 224 | 32 | 224 | 1344 | 448 | 832 | 256 | 1088 | 448 | 832 | 256 |
| 4 | 0 | 0 | 32 | 192 | 0 | 192 | 1088 | 416 | 640 | 256 | 1024 | 416 | 704 | 256 |
| 4.25 | 0 | 0 | 0 | 160 | 0 | 160 | 928 | 416 | 480 | 256 | 928 | 416 | 576 | 256 |
| 4.5 | 0 | 0 | 0 | 128 | 0 | 128 | 768 | 384 | 352 | 224 | 832 | 384 | 416 | 224 |
| 4.75 | 0 | 0 | 0 | 96 | 0 | 96 | 608 | 352 | 224 | 224 | 704 | 352 | 288 | 224 |
| 5 | 0 | 0 | 0 | 64 | 0 | 64 | 416 | 352 | 128 | 224 | 544 | 352 | 192 | 224 |

TABLE 32

Protected Systems performance with 5 FDM Quad Spectrum Systems (1 Intra-Quad, 4 Inter-Quad)

| | TCM-ISDN G.992.2 Annex A | | G.992.1 Annex A G.992.1 Annex C | | | | G. 992.2 Annex C | | | | | | |
| --- | --- | --- | --- | --- | --- | --- | --- | --- | --- | --- | --- | --- | --- |
| | (FDM) | | | | DBM | | FBM | | DBM | | FBM | | |
| Dist | DS | US | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 7104 | 832 | 3008 | 832 | 7104 | 832 | 2624 | 288 | 3008 | 832 | 1088 | 288 |
| 1 | 144 | 144 | 7008 | 832 | 3008 | 832 | 7008 | 832 | 2592 | 288 | 3008 | 832 | 1088 | 288 |
| 1.25 | 144 | 144 | 6912 | 832 | 3008 | 832 | 6912 | 832 | 2560 | 288 | 3008 | 832 | 1088 | 288 |
| 1.5 | 144 | 144 | 6848 | 832 | 3008 | 832 | 6848 | 832 | 2528 | 288 | 3008 | 832 | 1088 | 288 |
| 1.75 | 144 | 144 | 6752 | 832 | 2976 | 832 | 6752 | 832 | 2496 | 288 | 2976 | 832 | 1088 | 288 |

TABLE 32-continued

Protected Systems performance with 5 FDM Quad Spectrum Systems (1 Intra-Quad, 4 Inter-Quad)

| | TCM-ISDN G.992.2 Annex A | | G.992.1 Annex A G.992.1 Annex C | | | | | | | | G. 992.2 Annex C | | | |
|---|---|---|---|---|---|---|---|---|---|---|---|---|---|---|
| | (FDM) | | | | DBM | | FBM | | DBM | | FBM | | | |
| Dist | DS | US | DS | US | DS | US | DS | US | DS | US | DS | US | DS | US |
| 2 | 144 | 144 | 6624 | 832 | 2976 | 832 | 6624 | 832 | 2432 | 288 | 2976 | 832 | 1088 | 288 |
| 2.25 | 144 | 144 | 6496 | 832 | 2976 | 832 | 6496 | 832 | 2400 | 288 | 2976 | 832 | 1088 | 288 |
| 2.5 | 144 | 144 | 6240 | 832 | 2976 | 832 | 6240 | 832 | 2304 | 288 | 2976 | 832 | 1088 | 288 |
| 2.75 | 144 | 144 | 5856 | 800 | 2944 | 800 | 5856 | 800 | 2144 | 288 | 2944 | 800 | 1088 | 288 |
| 3 | 144 | 144 | 5248 | 800 | 2944 | 800 | 5248 | 800 | 1920 | 288 | 2944 | 800 | 1088 | 288 |
| 3.25 | 144 | 144 | 4416 | 800 | 2912 | 800 | 4416 | 800 | 1632 | 288 | 2912 | 800 | 1056 | 288 |
| 3.5 | 144 | 144 | 3712 | 768 | 2816 | 768 | 3712 | 768 | 1376 | 288 | 2816 | 768 | 1024 | 288 |
| 3.75 | 0 | 0 | 3104 | 736 | 2688 | 736 | 3104 | 736 | 1120 | 256 | 2688 | 736 | 992 | 256 |
| 4 | 0 | 0 | 2560 | 736 | 2464 | 736 | 2560 | 736 | 928 | 256 | 2464 | 736 | 896 | 256 |
| 4.25 | 0 | 0 | 2080 | 704 | 2240 | 704 | 2080 | 704 | 768 | 256 | 2240 | 704 | 800 | 256 |
| 4.5 | 0 | 0 | 1696 | 672 | 1920 | 672 | 1696 | 672 | 608 | 224 | 1920 | 672 | 704 | 224 |
| 4.75 | 0 | 0 | 1344 | 640 | 1536 | 640 | 1344 | 640 | 480 | 224 | 1536 | 640 | 544 | 224 |
| 5 | 0 | 0 | 1024 | 608 | 1184 | 608 | 1024 | 608 | 352 | 224 | 1184 | 608 | 448 | 224 |

TABLE 33

Reference Performance minus Performance with 5 FDM Quad Spectrum

| | TCM-ISDN G.992.2 Annex A | | G.992.1 Annex A G.992.1 Annex C | | | | | | | | G. 992.2 Annex C | | | |
|---|---|---|---|---|---|---|---|---|---|---|---|---|---|---|
| | (FDM) | | | | DBM | | FBM | | DBM | | FBM | | | |
| Dist | DS | US | DS | US | DS | US | DS | US | DS | US | DS | US | DS | US |
| 0.5 | 0 | 0 | 0 | 0 | 0 | 0 | 0 | 0 | 0 | 0 | 0 | 0 | 0 | 0 |
| 0.75 | 0 | 0 | −320 | 0 | −64 | 0 | −192 | 0 | −32 | 0 | −64 | 0 | 0 | 0 |
| 1 | 0 | 0 | −1056 | 0 | −384 | 0 | −640 | 0 | −64 | 0 | −256 | 0 | 0 | 0 |
| 1.25 | 0 | 0 | −2016 | −32 | −736 | −32 | −1216 | −32 | −64 | 0 | −480 | −32 | 0 | 0 |
| 1.5 | 0 | 0 | −3008 | −64 | −1184 | −64 | −1824 | −32 | −96 | 0 | −736 | −32 | 0 | 0 |
| 1.75 | 0 | 0 | −4256 | −96 | −1536 | −96 | −2560 | −64 | −96 | 0 | −960 | −64 | 0 | 0 |
| 2 | 0 | 0 | −4928 | −128 | −2016 | −128 | −2944 | −96 | −96 | 0 | −1280 | −96 | 0 | 0 |
| 2.25 | 0 | 0 | −5408 | −192 | −2336 | −192 | −3200 | −128 | −160 | 0 | −1472 | −128 | 0 | 0 |
| 2.5 | 0 | 0 | −5536 | −256 | −2624 | −256 | −3232 | −160 | −224 | 0 | −1664 | −160 | −32 | 0 |
| 2.75 | 0 | 0 | −5376 | −288 | −2784 | −288 | −3136 | −160 | −288 | 0 | −1728 | −160 | −32 | 0 |
| 3 | 0 | 0 | −4928 | −352 | −2848 | −352 | −2880 | −224 | −384 | 0 | −1760 | −224 | −64 | 0 |
| 3.25 | 0 | 0 | −4192 | −448 | −2848 | −448 | −2432 | −288 | −352 | 0 | −1760 | −288 | −64 | 0 |
| 3.5 | 0 | −144 | −3584 | −480 | −2784 | −480 | −2080 | −288 | −320 | 0 | −1696 | −288 | −96 | 0 |
| 3.75 | 0 | 0 | −3040 | −512 | −2656 | −512 | −1760 | −288 | −288 | 0 | −1600 | −288 | −160 | 0 |
| 4 | 0 | 0 | −2528 | −544 | −2464 | −544 | −1472 | −320 | −288 | 0 | −1440 | −320 | −192 | 0 |
| 4.25 | 0 | 0 | −2080 | −544 | −2240 | −544 | −1152 | −288 | −288 | 0 | −1312 | −288 | −224 | 0 |
| 4.5 | 0 | 0 | −1696 | −544 | −1920 | −544 | −928 | −288 | −256 | 0 | −1088 | −288 | −288 | 0 |
| 4.75 | 0 | 0 | −1344 | −544 | −1536 | −544 | −736 | −288 | −256 | 0 | −832 | −288 | −256 | 0 |
| 5 | 0 | 0 | −1024 | −544 | −1184 | −544 | −608 | −256 | −224 | 0 | −640 | −256 | −256 | 0 |

Extended Upstream OL Overlap Mode

Described in the following is the spectral compatibility of a high speed system that combines an extended upstream channel up to approximately 276 KHz and an Overlap OL Quad Spectrum downstream channel that starts at approximately 25.875 KHz. Based on the results described below and according to the 2003 refined Soumusho Spectral compatibility rules, in some embodiments it is preferable to deploy the Extended Upstream Overlap System in the same quad as protected systems up to approximately 3.25 km.

Note that the values provided in the following FIGS. 45 and 46 and in Tables 46-50 are approximate, or mean values, and may have a variance of up to 10%.

FIG. 45 and Table 34 provided exemplary features of the Extended Overlap Quad Spectrum Downstream Mask.

FIG. 46 and Table 35 provide exemplary features of the Extended Overlap Quad Spectrum Upstream Mask.

Table 36 provides the spectral compatibility reference performance of protected systems, according to the Revised 2003 Soumusho-TTC rules.

Table 37 provides the performance of protected systems in the presence of five Extended Overlap upstream systems as disturbers (1 Intra-Quad plus 4 Inter-Quad).

Table 38 describes the difference between reference performance of protected systems and their performance in the presence of five Extended Overlap upstream systems as overlap systems disturbers. According to Table 38, the Extended Upstream system has little or no impact with Annex C DBM and TCM-ISDN systems up to approximately 3.25 km.

TABLE 34

Extended Overlap Quad Spectrum Downstream Mask Peak Values

| Frequency (kHz) | PSD (dBm/Hz) Peak values |
|---|---|
| 0 < f < 4 | −97.5 |
| 4 < f < 25.875 | "−92.5 + 21.log2.(f/4)" |
| 25.875 < f < 1104 | −38.3 |
| 1104 < f < 1622 | "−38.3 − 14.75.log2.(f/1104)" |
| 1622 < f < 3750 | "−46.5 − 2.9.log2.(f/1622)" |
| f = 3750 | −76.5 |
| f > 3925 | −101.5 |

TABLE 35

Extended Overlap Quad Spectrum Upstream Mask, Peak values

| Frequency (kHz) | PSD (dBm/Hz) Peak values |
|---|---|
| 0 < f < 4 | −97.5 |
| 4 < f < 25.875 | "−92.5 + 21.5.log2.(f/4)" |
| 25.875 < f < 138 | −34.5 |
| 138 < f < 276 | "−34.5 − 26.log2.(f/138)" |
| 276 < f < f_int | "−60.5 − 95.log2.(f/276)" |
| f_int < f < 686 | 10log10(0.05683*f^(1.5)) |

TABLE 36

Protected Systems Reference table

| | TCM-ISDN G.992.2 Annex A | | G.992.1 Annex A G.992.1 Annex C | | | | G. 992.2 Annex C | | | | | |
|---|---|---|---|---|---|---|---|---|---|---|---|---|
| | (FDM) | | | | DBM | | FBM | | DBM | | FBM | |
| Dist | DS | US | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 6784 | 832 | 2944 | 832 | 6912 | 832 | 2592 | 288 | 2944 | 832 | 1088 | 288 |
| 1 | 144 | 144 | 5952 | 832 | 2624 | 832 | 6368 | 832 | 2528 | 288 | 2752 | 832 | 1088 | 288 |
| 1.25 | 144 | 144 | 4896 | 800 | 2272 | 800 | 5696 | 800 | 2496 | 288 | 2528 | 800 | 1088 | 288 |
| 1.5 | 144 | 144 | 3840 | 768 | 1824 | 768 | 5024 | 800 | 2432 | 288 | 2272 | 800 | 1088 | 288 |
| 1.75 | 144 | 144 | 2496 | 736 | 1440 | 736 | 4192 | 768 | 2400 | 288 | 2016 | 768 | 1088 | 288 |
| 2 | 144 | 144 | 1696 | 704 | 960 | 704 | 3680 | 736 | 2336 | 288 | 1696 | 736 | 1088 | 288 |
| 2.25 | 144 | 144 | 1088 | 640 | 640 | 640 | 3296 | 704 | 2240 | 288 | 1504 | 704 | 1088 | 288 |
| 2.5 | 144 | 144 | 704 | 576 | 352 | 576 | 3008 | 672 | 2080 | 288 | 1312 | 672 | 1056 | 288 |
| 2.75 | 144 | 144 | 480 | 512 | 160 | 512 | 2720 | 640 | 1856 | 288 | 1216 | 640 | 1056 | 288 |
| 3 | 144 | 144 | 320 | 448 | 96 | 448 | 2368 | 576 | 1536 | 288 | 1184 | 576 | 1024 | 288 |
| 3.25 | 144 | 144 | 224 | 352 | 64 | 352 | 1984 | 512 | 1280 | 288 | 1152 | 512 | 992 | 288 |
| 3.5 | 144 | 0 | 128 | 288 | 32 | 288 | 1632 | 480 | 1056 | 288 | 1120 | 480 | 928 | 288 |
| 3.75 | 0 | 0 | 64 | 224 | 32 | 224 | 1344 | 448 | 832 | 256 | 1088 | 448 | 832 | 256 |
| 4 | 0 | 0 | 32 | 192 | 0 | 192 | 1088 | 416 | 640 | 256 | 1024 | 416 | 704 | 256 |
| 4.25 | 0 | 0 | 0 | 160 | 0 | 160 | 928 | 416 | 480 | 256 | 928 | 416 | 576 | 256 |
| 4.5 | 0 | 0 | 0 | 128 | 0 | 128 | 768 | 384 | 352 | 224 | 832 | 384 | 416 | 224 |
| 4.75 | 0 | 0 | 0 | 96 | 0 | 96 | 608 | 352 | 224 | 224 | 704 | 352 | 288 | 224 |
| 5 | 0 | 0 | 0 | 64 | 0 | 64 | 416 | 352 | 128 | 224 | 544 | 352 | 192 | 224 |

TABLE 37

Extended Overlap Upstream System Spectral Compatibility Impact.

| | TCM-ISDN G.992.2 Annex A | | G.992.1 Annex A G.992.1 Annex C | | | | G. 992.2 Annex C | | | | | |
|---|---|---|---|---|---|---|---|---|---|---|---|---|
| | (FDM) | | | | DBM | | FBM | | DBM | | FBM | |
| Dist | DS | US | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 7104 | 832 | 3008 | 832 | 7104 | 832 | 2624 | 288 | 3008 | 832 | 1088 | 288 |
| 1 | 144 | 144 | 7072 | 832 | 3008 | 832 | 7072 | 832 | 2592 | 288 | 3008 | 832 | 1088 | 288 |
| 1.25 | 144 | 144 | 6944 | 832 | 3008 | 832 | 6944 | 832 | 2560 | 288 | 3008 | 832 | 1088 | 288 |
| 1.5 | 144 | 144 | 6848 | 832 | 2976 | 832 | 6848 | 832 | 2528 | 288 | 2976 | 832 | 1088 | 288 |
| 1.75 | 144 | 144 | 6752 | 832 | 2976 | 832 | 6752 | 832 | 2496 | 288 | 2976 | 832 | 1088 | 288 |
| 2 | 144 | 144 | 6592 | 800 | 2912 | 800 | 6592 | 800 | 2432 | 288 | 2912 | 800 | 1088 | 288 |
| 2.25 | 144 | 144 | 6368 | 768 | 2848 | 768 | 6368 | 768 | 2336 | 288 | 2848 | 768 | 1056 | 288 |
| 2.5 | 144 | 144 | 6016 | 704 | 2752 | 704 | 6016 | 704 | 2208 | 256 | 2752 | 704 | 1024 | 256 |
| 2.75 | 144 | 144 | 5504 | 672 | 2624 | 672 | 5504 | 672 | 2016 | 224 | 2624 | 672 | 960 | 224 |
| 3 | 144 | 144 | 4768 | 608 | 2496 | 608 | 4768 | 608 | 1760 | 224 | 2496 | 608 | 928 | 224 |
| 3.25 | 144 | 144 | 3776 | 512 | 2368 | 512 | 3776 | 512 | 1376 | 192 | 2368 | 512 | 864 | 192 |
| 3.5 | 0 | 0 | 2944 | 448 | 2144 | 448 | 2944 | 448 | 1088 | 160 | 2144 | 448 | 768 | 160 |

TABLE 37-continued

Extended Overlap Upstream System Spectral Compatibility Impact.

| | TCM-ISDN G.992.2 Annex A | | G.992.1 Annex A G.992.1 Annex C | | | | | | G. 992.2 Annex C | | | | | |
|---|---|---|---|---|---|---|---|---|---|---|---|---|---|---|
| | (FDM) | | | | DBM | | | | FBM | | DBM | | FBM | |
| Dist | DS | US | DS | US | DS | US | DS | US | DS | US | DS | US | DS | US |
| 3.75 | 0 | 0 | 2208 | 352 | 1856 | 352 | 2208 | 352 | 800 | 128 | 1856 | 352 | 672 | 128 |
| 4 | 0 | 0 | 1568 | 288 | 1536 | 288 | 1568 | 288 | 576 | 96 | 1536 | 288 | 544 | 96 |
| 4.25 | 0 | 0 | 1088 | 224 | 1216 | 224 | 1088 | 224 | 384 | 64 | 1216 | 224 | 448 | 64 |
| 4.5 | 0 | 0 | 704 | 160 | 896 | 160 | 704 | 160 | 256 | 32 | 896 | 160 | 320 | 32 |
| 4.75 | 0 | 0 | 416 | 96 | 576 | 96 | 416 | 96 | 128 | 32 | 576 | 96 | 192 | 32 |
| 5 | 0 | 0 | 192 | 64 | 320 | 64 | 192 | 64 | 64 | 32 | 320 | 64 | 96 | 32 |

TABLE 38

Reference Performance minus Performance with Extended Overlap Upstream System

| | TCM-ISDN G.992.2 Annex A | | G.992.1 Annex A G.992.1 Annex C | | | | | | G. 992.2 Annex C | | | | | |
|---|---|---|---|---|---|---|---|---|---|---|---|---|---|---|
| | (FDM) | | | | DBM | | | | FBM | | DBM | | FBM | |
| Dist | DS | US | DS | US | DS | US | DS | US | DS | US | DS | US | DS | US |
| 0.5 | 0 | 0 | 0 | 0 | 0 | 0 | 0 | 0 | 0 | 0 | 0 | 0 | 0 | 0 |
| 0.75 | 0 | 0 | −320 | 0 | −64 | 0 | −192 | 0 | −32 | 0 | −64 | 0 | 0 | 0 |
| 1 | 0 | 0 | −1120 | 0 | −384 | 0 | −704 | 0 | −64 | 0 | −256 | 0 | 0 | 0 |
| 1.25 | 0 | 0 | −2048 | −32 | −736 | −32 | −1248 | −32 | −64 | 0 | −480 | −32 | 0 | 0 |
| 1.5 | 0 | 0 | −3008 | −64 | −1152 | −64 | −1824 | −32 | −96 | 0 | −704 | −32 | 0 | 0 |
| 1.75 | 0 | 0 | −4256 | −96 | −1536 | −96 | −2560 | −64 | −96 | 0 | −960 | −64 | 0 | 0 |
| 2 | 0 | 0 | −4896 | −96 | −1952 | −96 | −2912 | −64 | −96 | 0 | −1216 | −64 | 0 | 0 |
| 2.25 | 0 | 0 | −5280 | −128 | −2208 | −128 | −3072 | −64 | −96 | 0 | −1344 | −64 | 32 | 0 |
| 2.5 | 0 | 0 | −5312 | −128 | −2400 | −128 | −3008 | −32 | −128 | 32 | −1440 | −32 | 32 | 32 |
| 2.75 | 0 | 0 | −5024 | −160 | −2464 | −160 | −2784 | −32 | −160 | 64 | −1408 | −32 | 96 | 64 |
| 3 | 0 | 0 | −4448 | −160 | −2400 | −160 | −2400 | −32 | −224 | 64 | −1312 | −32 | 96 | 64 |
| 3.25 | 0 | 0 | −3552 | −160 | −2304 | −160 | −1792 | 0 | −96 | 96 | −1216 | 0 | 128 | 96 |
| 3.5 | 144 | 0 | −2816 | −160 | −2112 | −160 | −1312 | 32 | −32 | 128 | −1024 | 32 | 160 | 128 |
| 3.75 | 0 | 0 | −2144 | −128 | −1824 | −128 | −864 | 96 | 32 | 128 | −768 | 96 | 160 | 128 |
| 4 | 0 | 0 | −1536 | −96 | −1536 | −96 | −480 | 128 | 64 | 160 | −512 | 128 | 160 | 160 |
| 4.25 | 0 | 0 | −1088 | −64 | −1216 | −64 | −160 | 192 | 96 | 192 | −288 | 192 | 128 | 192 |
| 4.5 | 0 | 0 | −704 | −32 | −896 | −32 | 64 | 224 | 96 | 192 | −64 | 224 | 96 | 192 |
| 4.75 | 0 | 0 | −416 | 0 | −576 | 0 | 192 | 256 | 96 | 192 | 128 | 256 | 96 | 192 |
| 5 | 0 | 0 | −192 | 0 | −320 | 0 | 224 | 288 | 64 | 192 | 224 | 288 | 96 | 192 |

Extended Upstream Reduced Overlap (ROL) Spectrum Mode

Described in the following is an Extended Upstream Reduced Overlap (ROL) system that combines an extended upstream channel up to approximately 276 KHz and a Reduced Overlap ROL Quad Spectrum downstream channel that starts at approximately 138 KHz.

Note that the values provided in the following FIGS. 47 and 48 and in Tables 51-54 are approximate, or mean values, and may have a variance of up to 10%.

FIG. 47 and Table 39 provides exemplary features of one embodiment of the Reduced Overlap Quad Spectrum Downstream Mask.

FIG. 48 and Table 40 provides exemplary features of one embodiment of the Reduced Overlap Quad Spectrum Downstream Mask.

Table 41 provides the performance of protected systems in the presence of five extended Upstream ROL systems as disturbers (1 Intra-Quad plus 4 Inter-Quad).

Table 42 describes the difference between reference performance of protected systems and their performance in the presence of five Extended Upstream ROL system disturbers.

According to Table 42, Extended Upstream ROL System has little or no impact with TCM-ISDN systems up to approximately 3.25 km.

TABLE 39

Quad Spectrum Reduced Overlap Downstream Mask Peak Values

| Frequency (kHz) | PSD (dBm/Hz) Peak values |
|---|---|
| 0 < f < 4 | −97.5 |
| 4 < f < 80 | "−92.5 + 4.63.log2.(f/4)" |
| 80 < f < 138 | "−72.5 + 36.log2.(f/80)" |
| 138 < f < 1104 | −37.9 |
| 1104 < f < 1622 | "−37.9 − 15.5.log2.(f/1104)" |
| 1622 < f < 3750 | "−46.5 − 2.9.log2.(f/1622)" |
| 3750 | −76.5 |
| f = 3925 & f > 3925 | −101.5 |

TABLE 40

Extended Upstream Mask, Peak values

| Frequency (kHz) | PSD (dBm/Hz) Peak values |
|---|---|
| 0 < f < 4 | −97.5 |
| 4 < f < 25.875 | "−92.5 + 21.5.log2.(f/4)" |
| 25.875 < f < 138 | −34.5 |
| 138 < f < 276 | "−34.5 − 26.log2.(f/138)" |
| 276 < f < f_int | "−60.5 − 95.log2.(f/276)" |
| f_int < f < 686 | 10log10(0.05683*f^(1.5)) |
| f > 686 | −100 |

TABLE 41

Extended Upstream ROL System Spectral Compatibility Impact.

| | TCM-ISDN G.992.2 Annex A | | G.992.1 Annex A G.992.1 Annex C | | | | G. 992.2 Annex C | | | | | |
|---|---|---|---|---|---|---|---|---|---|---|---|---|
| | (FDM) | | | | DBM | | FBM | | DBM | | FBM | |
| Dist | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 7104 | 832 | 3008 | 832 | 7104 | 832 | 2624 | 288 | 3008 | 832 | 1088 | 288 |
| 1 | 144 | 144 | 7008 | 832 | 3008 | 832 | 7008 | 832 | 2592 | 288 | 3008 | 832 | 1088 | 288 |
| 1.25 | 144 | 144 | 6912 | 832 | 3008 | 832 | 6912 | 832 | 2560 | 288 | 3008 | 832 | 1088 | 288 |
| 1.5 | 144 | 144 | 6816 | 832 | 2976 | 832 | 6816 | 832 | 2528 | 288 | 2976 | 832 | 1088 | 288 |
| 1.75 | 144 | 144 | 6720 | 832 | 2976 | 832 | 6720 | 832 | 2464 | 288 | 2976 | 832 | 1088 | 288 |
| 2 | 144 | 144 | 6528 | 832 | 2912 | 832 | 6528 | 832 | 2400 | 288 | 2912 | 832 | 1088 | 288 |
| 2.25 | 144 | 144 | 6304 | 832 | 2848 | 832 | 6304 | 832 | 2336 | 288 | 2848 | 832 | 1056 | 288 |
| 2.5 | 144 | 144 | 5984 | 832 | 2752 | 832 | 5984 | 832 | 2208 | 288 | 2752 | 832 | 1024 | 288 |
| 2.75 | 144 | 144 | 5472 | 800 | 2624 | 800 | 5472 | 800 | 2016 | 288 | 2624 | 800 | 960 | 288 |
| 3 | 144 | 144 | 4736 | 800 | 2496 | 800 | 4736 | 800 | 1728 | 288 | 2496 | 800 | 928 | 288 |
| 3.25 | 144 | 144 | 3776 | 800 | 2336 | 800 | 3776 | 800 | 1376 | 288 | 2336 | 800 | 864 | 288 |
| 3.5 | 0 | 144 | 2912 | 768 | 2144 | 768 | 2912 | 768 | 1088 | 288 | 2144 | 768 | 768 | 288 |
| 3.75 | 0 | 0 | 2176 | 736 | 1856 | 736 | 2176 | 736 | 800 | 256 | 1856 | 736 | 672 | 256 |
| 4 | 0 | 0 | 1536 | 736 | 1504 | 736 | 1536 | 736 | 576 | 256 | 1504 | 736 | 544 | 256 |
| 4.25 | 0 | 0 | 1088 | 704 | 1184 | 704 | 1088 | 704 | 384 | 256 | 1184 | 704 | 448 | 256 |
| 4.5 | 0 | 0 | 704 | 672 | 896 | 672 | 704 | 672 | 256 | 224 | 896 | 672 | 320 | 224 |

TABLE 42

Reference Performance minus Performance with Extended Upstream ROL System

| | TCM-ISDN G.992.2 Annex A | | G.992.1 Annex A G.992.1 Annex C | | | | G. 992.2 Annex C | | | | | |
|---|---|---|---|---|---|---|---|---|---|---|---|---|
| | (FDM) | | | | DBM | | FBM | | DBM | | FBM | |
| Dist | DS | US | DS | US | DS | US | DS | US | DS | US | DS | US |
| 0.5 | 0 | 0 | 0 | 0 | 0 | 0 | 0 | 0 | 0 | 0 | 0 | 0 | 0 | 0 |
| 0.75 | 0 | 0 | −320 | 0 | −64 | 0 | −192 | 0 | −32 | 0 | −64 | 0 | 0 | 0 |
| 1 | 0 | 0 | −1056 | 0 | −384 | 0 | −640 | 0 | −64 | 0 | −256 | 0 | 0 | 0 |
| 1.25 | 0 | 0 | −2016 | −32 | −736 | −32 | −1216 | −32 | −64 | 0 | −480 | −32 | 0 | 0 |
| 1.5 | 0 | 0 | −2976 | −64 | −1152 | −64 | −1792 | −32 | −96 | 0 | −704 | −32 | 0 | 0 |
| 1.75 | 0 | 0 | −4224 | −96 | −1536 | −96 | −2528 | −64 | −64 | 0 | −960 | −64 | 0 | 0 |
| 2 | 0 | 0 | −4832 | −128 | −1952 | −128 | −2848 | −96 | −64 | 0 | −1216 | −96 | 0 | 0 |
| 2.25 | 0 | 0 | −5216 | −192 | −2208 | −192 | −3008 | −128 | −96 | 0 | −1344 | −128 | 32 | 0 |
| 2.5 | 0 | 0 | −5280 | −256 | −2400 | −256 | −2976 | −160 | −128 | 0 | −1440 | −160 | 32 | 0 |
| 2.75 | 0 | 0 | −4992 | −288 | −2464 | −288 | −2752 | −160 | −160 | 0 | −1408 | −160 | 96 | 0 |
| 3 | 0 | 0 | −4416 | −352 | −2400 | −352 | −2368 | −224 | −192 | 0 | −1312 | −224 | 96 | 0 |
| 3.25 | 0 | 0 | −3552 | −448 | −2272 | −448 | −1792 | −288 | −96 | 0 | −1184 | −288 | 128 | 0 |
| 3.5 | 144 | −144 | −2784 | −480 | −2112 | −480 | −1280 | −288 | −32 | 0 | −1024 | −288 | 160 | 0 |
| 3.75 | 0 | 0 | −2112 | −512 | −1824 | −512 | −832 | −288 | 32 | 0 | −768 | −288 | 160 | 0 |
| 4 | 0 | 0 | −1504 | −544 | −1504 | −544 | −448 | −320 | 64 | 0 | −480 | −320 | 160 | 0 |
| 4.25 | 0 | 0 | −1088 | −544 | −1184 | −544 | −160 | −288 | 96 | 0 | −256 | −288 | 128 | 0 |
| 4.5 | 0 | 0 | −704 | −544 | −896 | −544 | 64 | −288 | 96 | 0 | −64 | −288 | 96 | 0 |
| 4.75 | 0 | 0 | −416 | −544 | −576 | −544 | 192 | −288 | 96 | 0 | 128 | −288 | 96 | 0 |
| 5 | 0 | 0 | −192 | −544 | −320 | −544 | 224 | −256 | 64 | 0 | 224 | −256 | 96 | 0 |

Extended Upstream Reduced Overlap (ROL) Spectrum Mode:

Described in the following is an Overlap OL Quad Spectrum System for high speed ADSL and an evaluation of its spectral compatibility according to the 2003 revised TTC-Soumusho spectral compatibility rules. The OL Quad Spectrum System combines an extended downstream Bandwidth PSD (from approximately 25.875 KHz up to approximately 3.75 MHz) and the G.992.5 Upstream PSD (with steep side lobes of −95 dB per octave slope). The Quad spectrum Downstream channel total power preferably is equal to approximately 20 dBm. The following demonstrates that that the Quad Spectrum Overlap system has a smaller spectral compatibility impact than G.992.1 OL with protected systems. It is therefore preferable in some embodiments to deploy the Quad Spectrum Overlap System in the same quad as protected systems at longer range than G.992.1 OL.

Note that the values provided in the following FIGS. 49 and 50 and in Tables 55-60 are approximate, or mean values, and may have a variance of up to 10%.

FIG. 49 and Table 43 disclose exemplary Overlap Quad Spectrum Downstream Mask features based on peak values.

FIG. 50 and Table 44 disclose the G.992.5 Upstream Mask features based on peak values.

Table 45 provides the performance of protected systems in the presence of 5 g.992.1 OL systems disturbers.

Table 46 provides the performance of protected systems in the presence of five OL Quad Spectrum systems disturbers.

Table 47 provides the delta between the reference performance and the performance in the presence of five OL quad spectrum systems (Table 46).

Table 48 provides the delta between the reference performance and the performance in the presence of 5 OL quad spectrum systems (Table 46).

TABLE 43

| OL Quad Spectrum Downstream Mask Definition, Peak Values | |
|---|---|
| Frequency (kHz) | PSD (dBm/Hz) Peak values |
| 0 < f < 4 | −97.5 |
| 4 < f < 25.875 | "−92.5 + 21.log2.(f/4)" |
| 25.875 < f < 1104 | −38.3 |
| 1104 < f < 1622 | "−38.3 − 14.75.log2.(f/1104)" |
| 1622 < f < 3750 | "−46.5 − 2.9.log2.(f/1622)" |
| f = 3750 | −76.5 |
| f > 3925 | −101.5 |

TABLE 44

| G.992.5 Upstream Mask Definition, Peak Values | |
|---|---|
| Frequency (kHz) | PSD (dBm/Hz) Peak values |
| 0 < f < 4 | −97.5 |
| 4 < f < 25.875 | "−92.5 + 21.5.log2.(f/4)" |
| 25.875 < f < 138 | −34.5 |
| 138 < f < f_int | "−34.5 − 95.log2.(f/138)" |
| f_int < f < 686 | 10log10(0.05683*f^(1.5)) |
| f > 686 | −100 |

TABLE 45

Protected Systems Performance with 5 G.992.1 OL Systems (1 Intra-Quad, 4 Inter-Quad)

| | TCM-ISDN G.992.2 Annex A | | G.992.1 Annex A G.992.1 Annex C | | | | | | | | G. 992.2 Annex C | | | |
|---|---|---|---|---|---|---|---|---|---|---|---|---|---|---|
| | (FDM) | | | | DBM | | | | FBM | | DBM | | FBM | |
| Dist | DS | US | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 7008 | 832 | 3008 | 832 | 7008 | 832 | 2592 | 288 | 3008 | 832 | 1088 | 288 |
| 1 | 144 | 144 | 6880 | 832 | 3008 | 832 | 6880 | 832 | 2528 | 288 | 3008 | 832 | 1088 | 288 |
| 1.25 | 144 | 144 | 6784 | 832 | 3008 | 832 | 6784 | 832 | 2496 | 288 | 3008 | 832 | 1088 | 288 |
| 1.5 | 144 | 144 | 6624 | 832 | 2976 | 832 | 6624 | 832 | 2432 | 288 | 2976 | 832 | 1088 | 288 |
| 1.75 | 144 | 144 | 6464 | 800 | 2976 | 800 | 6464 | 800 | 2400 | 288 | 2976 | 800 | 1088 | 288 |
| 2 | 144 | 144 | 6336 | 768 | 2976 | 768 | 6336 | 768 | 2336 | 288 | 2976 | 768 | 1088 | 288 |
| 2.25 | 144 | 144 | 6080 | 736 | 2944 | 736 | 6080 | 736 | 2240 | 256 | 2944 | 736 | 1088 | 256 |
| 2.5 | 144 | 144 | 5664 | 672 | 2912 | 672 | 5664 | 672 | 2080 | 256 | 2912 | 672 | 1056 | 256 |
| 2.75 | 144 | 144 | 5024 | 608 | 2880 | 608 | 5024 | 608 | 1856 | 224 | 2880 | 608 | 1056 | 224 |
| 3 | 144 | 144 | 4192 | 544 | 2816 | 544 | 4192 | 544 | 1536 | 192 | 2816 | 544 | 1024 | 192 |
| 3.25 | 144 | 144 | 3488 | 480 | 2688 | 480 | 3488 | 480 | 1280 | 160 | 2688 | 480 | 992 | 160 |
| 3.5 | 144 | 0 | 2848 | 384 | 2528 | 384 | 2848 | 384 | 1056 | 128 | 2528 | 384 | 928 | 128 |
| 3.75 | 0 | 0 | 2304 | 288 | 2272 | 288 | 2304 | 288 | 832 | 96 | 2272 | 288 | 832 | 96 |
| 4 | 0 | 0 | 1792 | 224 | 1984 | 224 | 1792 | 224 | 640 | 64 | 1984 | 224 | 704 | 64 |
| 4.25 | 0 | 0 | 1344 | 160 | 1568 | 160 | 1344 | 160 | 480 | 64 | 1568 | 160 | 576 | 64 |
| 4.5 | 0 | 0 | 960 | 128 | 1152 | 128 | 960 | 128 | 352 | 32 | 1152 | 128 | 416 | 32 |
| 4.75 | 0 | 0 | 672 | 96 | 832 | 96 | 672 | 96 | 224 | 32 | 832 | 96 | 288 | 32 |
| 5 | 0 | 0 | 416 | 64 | 544 | 64 | 416 | 64 | 128 | 0 | 544 | 64 | 192 | 0 |

TABLE 46

Protected Systems performance with 5 OL Quad Spectrum Systems (1 Intra-Quad, 4 Inter-Quad)

| | TCM-ISDN G.992.2 Annex A | | G.992.1 Annex A G.992.1 Annex C | | | | | | | G. 992.2 Annex C | | | |
|---|---|---|---|---|---|---|---|---|---|---|---|---|---|
| | (FDM) | | | | DBM | | FBM | | DBM | | FBM | | |
| Dist | DS | US | DS | US | DS | US | DS | US | DS | US | DS | US | DS | US |
| 0.5 | 144 | 144 | 7104 | 832 | 3008 | 832 | 7104 | 832 | 2624 | 288 | 3008 | 832 | 1088 | 288 |
| 0.75 | 144 | 144 | 7104 | 832 | 3008 | 832 | 7104 | 832 | 2624 | 288 | 3008 | 832 | 1088 | 288 |
| 1 | 144 | 144 | 7072 | 832 | 3008 | 832 | 7072 | 832 | 2592 | 288 | 3008 | 832 | 1088 | 288 |
| 1.25 | 144 | 144 | 6944 | 832 | 3008 | 832 | 6944 | 832 | 2560 | 288 | 3008 | 832 | 1088 | 288 |
| 1.5 | 144 | 144 | 6880 | 832 | 3008 | 832 | 6880 | 832 | 2528 | 288 | 3008 | 832 | 1088 | 288 |
| 1.75 | 144 | 144 | 6816 | 832 | 2976 | 832 | 6816 | 832 | 2528 | 288 | 2976 | 832 | 1088 | 288 |
| 2 | 144 | 144 | 6688 | 800 | 2976 | 800 | 6688 | 800 | 2464 | 288 | 2976 | 800 | 1088 | 288 |
| 2.25 | 144 | 144 | 6560 | 768 | 2976 | 768 | 6560 | 768 | 2400 | 288 | 2976 | 768 | 1088 | 288 |
| 2.5 | 144 | 144 | 6304 | 704 | 2976 | 704 | 6304 | 704 | 2336 | 256 | 2976 | 704 | 1088 | 256 |
| 2.75 | 144 | 144 | 5888 | 672 | 2944 | 672 | 5888 | 672 | 2176 | 224 | 2944 | 672 | 1088 | 224 |
| 3 | 144 | 144 | 5280 | 608 | 2944 | 608 | 5280 | 608 | 1952 | 224 | 2944 | 608 | 1088 | 224 |
| 3.25 | 144 | 144 | 4416 | 512 | 2912 | 512 | 4416 | 512 | 1632 | 192 | 2912 | 512 | 1056 | 192 |
| 3.5 | 144 | 144 | 3712 | 448 | 2816 | 448 | 3712 | 448 | 1376 | 160 | 2816 | 448 | 1024 | 160 |
| 3.75 | 0 | 0 | 3104 | 352 | 2688 | 352 | 3104 | 352 | 1152 | 128 | 2688 | 352 | 992 | 128 |
| 4 | 0 | 0 | 2560 | 288 | 2496 | 288 | 2560 | 288 | 928 | 96 | 2496 | 288 | 896 | 96 |
| 4.25 | 0 | 0 | 2112 | 224 | 2240 | 224 | 2112 | 224 | 768 | 64 | 2240 | 224 | 800 | 64 |
| 4.5 | 0 | 0 | 1696 | 160 | 1920 | 160 | 1696 | 160 | 608 | 32 | 1920 | 160 | 704 | 32 |
| 4.75 | 0 | 0 | 1344 | 96 | 1536 | 96 | 1344 | 96 | 480 | 32 | 1536 | 96 | 576 | 32 |
| 5 | 0 | 0 | 1024 | 64 | 1216 | 64 | 1024 | 64 | 352 | 32 | 1216 | 64 | 448 | 32 |

TABLE 47

Reference Performance minus Performance with Five OL Quad Spectrum

| | TCM-ISDN G.992.2 Annex A | | G.992.1 Annex A G.992.1 Annex C | | | | | | | G. 992.2 Annex C | | | |
|---|---|---|---|---|---|---|---|---|---|---|---|---|---|
| | (FDM) | | | | DBM | | FBM | | DBM | | FBM | | |
| Dist | DS | US | DS | US | DS | US | DS | US | DS | US | DS | US | DS | US |
| 0.5 | 0 | 0 | 0 | 0 | 0 | 0 | 0 | 0 | 0 | 0 | 0 | 0 | 0 | 0 |
| 0.75 | 0 | 0 | −320 | 0 | −64 | 0 | −192 | 0 | −32 | 0 | −64 | 0 | 0 | 0 |
| 1 | 0 | 0 | −1120 | 0 | −384 | 0 | −704 | 0 | −64 | 0 | −256 | 0 | 0 | 0 |
| 1.25 | 0 | 0 | −2048 | −32 | −736 | −32 | −1248 | −32 | −64 | 0 | −480 | −32 | 0 | 0 |
| 1.5 | 0 | 0 | −3040 | −64 | −1184 | −64 | −1856 | −32 | −96 | 0 | −736 | −32 | 0 | 0 |
| 1.75 | 0 | 0 | −4320 | −96 | −1536 | −96 | −2624 | −64 | −128 | 0 | −960 | −64 | 0 | 0 |
| 2 | 0 | 0 | −4992 | −96 | −2016 | −96 | −3008 | −64 | −128 | 0 | −1280 | −64 | 0 | 0 |
| 2.25 | 0 | 0 | −5472 | −128 | −2336 | −128 | −3264 | −64 | −160 | 0 | −1472 | −64 | 0 | 0 |
| 2.5 | 0 | 0 | −5600 | −128 | −2624 | −128 | −3296 | −32 | −256 | 32 | −1664 | −32 | −32 | 32 |
| 2.75 | 0 | 0 | −5408 | −160 | −2784 | −160 | −3168 | −32 | −320 | 64 | −1728 | −32 | −32 | 64 |
| 3 | 0 | 0 | −4960 | −160 | −2848 | −160 | −2912 | −32 | −416 | 64 | −1760 | −32 | −64 | 64 |
| 3.25 | 0 | 0 | −4192 | −160 | −2848 | −160 | −2432 | 0 | −352 | 96 | −1760 | 0 | −64 | 96 |
| 3.5 | 0 | −144 | −3584 | −160 | −2784 | −160 | −2080 | 32 | −320 | 128 | −1696 | 32 | −96 | 128 |
| 3.75 | 0 | 0 | −3040 | −128 | −2656 | −128 | −1760 | 96 | −320 | 128 | −1600 | 96 | −160 | 128 |
| 4 | 0 | 0 | −2528 | −96 | −2496 | −96 | −1472 | 128 | −288 | 160 | −1472 | 128 | −192 | 160 |
| 4.25 | 0 | 0 | −2112 | −64 | −2240 | −64 | −1184 | 192 | −288 | 192 | −1312 | 192 | −224 | 192 |
| 4.5 | 0 | 0 | −1696 | −32 | −1920 | −32 | −928 | 224 | −256 | 192 | −1088 | 224 | −288 | 192 |
| 4.75 | 0 | 0 | −1344 | 0 | −1536 | 0 | −736 | 256 | −256 | 192 | −832 | 256 | −288 | 192 |
| 5 | 0 | 0 | −1024 | 0 | −1216 | 0 | −608 | 288 | −224 | 192 | −672 | 288 | −256 | 192 |

TABLE 48

G.992.1 OL SC Table minus Quad Spectrum OL SC Table

| | TCM-ISDN G.992.2 Annex A | | G.992.1 Annex A G.992.1 Annex C | | | | | | | G. 992.2 Annex C | | | |
|---|---|---|---|---|---|---|---|---|---|---|---|---|---|
| | (FDM) | | | | DBM | | FBM | | DBM | | FBM | | |
| Dist | DS | US | DS | US | DS | US | DS | US | DS | US | DS | US | DS | US |
| 0.5 | 0 | 0 | 0 | 0 | 0 | 0 | 0 | 0 | 0 | 0 | 0 | 0 | 0 | 0 |
| 0.75 | 0 | 0 | −96 | 0 | 0 | 0 | −96 | 0 | −32 | 0 | 0 | 0 | 0 | 0 |

TABLE 48-continued

G.992.1 OL SC Table minus Quad Spectrum OL SC Table

| | TCM-ISDN G.992.2 Annex A | | G.992.1 Annex A G.992.1 Annex C | | | | | | G. 992.2 Annex C | | | | | |
|---|---|---|---|---|---|---|---|---|---|---|---|---|---|---|
| | (FDM) | | | | DBM | | | | FBM | | DBM | | FBM | |
| Dist | DS | US | DS | US | DS | US | DS | US | DS | US | DS | US | DS | US |
| 1 | 0 | 0 | −192 | 0 | 0 | 0 | −192 | 0 | −64 | 0 | 0 | 0 | 0 | 0 |
| 1.25 | 0 | 0 | −160 | 0 | 0 | 0 | −160 | 0 | −64 | 0 | 0 | 0 | 0 | 0 |
| 1.5 | 0 | 0 | −256 | 0 | −32 | 0 | −256 | 0 | −96 | 0 | −32 | 0 | 0 | 0 |
| 1.75 | 0 | 0 | −352 | −32 | 0 | −32 | −352 | −32 | −128 | 0 | 0 | −32 | 0 | 0 |
| 2 | 0 | 0 | −352 | −32 | 0 | −32 | −352 | −32 | −128 | 0 | 0 | −32 | 0 | 0 |
| 2.25 | 0 | 0 | −480 | −32 | −32 | −32 | −480 | −32 | −160 | −32 | −32 | −32 | 0 | −32 |
| 2.5 | 0 | 0 | −640 | −32 | −64 | −32 | −640 | −32 | −256 | 0 | −64 | −32 | −32 | 0 |
| 2.75 | 0 | 0 | −864 | −64 | −64 | −64 | −864 | −64 | −320 | 0 | −64 | −64 | −32 | 0 |
| 3 | 0 | 0 | −1088 | −64 | −128 | −64 | −1088 | −64 | −416 | −32 | −128 | −64 | −64 | −32 |
| 3.25 | 0 | 0 | −928 | −32 | −224 | −32 | −928 | −32 | −352 | −32 | −224 | −32 | −64 | −32 |
| 3.5 | 0 | −144 | −864 | −64 | −288 | −64 | −864 | −64 | −320 | −32 | −288 | −64 | −96 | −32 |
| 3.75 | 0 | 0 | −800 | −64 | −416 | −64 | −800 | −64 | −320 | −32 | −416 | −64 | −160 | −32 |
| 4 | 0 | 0 | −768 | −64 | −512 | −64 | −768 | −64 | −288 | −32 | −512 | −64 | −192 | −32 |
| 4.25 | 0 | 0 | −768 | −64 | −672 | −64 | −768 | −64 | −288 | 0 | −672 | −64 | −224 | 0 |
| 4.5 | 0 | 0 | −736 | −32 | −768 | −32 | −736 | −32 | −256 | 0 | −768 | −32 | −288 | 0 |
| 4.75 | 0 | 0 | −672 | 0 | −704 | 0 | −672 | 0 | −256 | 0 | −704 | 0 | −288 | 0 |
| 5 | 0 | 0 | −608 | 0 | −672 | 0 | −608 | 0 | −224 | −32 | −672 | 0 | −256 | −32 |

What is claimed is:

1. A method for implementing smart Digital Subscriber Line (DSL) for Long reach Digital Subscriber Line (LDSL) systems, the method comprising:
  defining a candidate system to be implemented by an LDSL system, wherein defining a candidate system comprises defining a number of power spectral density (PSD) masks;
  optimizing criteria associated with the candidate system to create an optimized candidate system;
  selecting the optimized candidate system to implement in an LDSL system; wherein,
  one of the number of masks is defined by the following relations, wherein f is a frequency band in kHz and D is the value of the mask in dBm/Hz:
  for $0<f\leq4$, then $D=-97.5$, with max power in the in 0–4 kHz band of +15 dBrn;
  for $4<f\leq5$, then $D=-92.5+18.64\log 2(f/4)$;
  for $5<f\leq5.25$, then $D=-86.5$; for $5.25<f\leq16$, then $D=-86.5+15.25\log 2(f/5.25)$;
  for $16<f\leq32$, then $D=-62+25.5\log 2(f/16)$;
  for $32<f\leq138$, then $D=-36.5$; for $138<f\leq323.4375$, then $D=-31.8$;
  for $323.4375<f\leq517.5$, then $D=-31.8-0.0371\times(f-323.4375)$;
  for $258.75<f\leq1800$, then $D=\max(-39-23.27\times\log_2(f/517.5),-65)$;
  for $1800<f\leq2290$, then $D=-65-72\times\log_2(f/1800)$;
  for $2290<f\leq3093$, then $D=-90$;
  for $3093<f\leq4545$, then $D=-90$ peak, with max power in the [f,f+1 MHz] window of $(-36.5-36\times\log_2(f/1104)+60)$ dBm; and
  for $4545<f\leq11040$, then $D=-90$ peak, with max power in the [f,f+1 MHz] window of −50 dBm.

2. A method for implementing smart Digital Subscriber Line (DSL) for Long reach Digital Subscriber Line (LDSL) systems, the method comprising:
  defining a candidate system to be implemented by an LDSL system, wherein defining a candidate system comprises defining a number of power spectral density (PSO) masks;
  optimizing criteria associated with the candidate system to create an optimized candidate system;
  selecting the optimized candidate system to implement in an LDSL system; wherein,
  one of the number of masks is defined by the following relations, wherein f is a frequency band in kHz and M is the value of the mask in dBm/Hz:
  for $0<f<4$, then $M=-97.5$; for $4<f<80$, then $M=-92.5+4.63\log_2(f/4)$;
  for $80<f<138$, then $M=-72.5+36\log_2(f/80)$; for $138<f<1104$, then $M=-37.9$;
  for $1104<f<1622$, then $M=-37.9-15.5\log_2(f/1104)$; for $1622<f<3750$, then $M=-46.5-2.9\log_2(f/1622)$;
  for $f=3750$, then $M=-76.5$; for $f=3925$, them $M=-101.5$; and for $f>3925$, then $M=-101.5$.

3. A method for implementing smart Digital Subscriber Line (DSL) for Long reach pigital Subscriber Line (LDSL) systems, the method comprising:
  defining a candidate system to be implemented by an LDSL system, wherein defining a candidate system comprises defining a number of power spectral density (PSO) masks;
  optimizing criteria associated with the candidate system to create an optimized candidate system;
  selecting the optimized candidate system to implement in an LDSL system; wherein,
  one of the number of masks is defined by the following relations, wherein f is a frequency band in kHz and D is the value of the mask in dBm/Hz:
  for $0<f<4$, then $D=-97.5$; for $4<f<25.875$, then $D=-92.5+21\log_2(f/4)$;
  for $25.875<f<1104$, then $D=-38.3$;
  for $1104<f<1622$, then $D=-38.3-14.75\log_2(f/1104)$;
  for $1622<f<3750$; then $D=-46.5-2.9\log_2(f/1622)$;
  for $f=3750$, then $D=-76.5$; and for $f>3925$, then $D=-101.5$.

4. A method for implementing smart pigital Subscriber Line (DSL) for Long reach Digital Subscriber Line (LDSL) systems, the method comprising:

defining a candidate system to be implemented by an LDSL system, wherein defining a candidate system comprises defining a number of power spectral density (PSD) masks;

optimizing criteria associated with the candidate system to create an optimized candidate system;

selecting the optimized candidate system to implement in an LDSL system; wherein, one of the number of masks is defined by the following relations, wherein f is a frequency band in kHz and U is the value of the mask in dBm/Hz:

for $0<f<4$, then $U=-97.5$;
for $4<f<25.875$, then $U=-92.5+21.5 \log_2(f/4)$;
for $25.875<f<138$, then $U=-34.5$;
for $138<f<276$, then $U=-34.5-26 \log_2(f/138)$;
for $276<f<f\_int$, then $U=-60.5-95 \log_2(f/276)$; and
for $f\_int<f<686$, then $U=10 \log_{10}(0.05683*f^{\wedge}(1.5))$.

5. A method for implementing smart Digital Subscriber Line (DSL) for Long reach Digital Subscriber Line (LDSL) systems, the method comprising:

defining a candidate system to be implemented by an LDSL system, wherein defining a candidate system comprises defining a number of power spectral density (PSO) masks;

optimizing criteria associated with the candidate system to create an optimized candidate systeml;

selecting the optimized candidate system to implement in an LDSL system; wherein, one of the number of masks is defined by the following relations, wherein f is a frequency band in kHz and M is the value of the mask in dBm/Hz:

for $0<f<4$, then $M=-97.5$;
for $4<f<80$, then $M=-92.5+4.63 \log_2(f/4)$;
for $80<f<138$, then $M=-72.5+36 \log_2(f/80)$;
for $138<f<1104$, then $M=-37.9$;
for $1104<f<1622$, then $M=-37.9-15.5 \log_2(f/1104)$;
for $1622<f<3750$, then $M=-46.5-2.9 \log_2(f/1622)$;
for $f=3750$; then $M=-76.5$;
for $f=3925$, then $M=-101.5$; and
for $f>3925$, then $M=-101.5$.

6. A method for implementing smart Digital Subscriber Line (DSL) for Long reach Digital Subscriber Line (LDSL) systems, the method comprising:

defining a candidate system to be implemented by an LDSL system, wherein defining a candidate system comprises defining a number of power spectral density (PSO) masks;

optimizing criteria associated with the candidate system to create an optimized candidate system;

selecting the optimized candidate system to implement in an LDSL system; wherein, one of the number of masks is defined by the following relations, wherein f is a frequency band in kHz and U is the value of the mask in dBm/Hz:

for $0<f<4$, then $U=-97.5$;
for $4<f<25.875$, then $U=-92.5+21.5 \log_2(f/4)$;
for $25.875<f<138$, then $U=-34.5$;
for $138<f<276$, then $U=-34.5-26 \log_2(f/138)$;
for $276<f<f\_int$ then $U=-60.5-95 \log_2(f/276)$;
for $f\_int<f<686$, then $U=10 \log_{10}(0.05683*f^{\wedge}(1.5))$; and
for $f>686$, then $U=-100$.

7. A method for implementing smart Digital Subscriber Line (DSL) for Long reach Digital Subscriber Line (LDSL) systems, the method comprising:

defining a candidate system to be implemented by an LDSL system, wherein defining a candidate system comprises defining a number of power spectral density (PSD) masks;

optimizing criteria associated with the candidate system to create an optimized candidate system:

selecting the optimized candidate system to implement in an LDSL system; wherein, one of the number of masks is defined by the following relations, wherein f is a frequency band in kHz and D is the value of the mask in dBm/Hz:

for $0<f<4$, then $D=-97.5$;
for $4<f<25.875$, then $D=-92.5+21 \log_2(f/4)$;
for $25.875<f<1104$, then $D=-38.3$;
for $1104<f<1622$, then $D=-38.3-14.75 \log_2(f/1104)$;
for $1622<f<3750$, then $D=-46.5-2.9 \log_2(f/1622)$;
for $f=3750$, then $D=-76.5$; and
for $f>3925$, then $D=-101.5$.

* * * * *

UNITED STATES PATENT AND TRADEMARK OFFICE
CERTIFICATE OF CORRECTION

PATENT NO. : 7,406,126 B2 Page 1 of 1
APPLICATION NO. : 10/714655
DATED : July 29, 2008
INVENTOR(S) : Duvaut et al.

It is certified that error appears in the above-identified patent and that said Letters Patent is hereby corrected as shown below:

Col. 39, line 67 (claim 2), change "(PSO)" to "(PSD)";
Col. 40, line 49 (claim 3), change "(PSO)" to "(PSD)";
Col. 41, line 24 (claim 5), change "(PSO)" to "(PSD)";
Col. 42, line 4 (claim 6), change "(PSO)" to "(PSD)".

Signed and Sealed this

Second Day of December, 2008

JON W. DUDAS
*Director of the United States Patent and Trademark Office*